United States Patent
Sakamoto et al.

(10) Patent No.: US 8,158,021 B2
(45) Date of Patent: Apr. 17, 2012

(54) POLYMERIZABLE LIQUID CRYSTAL COMPOUND, POLYMERIZABLE LIQUID CRYSTAL COMPOSITION, LIQUID CRYSTALLINE POLYMER, AND OPTICAL ANISOTROPIC ARTICLE

(75) Inventors: Kei Sakamoto, Tokyo (JP); Naoto Kogoshi, Tokyo (JP); Yoshihide Yachi, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 12/597,122

(22) PCT Filed: Apr. 24, 2008

(86) PCT No.: PCT/JP2008/057896
§ 371 (c)(1),
(2), (4) Date: Jun. 1, 2010

(87) PCT Pub. No.: WO2008/133290
PCT Pub. Date: Nov. 6, 2008

(65) Prior Publication Data
US 2010/0258764 A1    Oct. 14, 2010

(30) Foreign Application Priority Data

| Apr. 24, 2007 | (JP) | 2007-114270 |
| Dec. 19, 2007 | (JP) | 2007-327654 |
| Mar. 31, 2008 | (JP) | 2008-092093 |
| Mar. 31, 2008 | (JP) | 2008-092162 |

(51) Int. Cl.
C09K 19/00    (2006.01)
C09K 19/06    (2006.01)
C09K 19/32    (2006.01)
C09K 19/52    (2006.01)

(52) U.S. Cl. ......... 252/299.01; 252/299.6; 252/299.61; 252/299.63; 252/299.66; 252/299.68; 430/20; 428/1.1; 349/1; 349/86; 564/249; 544/224; 544/298; 546/341; 546/339

(58) Field of Classification Search ......... 252/299.01, 252/299.6, 299.61, 299.63, 299.66, 299.68; 428/1.1; 349/1, 86; 430/20; 564/249; 544/224, 544/298; 546/341, 339; 549/369–70; 558/411
See application file for complete search history.

(56) References Cited

U.S. PATENT DOCUMENTS
6,010,642 A * 1/2000 Takatsu et al. ......... 252/299.6

FOREIGN PATENT DOCUMENTS
| EP | 0 825 176 A1 | 2/1998 |
| JP | 10-147562 | 6/1998 |
| JP | 2005-213226 A1 | 8/2005 |

OTHER PUBLICATIONS

S.B. Clough, et al.; "Structure and Thermal Expansion of Some Polymers with Mesomorphic Ordering;" Macromolecules; vol. 9; No. 1; Jan.-Feb. 1976; pp. 123-127 (5 Sheets.).
International Search Report for International Application No. PCT/JP2008/057896 dated Jun. 27, 2008.

* cited by examiner

Primary Examiner — Geraldina Visconti
(74) Attorney, Agent, or Firm — Kratz, Quintos & Hanson, LLP

(57) ABSTRACT

A polymerizable liquid crystal compound shown by the following formula (I), a polymerizable liquid crystal composition that includes the polymerizable liquid crystal compound and a chiral compound polymerizable with the polymerizable liquid crystal compound, a liquid crystalline polymer obtained by polymerizing the polymerizable liquid crystal compound or the polymerizable liquid crystal composition, and an optical anisotropic article that includes the liquid crystalline polymer. The polymerizable liquid crystal compound shows a liquid crystal phase over a wider temperature range, is chemically stable, can be inexpensively produced, and has a wide selective reflection wavelength band Δλ (i.e., a large value Δn). The polymerizable liquid crystal composition includes the polymerizable liquid crystal compound, the liquid crystalline polymer is obtained by polymerizing the polymerizable liquid crystal compound or the polymerizable liquid crystal composition, and the optical anisotropic article includes the liquid crystalline polymer.

(I)

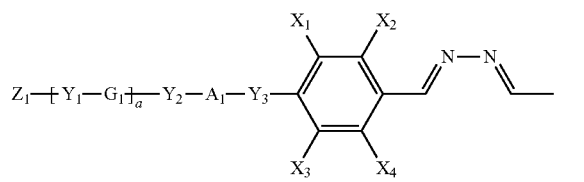

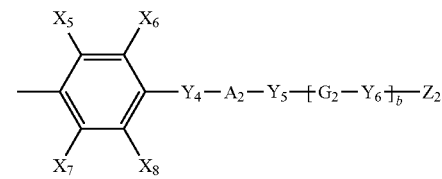

wherein $Y_1$ to $Y_6$ represent —O—, —O—C(=O)—, —C(=O)—O—, or the like, $G_1$ and $G_2$ represent divalent aliphatic groups having 1 to 20 carbon atoms, $Z_1$ and $Z_2$ represent an alkenyl group having 2 to 10 carbon atoms or the like, $A_1$ and $A_2$ represent divalent organic groups A having 1 to 30 carbon atoms, $X_1$ to $X_8$ represent a hydrogen atom or the like, and a and b represent 0 or 1.

15 Claims, No Drawings

POLYMERIZABLE LIQUID CRYSTAL COMPOUND, POLYMERIZABLE LIQUID CRYSTAL COMPOSITION, LIQUID CRYSTALLINE POLYMER, AND OPTICAL ANISOTROPIC ARTICLE

TECHNICAL FIELD

The present invention relates to a polymerizable liquid crystal compound, a polymerizable liquid crystal composition that includes the polymerizable liquid crystal compound and a polymerizable chiral compound, a liquid crystalline polymer obtained by polymerizing the polymerizable liquid crystal compound or the polymerizable liquid crystal composition, and an optical anisotropic article that includes the liquid crystalline polymer.

BACKGROUND ART

In recent years, a liquid crystal alignment film obtained by aligning a liquid crystal polymer or a liquid crystal compound having a polymerizable functional group has been developed as an optical film (e.g., optical compensator) used for liquid crystal displays. Such a liquid crystal alignment film has attracted attention since it is possible to implement a high-degree alignment state (e.g., tilted alignment or twist alignment) that cannot be implemented by a birefringence film that utilizes polymer film stretching technology.

A cholesteric polarizer that utilizes the selective reflectivity of a liquid crystal alignment film (selective reflection film) obtained by subjecting a composition that includes a liquid crystal polymer or a polymerizable liquid crystal compound (e.g., (meth)acrylate compound) and a chiral compound to a cholesteric alignment process has also been put to practical use.

The selective reflection center wavelength $\lambda$ is indicated by "$\lambda = n \times P$" (where, n is the average refractive index, and P is the cholesteric pitch). The selective reflection wavelength band $\Delta\lambda$ is indicated by "$\Delta\lambda = \Delta n \times P$" (where, $\Delta n$ is (ne−no) (where, ne is the extraordinary refractive index, and no is the ordinary refractive index). Therefore, a material having a large value $\Delta n$ (i.e., high optical anisotropy) is required to widen the selective reflection wavelength band $\Delta\lambda$.

When using a selective reflection film for a liquid crystal display as a cholesteric polarizer, the selective reflection film must selectively reflect light in the visible region. Since the selective reflection wavelength band $\Delta\lambda$ of a single selective reflection film is normally narrower than the visible region, a plurality of selective reflection films are laminated to widen the selective reflection wavelength band $\Delta\lambda$. Specifically, the number of layers of a selective reflection film increases when using a material having a narrow selective reflection wavelength band $\Delta\lambda$. As a result, productivity decreases. Therefore, a material (e.g., polymerizable liquid crystal compound) having a large value $\Delta n$ (i.e., a wide selective reflection wavelength band $\Delta\lambda$) has been desired.

However, since a known polymerizable compound or the like that has a large value $\Delta n$ exhibits poor solubility, applicability, and alignment properties, it may be impossible to produce a uniform film, or it may be difficult to obtain a selective reflection film that exhibits practical alignment properties.

An azine shown by the following formula (A) has been known as a liquid crystal compound.

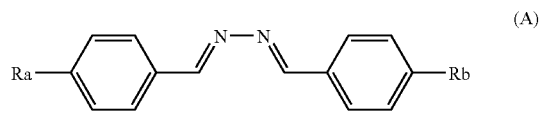

wherein Ra represents an alkyl group, and Rb represents an alkyl group, a cyano group, a fluorine atom, a trifluoromethoxy group, or the like.

The above azine compound is a liquid crystalline material that shows a liquid crystal phase over a wide temperature range, is relatively chemically stable, and can be produced inexpensively, for example.

However, the above azine compound does not necessarily exhibit satisfactory mutual solubility with a liquid crystal compound that are widely used at present. The mutual solubility of the azine compound can be improved to some extent by increasing the number of carbon atoms of the side-chain alkyl group in the formula (A). However, the resulting azine compound shows a liquid crystal phase in a narrow temperature range.

In order to solve the above problem, Patent Document 1 proposes a liquid crystal compound shown by the following formula (B).

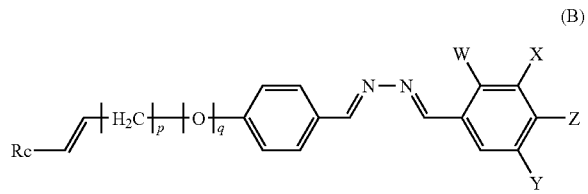

wherein Rc represents a hydrogen atom or an alkyl group having 1 to 12 carbon atoms (the double bond has a trans configuration when Rc represents an alkyl group), p represents an integer from 1 to 10, q represents 0 or 1, W, X, and Y represent a fluorine atom, a chlorine atom, a methyl group, a cyano group, or a hydrogen atom, and Z represents a fluorine atom, a chlorine atom, a cyano group, an alkyl group or an alkoxy group having 1 to 12 carbon atoms, or an alkenyl group or an alkenyloxy group having 3 to 12 carbon atoms, provided that one or more hydrogen atoms included in these groups may be replaced by a fluorine atom.

The above compound is chemically stable against heat, light, and the like, has excellent liquid crystallinity, and can be easily produced industrially. Since the above compound has excellent mutual solubility with a liquid crystal compound or a liquid crystal composition, the liquid crystal response time can be significantly improved by utilizing the above compound. Therefore, the above compound is considered to be useful as a component of a liquid crystal material for a liquid crystal display element that shows a liquid crystal phase over a wide temperature range and has a quick response time.

However, since an improvement in performance of liquid crystal displays has been increasingly desired, development of a liquid crystal material that shows a liquid crystal phase over a wider temperature range, is chemically stable, can be inexpensively produced, and has a large value $\Delta n$ has been desired.

Patent Document 1: JP-A-10-147562

DISCLOSURE OF THE INVENTION

Problems to be Solved by the Invention

The present invention was conceived in view of the above problems. An object of the present invention is to provide a polymerizable liquid crystal compound that shows a liquid crystal phase over a wider temperature range, is chemically stable, can be inexpensively produced, and has a wide selective reflection wavelength band Δλ (i.e., a large value Δn), a polymerizable liquid crystal composition that includes the polymerizable liquid crystal compound, a liquid crystalline polymer obtained by polymerizing the polymerizable liquid crystal compound or the polymerizable liquid crystal composition, and an optical anisotropic article that includes the liquid crystalline polymer.

Means for Solving the Problems

The inventors of the present invention conducted extensive studies in order to achieve the above object. As a result, the inventors found that a specific polymerizable liquid crystal compound that has an azine skeleton as a conjugated linear atomic group (i.e., a mesogenic group that provides liquid crystal alignment properties) is chemically stable against heat, light, and the like, has excellent liquid crystallinity, can be easily produced industrially, has a wide selective reflection wavelength band Δλ (i.e., a large value Δn), and is suitable as a material for a cholesteric liquid crystal layer. This finding has led to the completion of the present invention.

According to the first aspect of the present invention, the following polymerizable liquid crystal compound (1) to (6) is provided.

(1) A polymerizable liquid crystal compound shown by the following formula (I),

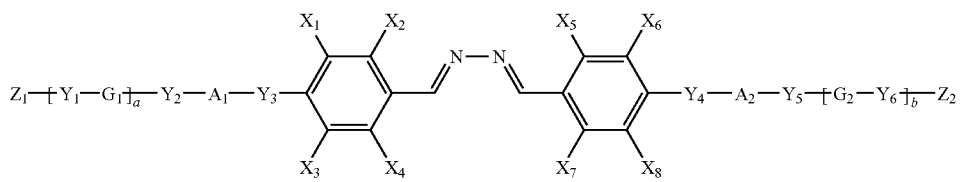

(I)

wherein $Y_1$ to $Y_6$ individually represent a single bond, —O—, —S—, —O—C(=O)—, —C(=O)—O—, —O—C(=O)—O—, —NR$^1$—C(=O)—, —C(=O)—NR$^1$, —O—C(=O)—NR$^1$—, —NR$^1$—C(=O)—O—, —NR$^1$—C(=O)—NR$^1$, —O—NR$^1$—, or —NR$^1$—O— (wherein R$^1$ represents a hydrogen atom or an alkyl group having 1 to 6 carbon atoms), $G_1$ and $G_2$ individually represent substituted or unsubstituted divalent aliphatic groups having 1 to 20 carbon atoms, provided that —O—, —S—, —O—C(=O)—, —C(=O)—O—, —O—C(=O)—O—, —NR$^2$—C(=O)—, —C(=O)—NR$^2$—, —NR$^2$—, or —C(=O)— may be included in the aliphatic group (excluding a case where two or more —O— or —S— linkages are adjacently included in the aliphatic group) (wherein R$^2$ represents a hydrogen atom or an alkyl group having 1 to 6 carbon atoms), $Z_1$ and $Z_2$ individually represent alkenyl groups having 2 to 10 carbon atoms that may be substituted with a halogen atom, $A_1$ and $A_2$ individually represent divalent organic groups A having 1 to 30 carbon atoms, $X_1$ to $X_8$ individually represent a hydrogen atom, a halogen atom, a substituted or unsubstituted alkyl group having 1 to 10 carbon atoms, a cyano group, a nitro group, —OR$^3$, —O—C(=O)—R$^3$, —C(=O)—OR$^3$, —O—C(=O)—OR$^3$, —NR$^4$—C(=O)—R$^3$, —C(=O)—NR$^3$, —O—C(=O)—NR$^3$, or —Y$_7$-G$_3$-Y$_8$—Z$_3$ (wherein R$^3$ represents a hydrogen atom or a substituted alkyl group having 1 to 10 carbon atoms, provided that, when R$^3$ represents an alkyl group, —O—, —S—, —O—C(=O)—, —C(=O)—O—, —O—C(=O)—O—, —NR$^5$—C(=O)—, —C(=O)—NR$^5$—, —NR$^5$—, or —C(=O)— may be included in the alkyl group (excluding a case where two or more —O— or —S— linkages are adjacently included in the alkyl group), R$^4$ and R$^5$ represent a hydrogen atom or an alkyl group having 1 to 6 carbon atoms, $Y_7$ and $Y_8$ have the same meaning as $Y_1$ to $Y_6$, $G_3$ has the same meaning as $G_1$ and $G_2$, and $Z_3$ has the same meaning as $Z_1$ and $Z_2$), and a and b individually represent 0 or 1.

(2) The polymerizable liquid crystal compound according to (1), wherein $A_1$ and $A_2$ individually represent a substituted or unsubstituted phenylene group, a substituted or unsubstituted biphenylene group, or a substituted or unsubstituted naphthylene group.

(3) The polymerizable liquid crystal compound according to (1) or (2), wherein $Z_1$ and $Z_2$ individually represent CH$_2$=CH—, CH$_2$=C(CH$_3$)—, CH$_2$=CH—CH$_2$—, CH$_3$—CH=CH—, CH$_2$=CH—CH$_2$—CH$_2$—, CH$_2$=C(CH$_3$)—CH$_2$—CH$_2$—, (CH$_3$)$_2$C=CH—CH$_2$—, (CH$_3$)$_2$C=CH—CH$_2$—CH$_2$—, CH$_2$=C(Cl)—, CH$_2$=C(CH$_3$)—CH$_2$—, or CH$_3$—CH=CH—CH$_2$—.

(4) The polymerizable liquid crystal compound according to (1), wherein $Y_1$ to $Y_6$ individually represent —O—, —C(=O)—O—, or —O—C(=O)—, $G_1$ and $G_2$ individually represent —(CH$_2$)$_6$— or —(CH$_2$)$_4$— (provided that —O—, —C(=O)—O—, or —O—C(=O)— may be included in the these groups), $Z_1$ and $Z_2$ individually represent CH$_2$=CH—, CH$_2$=C(CH$_3$)—, or CH$_2$=C(Cl)—, $A_1$ and $A_2$ individually represent one of the groups shown by the following formulas, and

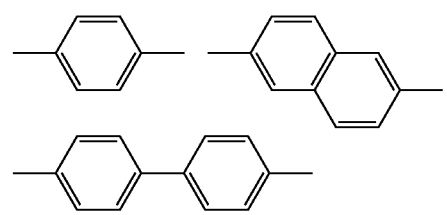

$X_1$ to $X_8$ individually represent a hydrogen atom, a halogen atom, an alkyl group having 1 to 10 carbon atoms, —C(=O)—OR$^3$, —O—C(=O)—R$^3$, or —OR$^3$ (wherein R$^3$ represents a hydrogen atom or a substituted or unsubstituted alkyl group having 1 to 10 carbon atoms, provided that, when R$^3$ represents an alkyl group, —O—, —C(=O)—O—, or —O—C(=O)— may be included in the alkyl group (excluding a case where two or more —O— linkages are adjacently included in the alkyl group)).

(5) The polymerizable liquid crystal compound according to (1), wherein $Y_1$ to $Y_6$ individually represent —O—, —C(=O)—O—, or —O—C(=O)—, $G_1$ and $G_2$ individually represent —(CH$_2$)$_6$— or —(CH$_2$)$_4$—, $Z_1$ and $Z_2$ individually represent CH$_2$=CH— or CH$_2$=C(CH$_3$)—, A$_1$ and A$_2$ represent the groups shown by the following formula, and

X$_1$ to X$_8$ individually represent a hydrogen atom, a halogen atom, an alkyl group having 1 to 10 carbon atoms, —C(=O)—OR$^3$, —O—C(=O)—R$^3$, or —OR$^3$ (wherein R$^3$ represents a hydrogen atom or a substituted or unsubstituted alkyl group having 1 to 10 carbon atoms, provided that, when R$^3$ represents an alkyl group, —O—, —C(=O)—O—, or —O—C(=O)— may be included in the alkyl group (excluding a case where two or more —O— linkages are adjacently included in the alkyl group)).

(6) The polymerizable liquid crystal compound according to (1), wherein Y$_1$ to Y$_6$ individually represent —O—, —C(=O)—O—, or —O—C(=O)—, G$_1$ and G$_2$ individually represent —(CH$_2$)$_6$— or —(CH$_2$)$_4$—, Z$_1$ and Z$_2$ represent CH$_2$=CH—, A$_1$ and A$_2$ represent the group shown by the following formula, and

X$_1$ to X$_8$ individually represent a hydrogen atom, —C(=O)—O—OR$^3$, or —OR$^3$ (wherein R$^3$ represents a hydrogen atom or a substituted or unsubstituted alkyl group having 1 to 10 carbon atoms).

According to the second aspect of the present invention, the following polymerizable liquid crystal composition (7) is provided.

(7) A polymerizable liquid crystal composition comprising the polymerizable liquid crystal compound according to any one of (1) to (3), and a polymerizable chiral compound that is polymerizable with the polymerizable liquid crystal compound.

According to the third aspect of the present invention, the following liquid crystalline polymer (8) is provided.

(8) A liquid crystalline polymer obtained by polymerizing the polymerizable liquid crystal compound according to any one of (1) to (3) or the polymerizable liquid crystal composition according to (4).

According to the fourth aspect of the present invention, the following optical anisotropic article (9) is provided.

(9) An optical anisotropic article comprising the liquid crystalline polymer according to (5).

Effects of the Invention

The polymerizable liquid crystal compound according to the present invention is a liquid crystal material that shows a liquid crystal phase over a wide temperature range, is chemically stable, can be produced inexpensively, and has a wide selective reflection wavelength band Δλ (i.e., a large value Δn). The polymerizable liquid crystal composition according to the present invention enables formation of a liquid crystal layer that shows a liquid crystal phase over a wide temperature range and has a wide selective reflection wavelength band Δλ (i.e., a large value Δn).

The liquid crystalline polymer according to the present invention has excellent alignment properties and high optical anisotropy (Δn).

Since the optical anisotropic article according to the present invention is produced using the polymerizable liquid crystal compound according to the present invention, the optical anisotropic article exhibits uniform and high-quality liquid crystal alignment properties.

BEST MODE FOR CARRYING OUT THE INVENTION

The present invention is described in detail below in the order of 1) polymerizable liquid crystal compound, 2) polymerizable liquid crystal composition, 3) liquid crystalline polymer, and 4) optical anisotropic article.

1) Polymerizable Liquid Crystal Compound

A polymerizable liquid crystal compound according to the present invention is a compound shown by the formula (I).

Y$_1$ to Y$_6$ in the formula (I) individually represent a single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—. Among these, —O—, —O—C(=O)—, and —C(=O)—O— are preferable.

R$^1$ represents a hydrogen atom or an alkyl group having 1 to 6 carbon atoms, such as a methyl group, an ethyl group, an n-propyl group, an isopropyl group, an n-butyl group, an isobutyl group, a sec-butyl group, a t-butyl group, an n-pentyl, an isopentyl group, a neopentyl group, or an n-hexyl group. R$^1$ preferably represents a hydrogen atom or a methyl group.

As the combination of Y$_1$ to Y$_6$, it is preferable that Y$_1$ and Y$_3$ be —C(=O)—O—, Y$_4$ and Y$_6$ be —O—C(=O)—, and Y$_2$ and Y$_5$ be —O—, or Y$_1$ to Y$_3$ be —C(=O)—O— and Y$_4$ to Y$_6$ be —O—C(=O)—, so that the polymerizable liquid crystal compound can be easily synthesized and more advantageously exhibits the desired effects of the present invention.

G$_1$ and G$_2$ individually represent substituted or unsubstituted divalent aliphatic groups having 1 to 20 carbon atoms, and preferably divalent aliphatic groups having 1 to 12 carbon atoms.

Examples of the divalent aliphatic groups having 1 to 20 carbon atoms represented by G$_1$ and G$_2$ include linear aliphatic groups, aliphatic groups having an alicyclic structure, and the like. Among these, the divalent aliphatic groups represented by G$_1$ and G$_2$ are preferably linear aliphatic groups (e.g., an alkylene group having 1 to 20 carbon atoms or an alkenylene group having 2 to 20 carbon atoms), more preferably alkylene groups having 1 to 12 carbon atoms (e.g., methylene group, ethylene group, trimethylene group, propylene group, tetramethylene group, pentamethylene group, hexamethylene group, or octamethylene group), and particularly preferably a tetramethylene group (—(CH$_2$)$_4$—) or a hexamethylene group (—(CH$_2$)$_6$—), so that the polymerizable liquid crystal compound more advantageously exhibits the desired effects of the present invention.

Examples of a substituent for the divalent aliphatic groups represented by G$_1$ and G$_2$ include halogen atoms such as a fluorine atom, a chlorine atom, a bromine atom, and an iodine atom; alkoxy groups having 1 to 6 carbon atoms such as a methoxy group, an ethoxy group, an n-propoxy group, an isopropoxy group, an n-butoxy group, a sec-butoxy group, a t-butoxy group, an n-pentyloxy group, and an n-hexyloxy group; and the like. Among these, a fluorine atom, a methoxy group, and an ethoxy group are preferable.

Note that —O—, —S—, —O—C(=O)—, —C(=O)—O—, —NR²—C(=O)—, —C(=O)—NR²—, —NR²—, or —C(=O)— may be included in the aliphatic group (excluding a case where two or more —O— or —S— linkages are adjacently included in the aliphatic group). Among these, —O—, —O—C(=O)—, and —C(=O)—O— are preferable.

$R^2$ represents a hydrogen atom or an alkyl group having 1 to 6 carbon atoms similar to that represented by $R^1$. $R^2$ preferably represents a hydrogen atom or a methyl group.

Specific examples of the aliphatic group that includes the above group include —CH₂—CH₂—O—CH₂—CH₂—, —CH₂—CH₂—S—CH₂—CH₂—, —CH₂—CH₂—O—C(=O)—CH₂—CH₂—, —CH₂—CH₂—C(=O)—O—CH₂—, —CH₂—O—C(=O)—O—CH₂—CH₂—, —CH₂—CH₂—NR²—C(=O)—CH₂—CH₂—, —CH₂—CH₂—C(=O)—NR²—CH₂—, —CH₂—NR²—CH₂—CH₂—, —CH₂—C(=O)—CH₂—, and the like.

$Z_1$ and $Z_2$ individually represent alkenyl groups having 2 to 10 carbon atoms that may be substituted with a halogen atom.

The alkenyl groups having 2 to 10 carbon atoms represented by $Z_1$ and $Z_2$ are preferably alkenyl groups having 2 to 6 carbon atoms. Examples of the halogen atom that may substitute the alkenyl groups include a fluorine atom, a chlorine atom, a bromine atom, and the like. Among these, a chlorine atom is preferable.

Specific examples of the alkenyl groups having 2 to 10 carbon atoms represented by $Z_1$ and $Z_2$ that may be substituted with a halogen atom include CH₂=CH—, CH₂=C(CH₃)—, CH₂=CH—CH₂—, CH₃—CH=CH—, CH₂=CH—CH₂—CH₂—, CH₂=C(CH₃)—CH₂—CH₂—, (CH₃)₂C=CH—CH₂—, (CH₃)₂C=CH—CH₂—CH₂—, CH₂=C(Cl)—, CH₂=C(CH₃)—CH₂—, CH₃—CH=CH—CH₂—, and the like.

Among these, the alkenyl groups represented by $Z_1$ and $Z_2$ are preferably CH₂=CH—, CH₂=C(CH₃)—, CH₂=C(Cl)—, CH₂=CH—CH₂—, CH₂=C(CH₃)—CH₂—, or CH₂=C(CH₃)—CH₂—CH₂—, more preferably CH₂=CH—, CH₂=C(CH₃)—, or CH₂=C(Cl)—, still more preferably CH₂=CH— or CH₂=C(CH₃)—, and particularly preferably CH₂=CH—, so that the polymerizable liquid crystal compound more advantageously exhibits the desired effects of the present invention.

$X_1$ to $X_8$ individually represent a hydrogen atom, a halogen atom, a substituted or unsubstituted alkyl group having 1 to 10 carbon atoms, a cyano group, a nitro group, —OR³, —O—C(=O)—R³, —C(=O)—OR³, —O—C(=O)—OR³, —NR⁴—C(=O)—R³, —C(=O)—NR³, —O—C(=O)—NR³, or —Y₇-G₃-Y₈—Z₃. Among these, $X_1$ to $X_8$ preferably represent a hydrogen atom, a halogen atom, a substituted or unsubstituted alkyl group having 1 to 10 carbon atoms, —OR³, —O—C(=O)—R³, —C(=O)—OR³, or —O—C(=O)—OR³, more preferably a hydrogen atom, a substituted or unsubstituted alkyl group having 1 to 10 carbon atoms, —OR³, or —C(=O)—O—R³, still more preferably substituted or unsubstituted alkyl groups having 1 to 10 carbon atoms, and particularly preferably alkyl groups having 1 to 4 carbon atoms such as a methyl group, an ethyl group, an n-propyl group, an isopropyl group, or an n-butyl group.

$R^3$ represents a hydrogen atom or a substituted or unsubstituted alkyl group having 1 to 10 carbon atoms. Examples of the alkyl groups having 1 to 10 carbon atoms include a methyl group, an ethyl group, an n-propyl group, an isopropyl group, an n-butyl group, a sec-butyl group, a t-butyl group, an n-pentyl group, an n-hexyl group, and the like. Among these, alkyl groups having 1 to 4 carbon atoms such as a methyl group, an ethyl group, an n-propyl group, an isopropyl group, and an n-butyl group are preferable.

Examples of a substituent for the substituted or unsubstituted alkyl group having 1 to 10 carbon atoms represented by $R^3$ include halogen atoms such as a fluorine atom, a chlorine atom, a bromine atom, and an iodine atom; alkoxy groups having 1 to 6 carbon atoms such as a methoxy group, an ethoxy group, an n-propoxy group, an isopropoxy group, an n-butoxy group, a sec-butoxy group, a t-butoxy group, an n-pentyloxy group, and an n-hexyloxy group; and the like.

When $R^3$ represents an alkyl group, —O—, —S—, —O—C(=O)—, —C(=O)—O—, —O—C(=O)—O—, —NR⁵—C(=O)—, —C(=O)—NR⁵—, —NR⁵—, or —C(=O)— may be included in the alkyl group. Among these, —O—, —O—C(=O)—, and —C(=O)—O— are preferable.

Note that a case where two or more —O— or —S— linkages are adjacently included in the aliphatic group is excluded.

$R^4$ and $R^5$ individually represent a hydrogen atom or an alkyl group having 1 to 6 carbon atoms (e.g., methyl group or ethyl group).

Specific examples of the alkyl group that is represented by $R^3$ and includes —O—, —S—, —O—C(=O)—, —C(=O)—O—, —O—C(=O)—O—, —NR⁵—C(=O)—, —C(=O)—NR⁵—, —NR⁵—, or —C(=O)— include —CH₂—CH₂—O—CH₂—CH₃, —CH₂—CH₂—S—CH₂—CH₃, —CH₂—CH₂—O—C(=O)—CH₃, —CH₂—CH₂—C(=O)—O—CH₃, —CH₂—O—C(=O)—O—CH₂—CH₃, —CH₂—CH₂—NR₂—C(=O)—CH₃, —CH₂—CH₂—C(=O)—NR²—CH₃, —CH₂—NR²—CH₂—CH₃, —CH₂—CH₂—C(=O)—CH₃, and the like.

$Y_7$ and $Y_8$ have the same meaning as $Y_1$ to $Y_6$, $G_3$ has the same meaning as $G_1$ and $G_2$, and $Z_3$ has the same meaning as $Z_1$ and $Z_2$.

Specific examples of the group shown by Y₇-G₃-Y₈—Z₃ include groups shown by —Y₂-(G₁-Y₁)ₐ—Z₁ and —Y₅-(G₂-Y₆)ᵦ—Z₂ described later in which a and b are 1.

In the polymerizable liquid crystal compound according to the present invention, it is preferable that (1) $X_1$ to $X_8$ be hydrogen atoms, (2) $X_1$ to $X_5$ and $X_7$ be hydrogen atoms, and $X_6$ and $X_8$ individually be —OCH₃, —OCH₂CH₃, or —CH₃, (3) $X_1$ to $X_5$, $X_7$, and $X_8$ be hydrogen atoms, and $X_6$ be —C(=O)—OCH₃, —C(=O)—OCH₂CH₃, —C(=O)—OCH₂CH₂CH₃, —C(=O)—O—CH₂CH₂OCH₂CH₂CH₃, —C(=O)—OCH₂CH₂CH₂CH₃, —OCH₃, —OCH₂CH₃, —CH₃, —CH₂CH₃, —CH₂CH₂CH₃, or a fluorine atom, (4) $X_2$ to $X_5$, $X_7$, and $X_8$ be hydrogen atoms, and $X_1$ and $X_6$ individually be —C(=O)—OCH₃, —C(=O)—OCH₂CH₃, —C(=O)—OCH₂CH₂CH₃, —C(=O)—O—CH₂CH₂OCH₂CH₂CH₃, —C(=O)—OCH₂CH₂CH₂CH₃, —OCH₃, —OCH₂CH₃, —CH₃, —CH₂CH₃, —CH₂CH₂CH₃, or a fluorine atom, or (5) $X_1$ to $X_4$ and $X_6$ to $X_8$ be hydrogen atoms, and $X_5$ be —C(=O)—OCH₃, —C(=O)—OCH₂CH₃, —C(=O)—OCH₂CH₂CH₃, —C(=O)—O—CH₂CH₂OCH₂CH₂CH₃, —C(=O)—OCH₂CH₂CH₂CH₃, —OCH₃, —OCH₂CH₃, —CH₃, —CH₂CH₃, —CH₂CH₂CH₃, or a fluorine atom, from the viewpoint of availability of the raw material and obtaining the desired polymerizable liquid crystal compound.

It is more preferable that (2a) $X_1$ to $X_5$ and $X_7$ be hydrogen atoms, and $X_6$ and $X_8$ be —OCH₃, (3a) $X_1$ to $X_5$, $X_7$, and $X_8$ be hydrogen atoms, and $X_6$ be —C(=O)—OCH₃, —C(=O)—O—CH₂CH₂OCH₂CH₂CH₃, —C(=O)—O—CH₂CH₂CH₂CH₃, or —O—CH₂CH₃, or (4a) $X_2$ to $X_5$, $X_7$, and $X_8$ be hydrogen atoms, and $X_1$ and $X_6$ individually be —O—CH$_2$CH$_3$, —C(=O)—O—CH$_2$CH$_2$CH$_2$CH$_3$, or —C(=O)—OCH$_3$.

Specific examples of the groups shown by —Y$_2$-(G$_1$-Y$_1$)$_a$—Z$_1$ and —Y$_5$-(G$_2$-Y$_6$)$_b$—Z$_2$ bonded to A$_1$ and A$_2$ are given below. Note that a and b respectively indicate the number of (G$_1$-Y$_1$) units and the number of (G$_2$-Y$_6$) units, and individually represent 0 or 1. It is preferable that a or b be 1, and it is more preferable that a and b be 1, so that the polymerizable liquid crystal compound can be easily synthesized and more advantageously exhibits the desired effects of the present invention.

When a or b is 1, the group shown by —Y$_2$-(G$_1$-Y$_1$)$_a$—Z$_1$ or —Y$_5$-(G$_2$-Y$_6$)$_b$—Z$_2$ has a structure shown by the following formula.

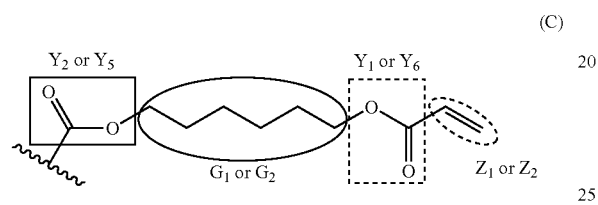

(C)

wherein Y$_2$ or Y$_5$ is —C(=O)—O—, G$_1$ or G$_2$ is a hexamethylene group, Y$_1$ or Y$_6$ is —O—C(=O)—, and Z$_1$ or Z$_2$ is a vinyl group.

Specific examples of the structure shown by the formula (C) are given below.

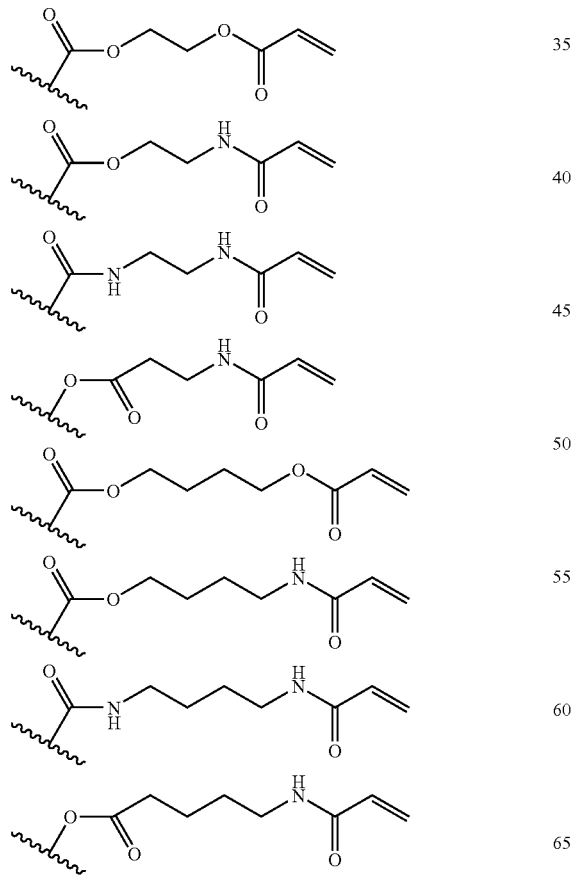

-continued

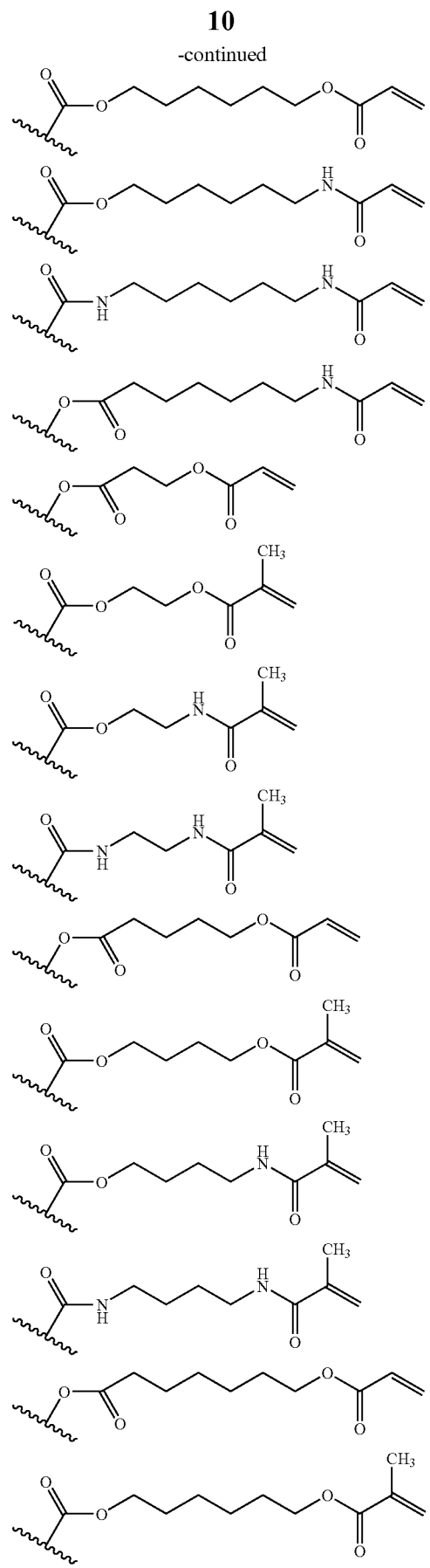

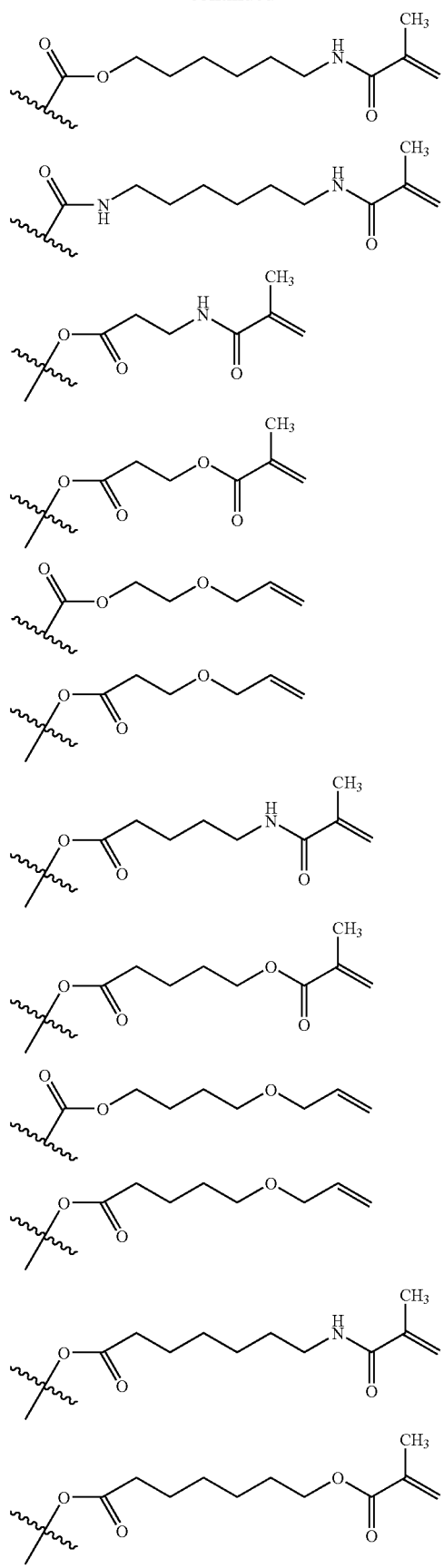
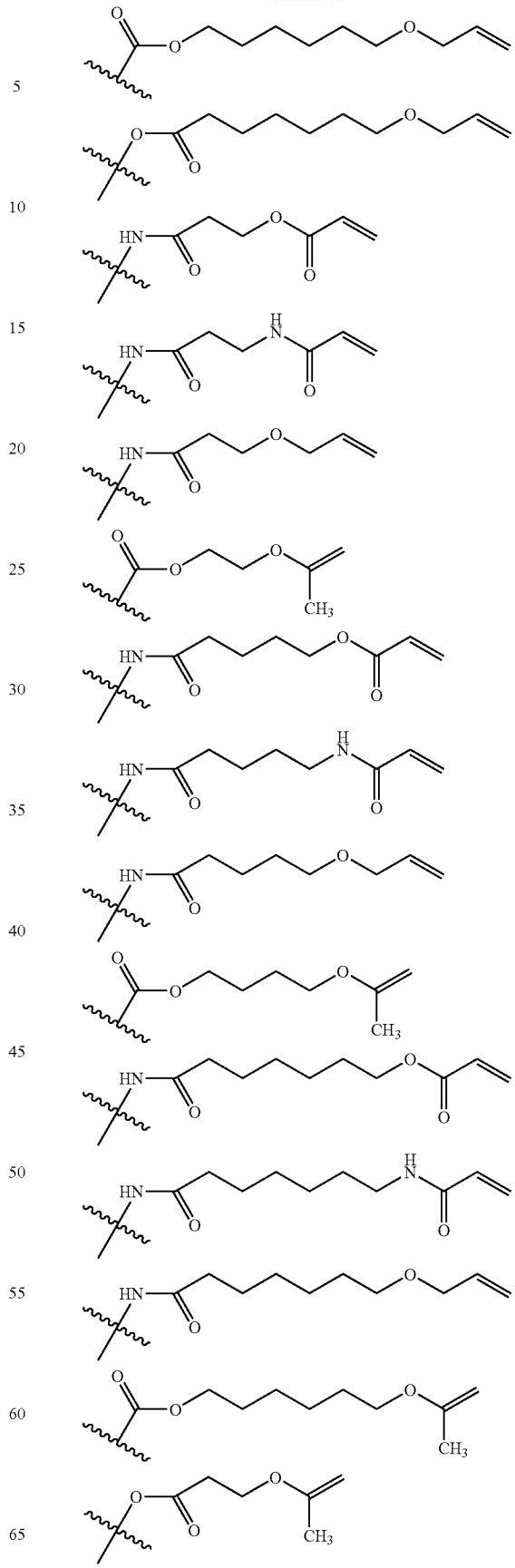

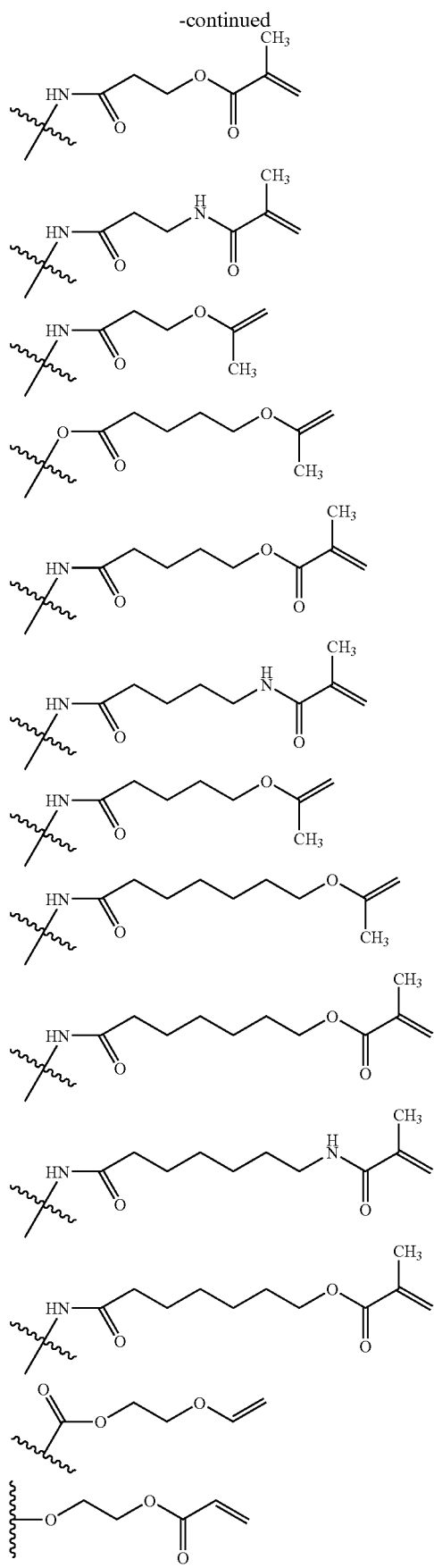
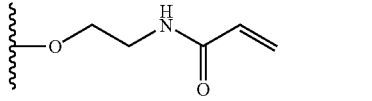
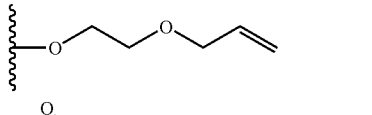
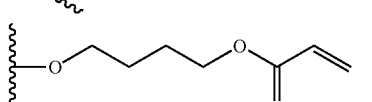
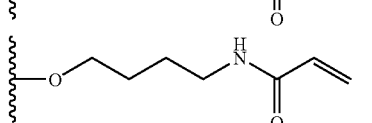
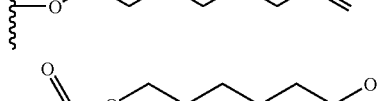
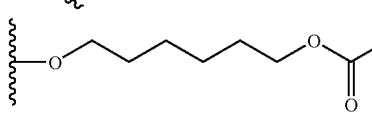
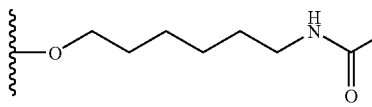
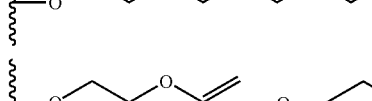
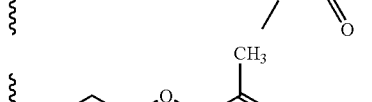
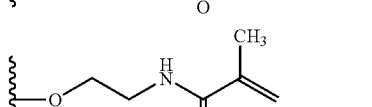
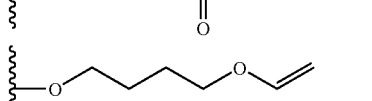
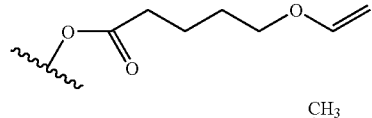
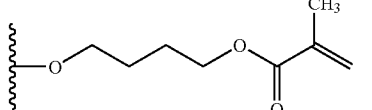

-continued
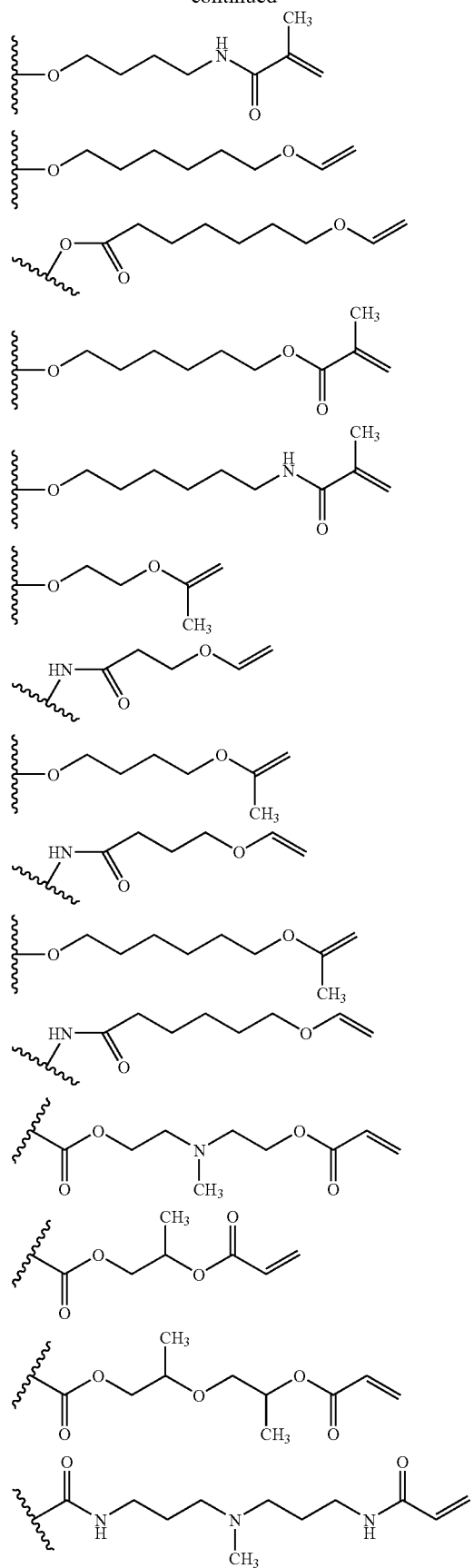
-continued
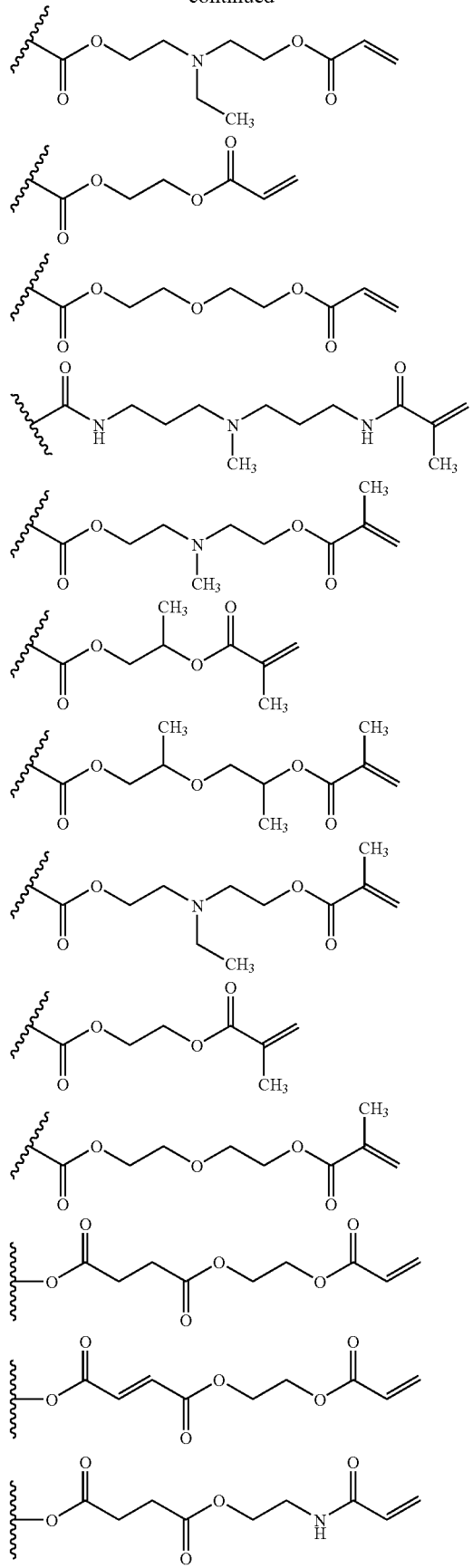

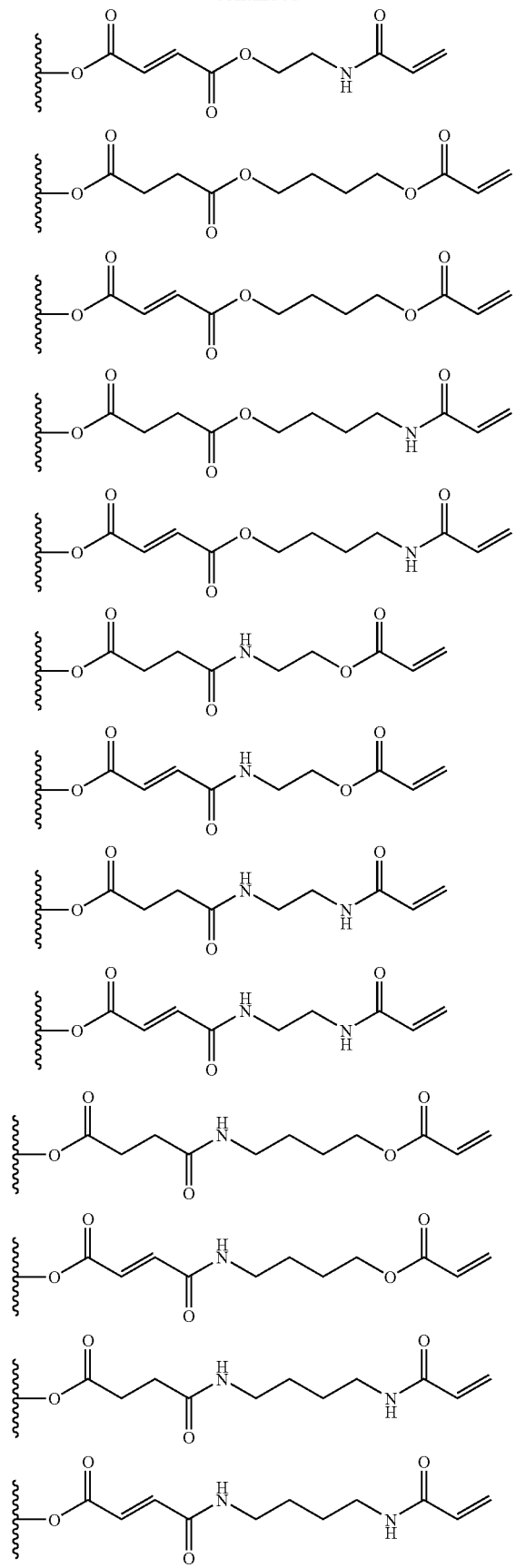
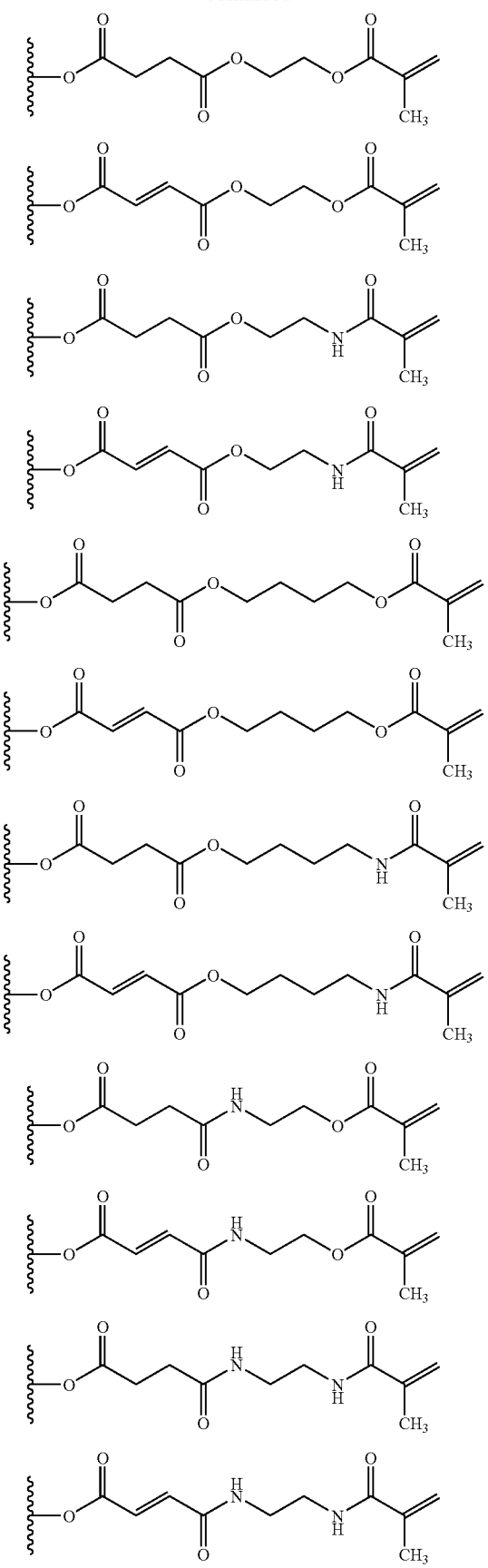

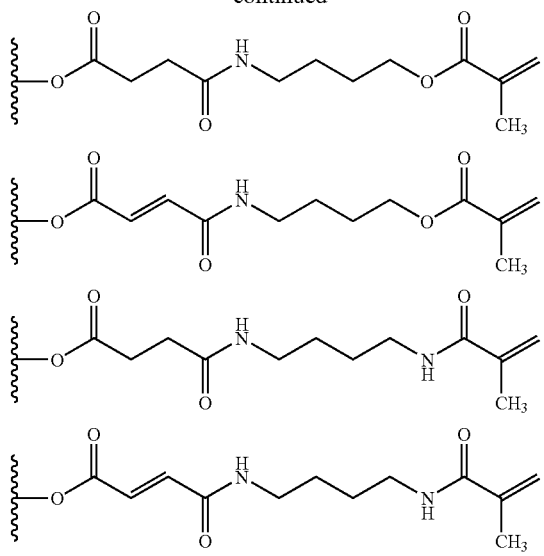

When a or b is 0, the group shown by —$Y_2$-($G_1$-$Y_1$)$_a$—$Z_1$ or —$Y_5$-($G_2$-$Y_6$)$_b$—$Z_2$ has a structure shown by the following formula (D).

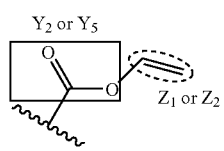

(D)

wherein $Y_2$ or $Y_5$ is —C(=O)—O—, and $Z_1$ or $Z_2$ is a vinyl group.

Specific examples of the structure shown by the formula (D) are given below.

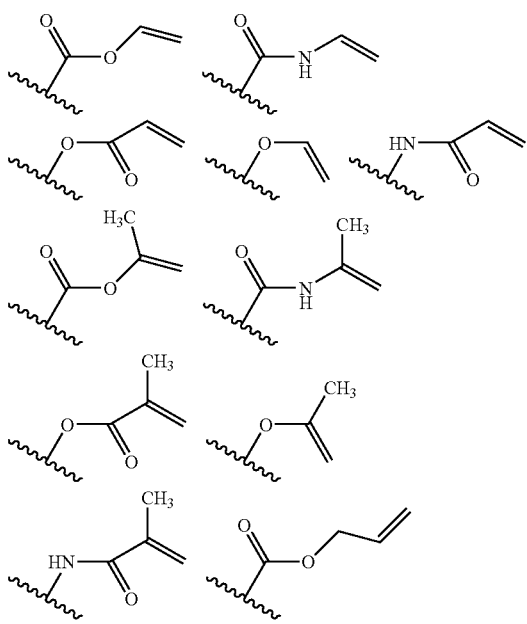

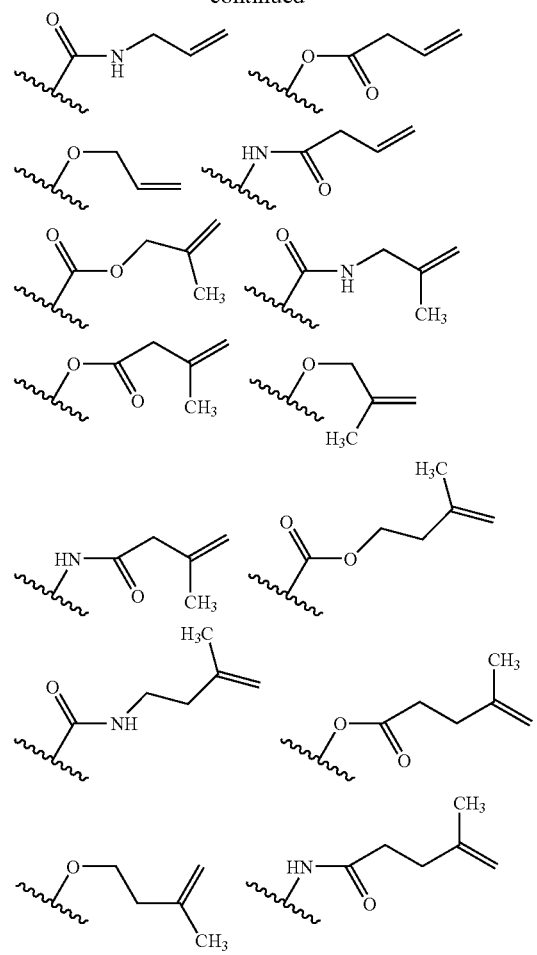

$A_1$ and $A_2$ individually represent divalent organic groups A having 1 to 30 carbon atoms. The number of carbon atoms of the organic group A is preferably 6 to 20. The organic groups A represented by $A_1$ and $A_2$ are not particularly limited, but preferably have an aromatic ring.

The organic groups represented by $A_1$ and $A_2$ may have a substituent. The organic groups represented by $A_1$ and $A_2$ may have a plurality of identical or different substituents at arbitrary positions.

Examples of the substituent include halogen atoms such as a fluorine atom and a chlorine atom; a cyano group; a hydroxyl group; alkyl groups having 1 to 6 carbon atoms such as a methyl group and an ethyl group; alkoxy groups having 1 to 6 carbon atoms such as a methoxy group and an ethoxy group; a nitro group; —C(=O)—OR; and the like. Note that R represents an alkyl group having 1 to 6 carbon atoms such as a methyl group or an ethyl group, or a substituted or unsubstituted phenyl group such as a phenyl group or a 4-methylphenyl group.

Among these, a halogen atom, an alkyl group having 1 to 6 carbon atoms, and an alkoxy group having 1 to 6 carbon atoms are preferable, and a fluorine atom, a methyl group, an ethyl group, a propyl group, a methoxy group, and an ethoxy group are more preferable.

Specific examples of the organic groups represented by $A_1$ and $A_2$ are given below.

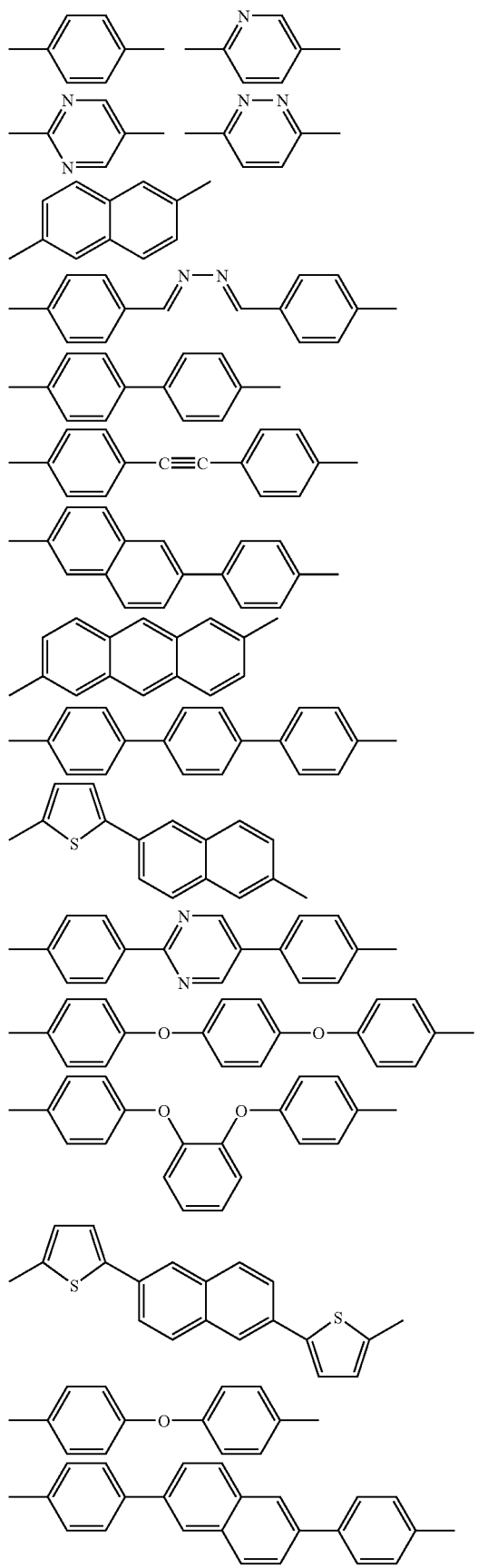

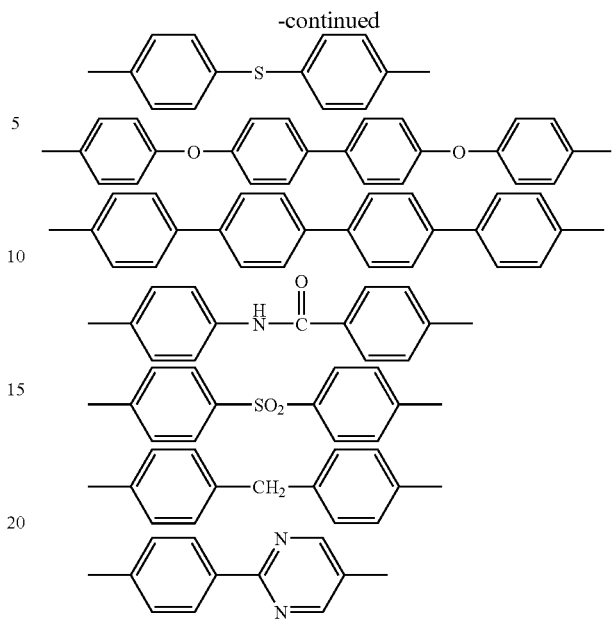

The organic groups given as specific examples of the organic groups represented by $A_1$ and $A_2$ may have a substituent at an arbitrary position. Examples of the substituent include halogen atoms, a cyano group, a hydroxyl group, alkyl groups having 1 to 6 carbon atoms, alkoxy groups having 1 to 6 carbon atoms, a nitro group, a group shown by —C(=O)—OR, and the like. Note that R represents an alkyl group having 1 to 6 carbon atoms. Among these, a halogen atom, an alkyl group, and an alkoxy group are preferable. A fluorine atom is preferable as the halogen atom. A methyl group, an ethyl group, and a propyl group are preferable as the alkyl group. A methoxy group and an ethoxy group are preferable as the alkoxy group.

The organic groups represented by $A_1$ and $A_2$ are preferably groups shown by the following formula $(A_{11})$, $(A_{21})$, or $(A_{31})$ that may have a substituent, and more preferably the groups shown by the following formula $(A_{11})$ that may have a substituent.

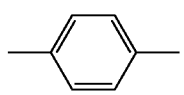
$(A_{11})$

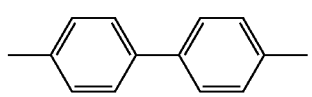
$(A_{21})$

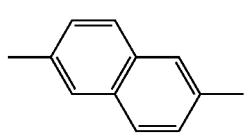
$(A_{31})$

In the polymerizable liquid crystal compound according to the present invention shown by the formula (I), the groups shown by the following formulas may be the same or different.

$Z_1\text{-}[Y_1\text{-}G_1]_a\text{-}Y_2\text{-}A_1\text{-}Y_3\text{-}$ $\text{-}Y_4\text{-}A_2\text{-}Y_5\text{-}[G_2\text{-}Y_6]_b\text{-}Z_2$ The polymerizable liquid crystal compound according to the present invention is preferably any of the following compounds (α) to (∈).

(α) Compound shown by the formula (I) in which $A_1$ and $A_2$ individually represent a substituted or unsubstituted phenylene group, a substituted or unsubstituted biphenylene group, or a substituted or unsubstituted naphthylene group.

(β) Compound shown by the formula (I) in which $Z_1$ and $Z_2$ individually represent $CH_2$=CH—, $CH_2$=C($CH_3$)—, $CH_2$=CH—$CH_2$—, $CH_3$—CH=CH—, $CH_2$=CH—$CH_2$—$CH_2$—, $CH_2$=C($CH_3$)—$CH_2$—$CH_2$—, $(CH_3)_2$C$CH_2CH_2$—, $(CH_3)_2$C=CH—$CH_2$—$CH_2$—, $CH_2$=C(Cl)—, $CH_2$=C($CH_3$)—$CH_2$—, or $CH_3$—CH=CH—$CH_2$—.

(γ) Compound shown by the formula (I) in which $Y_1$ to $Y_6$ individually represent —O—, —C(=O)—O—, or —O—C(=O)—, $G_1$ and $G_2$ individually represent —$(CH_2)_6$— or —$(CH_2)_4$— (provided that —O—, —C(=O)—O—, or —O—C(=O)— may be included in the these groups), $Z_1$ and $Z_2$ individually represent $CH_2$=CH—, $CH_2$=C($CH_3$)—, or $CH_2$=C(Cl)—, $A_1$ and $A_2$ individually represent one of the groups shown by the following formulas, and

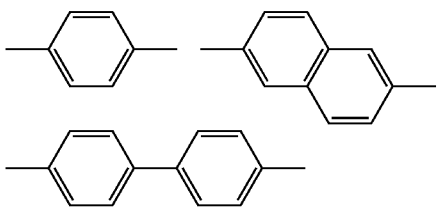

$X_1$ to $X_8$ individually represent a hydrogen atom, a halogen atom, an alkyl group having 1 to 10 carbon atoms, —C(=O)—$OR^3$, —O—C(=O)—$R^3$, or —$OR^3$ (wherein $R^3$ represents a hydrogen atom or a substituted or unsubstituted alkyl group having 1 to 10 carbon atoms, provided that, when $R^3$ represents an alkyl group, —O—, —C(=O)—O—, or —O—C(=O)— may be included in the alkyl group (excluding a case where two or more —O— linkages are adjacently included in the alkyl group)).

(δ) Compound shown by the formula (I) in which $Y_1$ to $Y_6$ individually represent —O—, —C(=O)—O—, or —O—C(=O)—, $G_1$ and $G_2$ individually represent —$(CH_2)_6$— or —$(CH_2)_4$—, $Z_1$ and $Z_2$ individually represent $CH_2$=CH— or $CH_2$=C($CH_3$)—, $A_1$ and $A_2$ represent the groups shown by the following formula, and

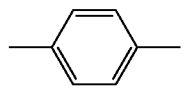

$X_1$ to $X_8$ individually represent a hydrogen atom, a halogen atom, an alkyl group having 1 to 10 carbon atoms, —C(=O)—$OR^3$, —O—C(=O)—$R^3$, or —$OR^3$ (wherein $R^3$ represents a hydrogen atom or a substituted or unsubstituted alkyl group having 1 to 10 carbon atoms, provided that, when $R^3$ represents an alkyl group, —O—, —C(=O)—O—, or —O—C(=O)— may be included in the alkyl group (excluding a case where two or more —O— linkages are adjacently included in the alkyl group)).

(∈) Compound shown by the formula (I) in which $Y_1$ to $Y_6$ individually represent —O—, —C(=O)—O—, or —O—C(=O)—, $G_1$ and $G_2$ individually represent —$(CH_2)_6$— or —$(CH_2)_4$—, $Z_1$ and $Z_2$ represent $CH_2$=CH—, $A_1$ and $A_2$ represent the groups shown by the following formula, and

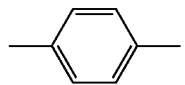

$X_1$ to $X_8$ individually represent a hydrogen atom, —C(=O)—O—$R^3$, or —$OR^3$ (wherein $R^3$ represents a hydrogen atom or a substituted or unsubstituted alkyl group having 1 to 10 carbon atoms).

Preferable specific examples of the polymerizable liquid crystal compound according to the present invention shown by the formula (I) are given below. Note that the polymerizable liquid crystal compound according to the present invention is not limited to the following compounds.

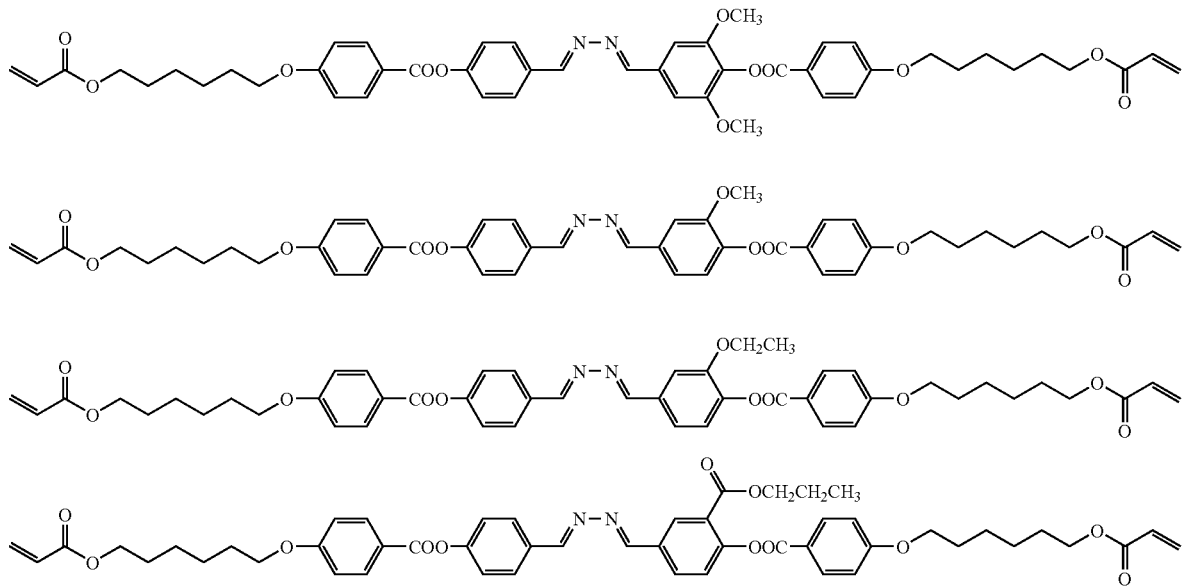

-continued
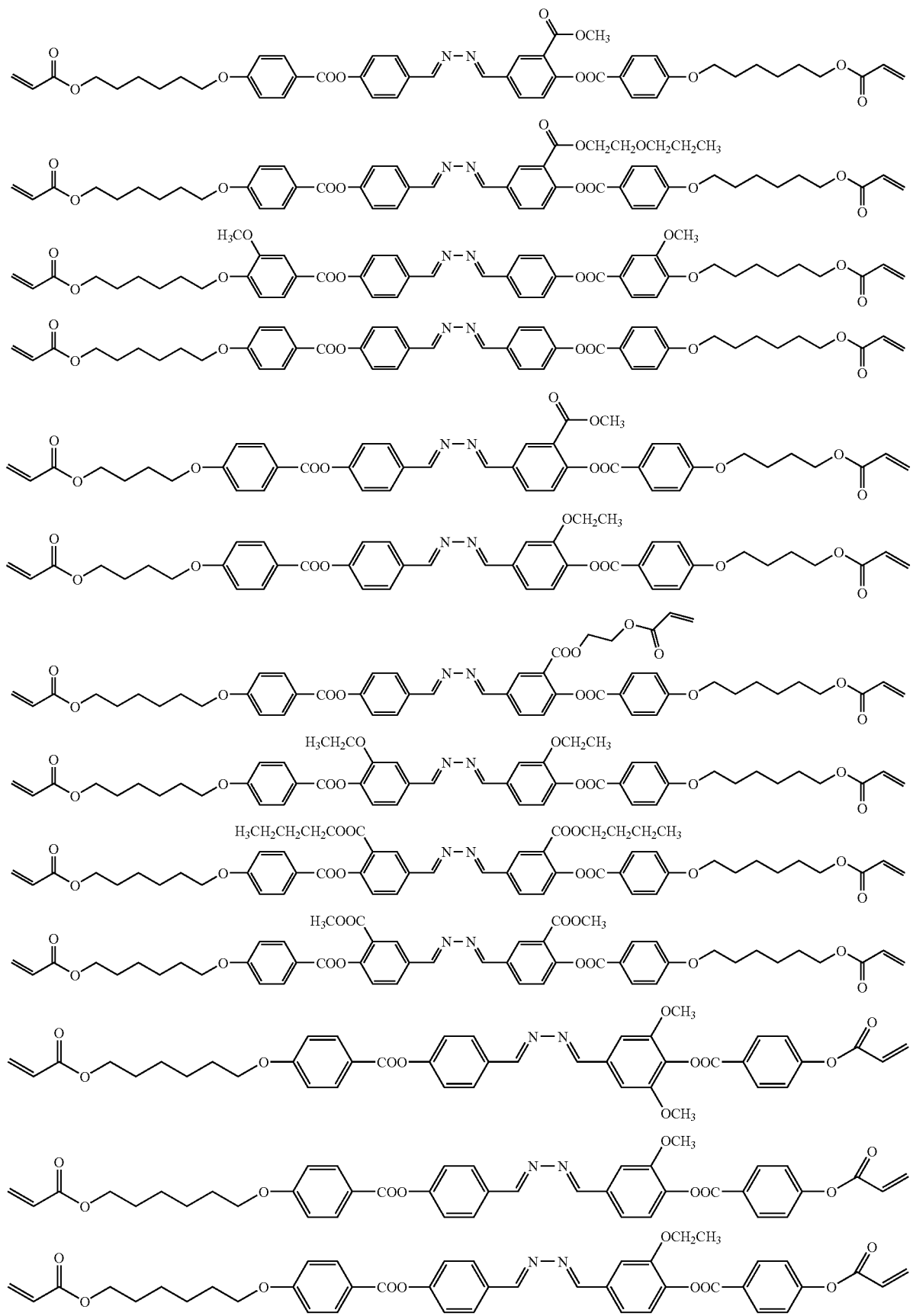

-continued
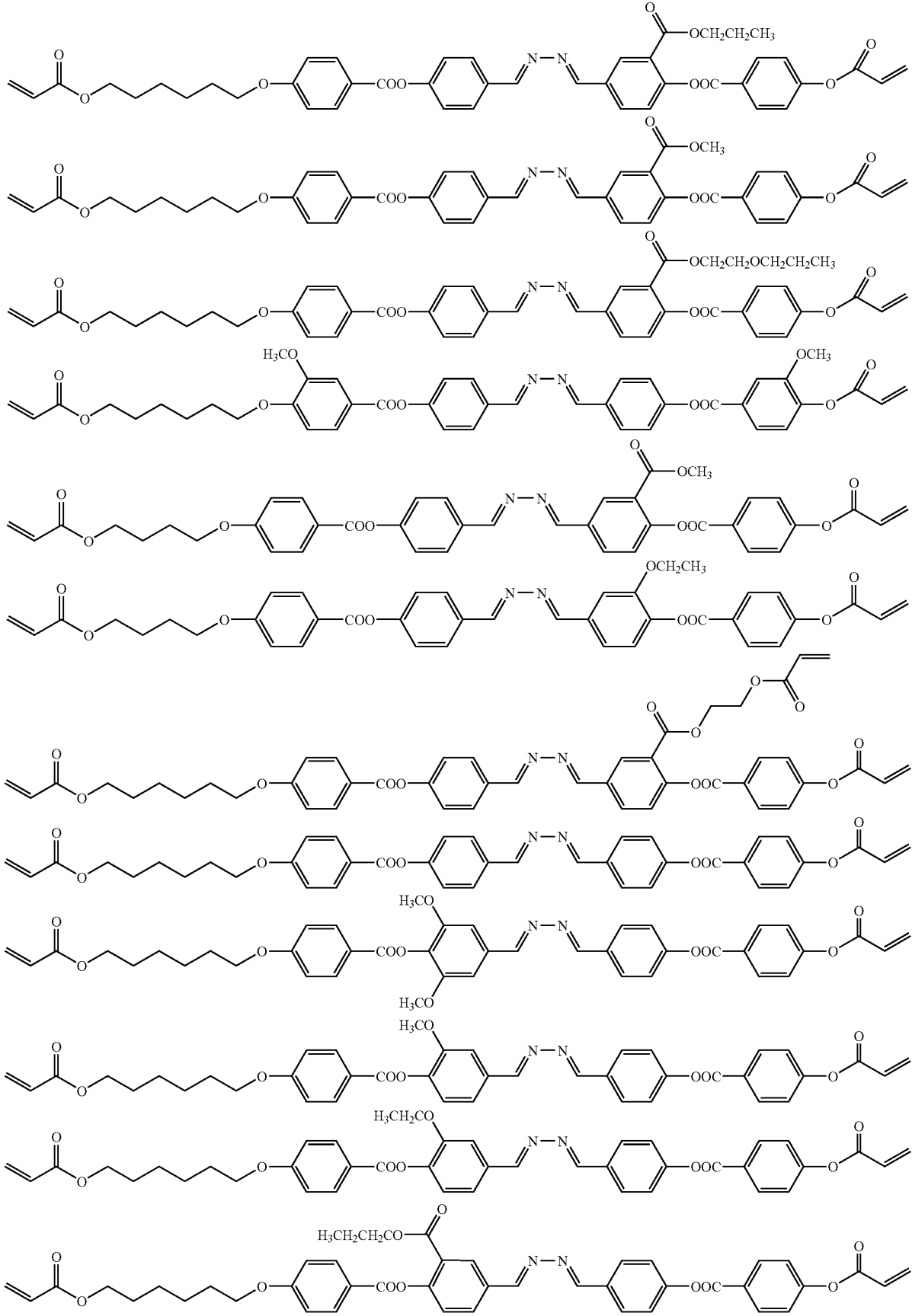

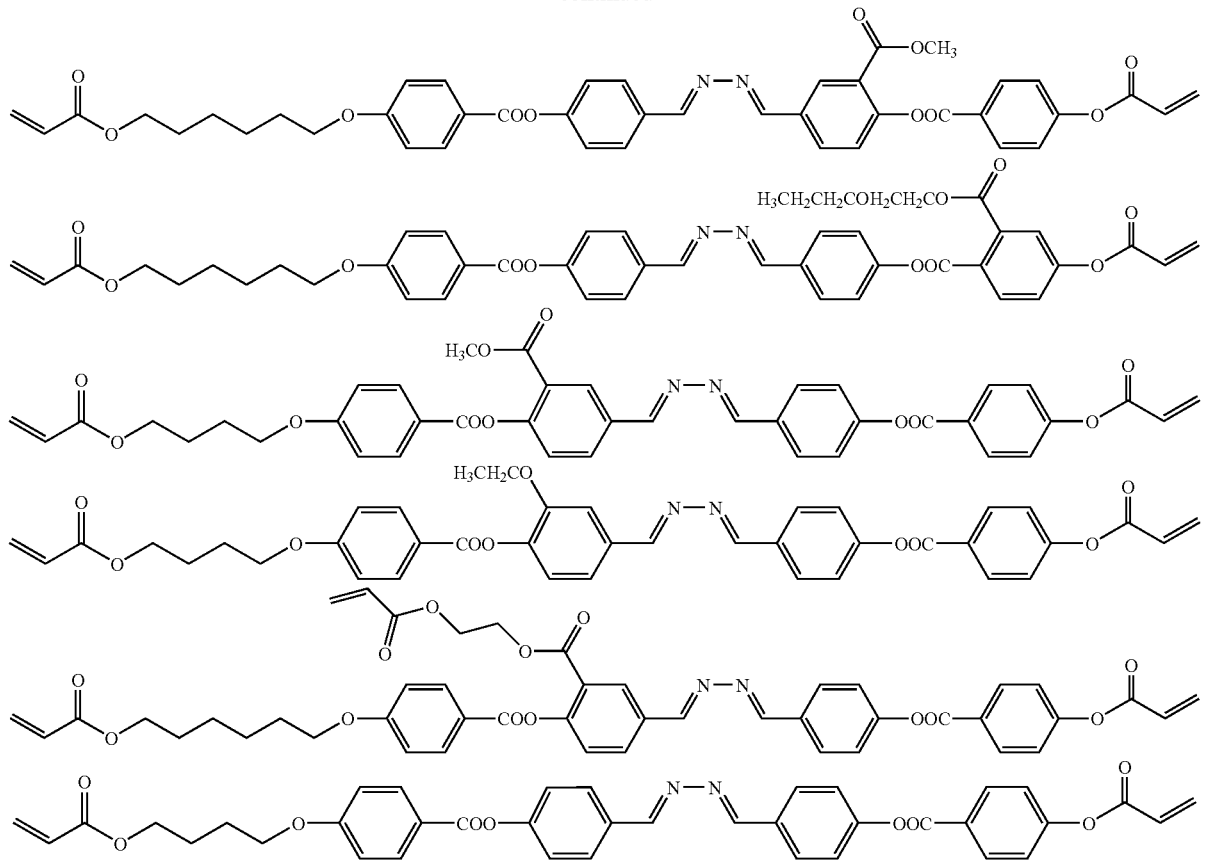

The polymerizable liquid crystal compound according to the present invention may be prepared by combining known methods that form various chemical bonds (e.g., —O—, —S—, —NH—C(=O)—, —C(=O)NH—, —NHC(=O)NH—, —O—C(=O)—, or —C(=O)—O—) (refer to Sandler and Karo, Organic Functional Group Preparations [I] and [II], Hirokawa Publishing, 1976, for example).

The polymerizable liquid crystal compound according to the present invention may be normally prepared by appropriately bonding and modifying a plurality of known compounds having a desired structure by arbitrarily combining an ether bond (—O—) formation reaction, an ester bond (—C(=O)—O—) formation reaction, an amide bond (—C(=O)NH—) formation reaction, and an acid chloride (—COCl) formation reaction.

An ether bond may be formed as follows, for example.
(i) A compound shown by Q1-X (wherein X represents a halogen atom) and a compound shown by Q2-OM (wherein M represents an alkali metal (mainly sodium)) are mixed and condensed. Note that Q1 and Q2 represent arbitrary organic groups B (hereinafter the same). This reaction is generally referred to as Williamson synthesis.
(ii) A compound shown by Q1-X (wherein X represents a halogen atom) and a compound shown by Q2-OH are mixed and condensed in the presence of a base (e.g., sodium hydroxide or potassium hydroxide).
(iii) A compound shown by Q1-E (wherein E represents an epoxy group) and a compound shown by Q2-OH are mixed and condensed in the presence of a base (e.g., sodium hydroxide or potassium hydroxide).
(iv) A compound shown by Q1-OFN (wherein OFN represents a group having an unsaturated bond) and a compound shown by Q2-OM (wherein M represents an alkali metal (mainly sodium)) are mixed and subjected to an addition reaction in the presence of a base (e.g., sodium hydroxide or potassium hydroxide).
(v) A compound shown by Q1-X (wherein X represents a halogen atom) and a compound shown by Q2-OM (wherein M represents an alkali metal (mainly sodium)) are mixed and condensed in the presence of copper or cuprous chloride. This reaction is generally referred to as Ullmann condensation.

An ester bond and an amide bond may be formed as follows, for example.
(i) A compound shown by Q1-COOH and a compound shown by Q2-OH or Q2-NH$_2$ are subjected to dehydration/condensation in the presence of a dehydration/condensation agent (e.g., N,N-dicyclohexylcarbodiimide).
(ii) A compound shown by Q1-COOH is reacted with a halogenating agent to obtain a compound shown by Q1-COX (wherein X represents a halogen atom), and the compound shown by Q1-COX and a compound shown by Q2-OH or Q2-NH$_2$ are reacted in the presence of a base.
(iii) A compound shown by Q1-COOH is reacted with an acid anhydride to obtain a mixed acid anhydride, and the mixed acid anhydride is reacted with a compound shown by Q2-OH or Q2-NH$_2$.
(iv) A compound shown by Q1-COOH and a compound shown by Q2-OH or Q2-NH$_2$ are subjected to dehydration/condensation in the presence of an acid catalyst or a base catalyst.

An acid chloride may be formed as follows, for example.

(i) A compound shown by Q1-COOH is reacted with phosphorus trichloride or phosphorus pentachloride.

(ii) A compound shown by Q1-COOH is reacted with thionyl chloride.

(iii) A compound shown by Q1-COOH is reacted with oxalyl chloride.

(iv) A compound shown by Q1-COOAg (wherein Ag represents silver) is reacted with chlorine or bromine.

(v) A compound shown by Q1-COOH is reacted with a carbon tetrachloride solution of red mercuric oxide.

When synthesizing the polymerizable liquid crystal compound according to the present invention, yields can be improved by protecting a hydroxyl group of an intermediate. A hydroxyl group may be protected by a known method (e.g., Greene's Protective Groups in Organic Synthesis, 3rd version: Wiley-Interscience, 1999).

A hydroxyl group may be protected as follows, for example.

(i) A compound shown by Q1Q2Q3-Si—X (wherein X represents a halogen atom; hereinafter the same) and a compound shown by Q4-OH are reacted in the presence of a base (e.g., imidazole or pyridine). Note that Q1 to Q4 represent arbitrary organic groups B (hereinafter the same).

(ii) A vinyl ether (e.g., 3,4-dihydro-2H-pyran) and a compound shown by Q2-OH are reacted in the presence of an acid (e.g., p-toluenesulfonic acid, p-toluenesulfonic acid pyridine salt, or hydrogen chloride).

(iii) A compound shown by Q1-C(=O)—OR and a compound shown by Q4-OH are reacted in the presence of a base (e.g., triethylamine or pyridine).

(iv) An acid anhydride compound shown by Q1-C(=O)—O—C(=O)-Q2 and a compound shown by Q3-OH are reacted optionally in the presence of a base (e.g., sodium hydroxide or triethylamine).

(v) A compound shown by Q1-X and a compound shown by Q2-OH are reacted in the presence of a base (e.g., sodium hydroxide or triethylamine).

(vi) A compound shown by Q1-O—CH$_2$—X and a compound shown by Q2-OH are reacted in the presence of a base (e.g., sodium hydride, sodium hydroxide, triethylamine, or pyridine).

(vii) A compound shown by Q1-O—CH2-C(=O)—X and a compound shown by Q4-OH are reacted in the presence of a base (e.g., potassium carbonate or sodium hydroxide).

(viii) A compound shown by Q1-O—C(=O)—X and a compound shown by Q2-OH are reacted in the presence of a base (e.g., triethylamine or pyridine).

A method of deprotecting a hydroxyl group is not particularly limited. For example, the following methods may be used.

(i) A hydroxyl group is deprotected by mixing with a fluorine ion (e.g., tetrabutylammonium fluoride).

(ii) A hydroxyl group is deprotected with mixing in the presence of an acid (e.g., p-toluenesulfonic acid, p-toluenesulfonic acid pyridine salt, hydrogen chloride, or acetic acid).

(iii) A hydroxyl group is deprotected with mixing in the presence of a base (e.g., sodium hydride, sodium hydroxide, potassium hydroxide, sodium carbonate, potassium carbonate, triethylamine, or pyridine).

(iv) A hydroxyl group is deprotected by hydrogenation in the presence of a catalyst (e.g., Pd—C).

These methods may be appropriately used corresponding to the structure and the type of the protecting group.

The product may be isolated by performing a post-treatment operation normal employed in organic chemistry after completion of the reaction, followed by a known purification/separation means such as column chromatography, recrystallization, or distillation, as required.

The structure of the product may be identified by measurement, elementary analysis, or the like (e.g., NMR spectrum, IR spectrum, or mass spectrum).

2) Polymerizable Liquid Crystal Composition

The second aspect of the present invention provides a polymerizable liquid crystal composition comprising the polymerizable liquid crystal compound according to the present invention, and a polymerizable chiral compound that is polymerizable with the polymerizable liquid crystal compound.

The composition according to the present invention includes one or more types of the polymerizable liquid crystal compounds according to the present invention as an essential component. The composition according to the present invention may include a known polymerizable liquid crystal compound disclosed in JP-A-11-130729, JP-A-8-104870, JP-A-2005-309255, JP-A-2005-263789, JP-A-2002-533742, JP-A-2002-308832, JP-A-2002-265421, JP-A-62-070406, JP-A-11-100575, or the like (hereinafter may be referred to as "additional polymerizable liquid crystal compound") in addition to the polymerizable liquid crystal compound according to the present invention.

The content of the additional polymerizable liquid crystal compound in the composition according to the present invention is not particularly limited, but is preferably 50 wt % or less, and more preferably 30 wt % or less, based on the total amount of the polymerizable liquid crystal compounds used in the present invention.

The polymerizable chiral compound included in the composition according to the present invention is not particularly limited insofar as the polymerizable chiral compound has an asymmetric carbon in the molecule, is polymerizable with the polymerizable liquid crystal compound according to the present invention, and does not adversely affect the alignment of the polymerizable liquid crystal compound according to the present invention.

The term "polymerization" used herein refers to a normal polymerization reaction and a chemical reaction in a broad sense including a crosslinking reaction.

The composition according to the present invention may include one or more types of the polymerizable chiral compounds.

The polymerizable liquid crystal compound according to the present invention included in the polymerizable liquid crystal composition according to the present invention can form a cholesteric phase when mixed with the polymerizable chiral compound.

As the polymerizable chiral compound, a known polymerizable chiral compound disclosed in JP-A-11-193287 or the like may be used. Examples of the polymerizable chiral compound include compounds shown by the following general formulas and the like. Note that the polymerizable chiral compound is not limited thereto.

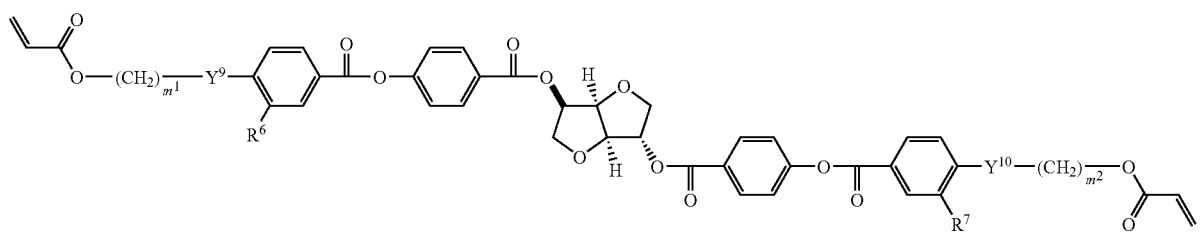
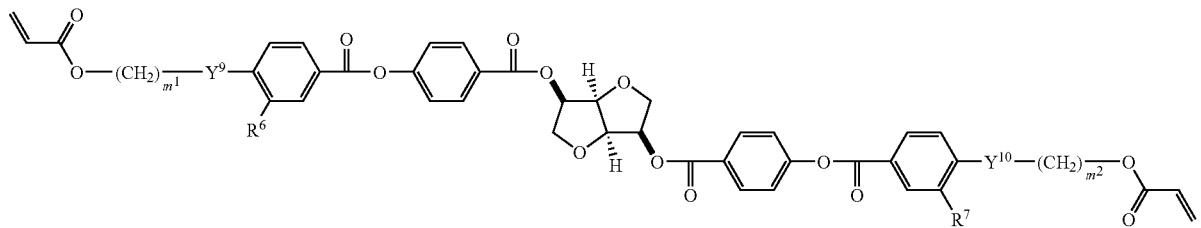
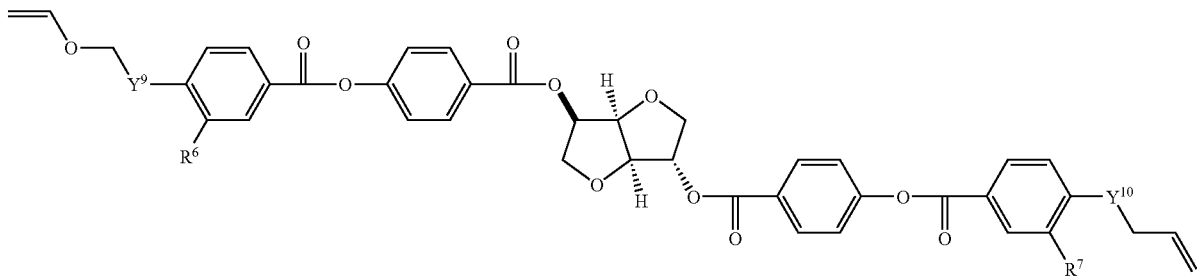
35
wherein $R^6$ and $R^7$ represent a hydrogen atom, a methyl group, a methoxy group, or the like, $Y^9$ and $Y^{10}$ represent —O—, —O—C(=O)—, —O—C(=O)—O—, or the like, and $m^1$ and $m^2$ individually represent 2, 4, or 6.
Specific examples of the compounds shown by the above general formulas include the following compounds.

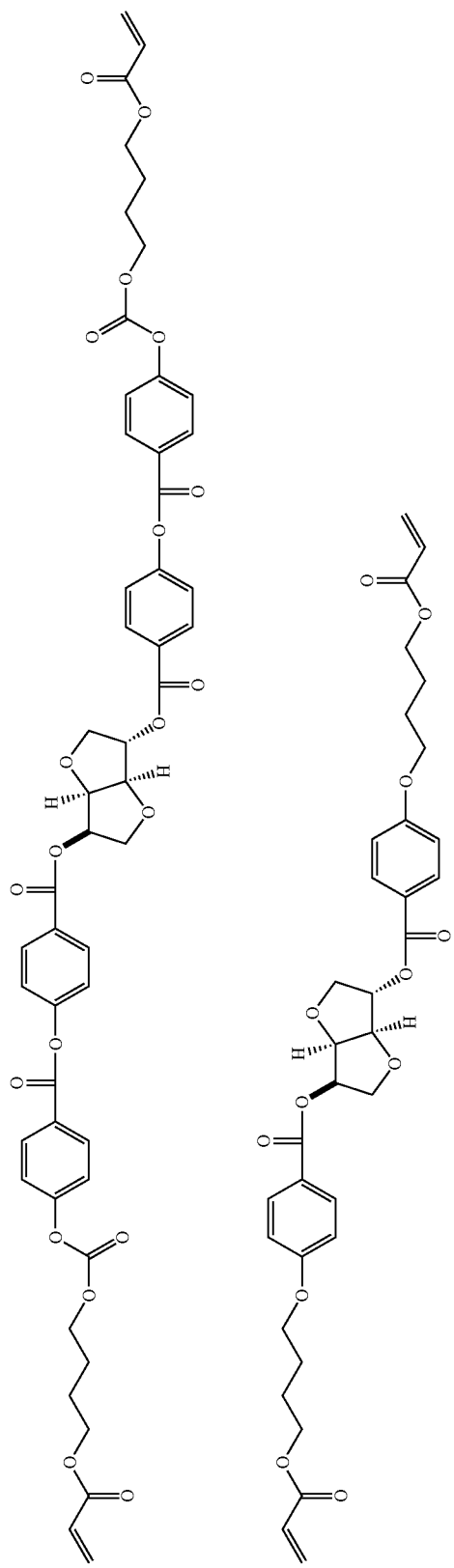

The polymerizable chiral compound is used in the polymerizable liquid crystal composition according to the present invention in an amount of 0.1 to 100 parts by weight, and preferably 0.5 to 10 parts by weight, based on 100 parts by weight of the polymerizable liquid crystal compound.

It is preferable to add a polymerization initiator to the polymerizable liquid crystal composition according to the present invention from the viewpoint of ensuring an efficient polymerization reaction. Examples of the polymerization initiator include polymerization initiators described later in section "3) Liquid crystalline polymer". The polymerization initiator is used in the polymerizable liquid crystal composition according to the present invention in an amount of 0.1 to 30 parts by weight, and preferably 0.5 to 10 parts by weight, based on 100 parts by weight of the polymerizable liquid crystal compound.

It is preferable to add a surfactant to the polymerizable liquid crystal composition according to the present invention in order to adjust the surface tension of the composition. The surfactant is not particularly limited, but is preferably a nonionic surfactant. Examples of the surfactant include a nonionic surfactant that is an oligomer having a molecular weight of about several thousand, such as "KH-40" (manufactured by AGC Seimi Chemical Co., Ltd.). The surfactant is used in the polymerizable liquid crystal composition according to the present invention in an amount of 0.01 to 10 parts by weight, and preferably 0.1 to 2 parts by weight, based on 100 parts by weight of the polymerizable liquid crystal compound.

When using the polymerizable liquid crystal composition according to the present invention as a raw material for a polarizing film or an alignment film, a printing ink, a paint, a protective film, or the like, additives such as other copolymerizable monomers, a metal, a metal complex, a dye, a pigment, a fluorescent material, a phosphorescent material, a leveling agent, a thixotropic agent, a gelling agent, a polysaccharide, a UV absorber, an IR (infrared) absorber, an antioxidant, an ion-exchange resin, or a metal oxide (e.g., titanium oxide) may be added to the polymerizable liquid crystal composition in addition to the above components. Each additive is used in the polymerizable liquid crystal composition according to the present invention in an amount of 0.1 to 20 parts by weight based on 100 parts by weight of the polymerizable liquid crystal compound.

The polymerizable liquid crystal composition according to the present invention may be produced by dissolving given amounts of the polymerizable liquid crystal compound according to the present invention, the polymerizable chiral compound, the photoinitiator, the nonionic surfactant, and optional additives in an appropriate solvent.

Examples of the solvent include ketones such as cyclopentanone, cyclohexanone, and methyl ethyl ketone; esters such as butyl acetate and amyl acetate; halogenated hydrocarbons such as chloroform, dichloromethane, and dichloroethane; ethers such as 1,2-dimethoxyethane, 1,4-dioxane, cyclopentyl methyl ether, tetrahydrofuran, and tetrahydropyran; and the like.

The polymerizable liquid crystal composition thus obtained is useful as a raw material for a cholesteric liquid crystal layer or a cholesteric liquid crystalline polymer (described later).

3) Liquid Crystalline Polymer

The third aspect of the present invention provides a liquid crystalline polymer obtained by polymerizing the polymerizable liquid crystal compound according to the present invention or the polymerizable liquid crystal composition according to the present invention.

The term "polymerization" used herein refers to a normal polymerization reaction and a chemical reaction in a broad sense including a crosslinking reaction.

The liquid crystalline polymer according to the present invention is (1) a liquid crystalline polymer obtained by polymerizing the polymerizable liquid crystal compound according to the present invention, or (2) a liquid crystalline polymer obtained by polymerizing the polymerizable liquid crystal composition according to the present invention.

(1) Liquid Crystalline Polymer Obtained by Polymerizing the Polymerizable Liquid Crystal Compound According to the Present Invention Examples of the liquid crystalline polymer obtained by polymerizing the polymerizable liquid crystal compound according to the present invention include a homopolymer of the polymerizable liquid crystal compound according to the present invention, a copolymer of two or more types of the polymerizable liquid crystal compounds according to the present invention, a copolymer of the polymerizable liquid crystal compound according to the present invention and another polymerizable liquid crystal compound, a copolymer of the polymerizable liquid crystal compound according to the present invention and a monomer that is copolymerizable with the polymerizable liquid crystal compound according to the present invention, and the like.

Examples of the monomer that is copolymerizable with the polymerizable liquid crystal compound include, but are not limited to, 4'-methoxyphenyl 4-(2-methacryloyloxyethyloxy)benzoate, biphenyl 4-(6-methacryloyloxyhexyloxy)benzoate, 4'-cyanobiphenyl 4-(2-acryloyloxyethyloxy)benzoate, 4'-cyanobiphenyl 4-(2-methacryloyloxyethyloxy)benzoate, 3',4'-difluorophenyl 4-(2-methacryloyloxyethyloxy)benzoate, naphthyl 4-(2-methacryloyloxyethyloxy)benzoate, 4-acryloyloxy-4'-decylbiphenyl, 4-acryloyloxy-4'-cyanobiphenyl, 4-(2-acryloyloxyethyloxy)-4'-cyanobiphenyl, 4-(2-methacryloyloxyethyloxy)-4'-methoxybiphenyl, 4-(2-methacryloyloxyethyloxy)-4'-(4''-fluorobenzyloxy)-biphenyl, 4-acryloyloxy-4'-propylcyclohexylphenyl, 4-methacryloyl-4'-butylbicyclohexyl, 4-acryloyl-4'-amyltolan, 4-acryloyl-4'-(3,4-difluorophenyl)bicyclohexyl, (4-amylphenyl) 4-(2-acryloyloxyethyl)benzoate, (4-(4'-propylcyclohexyl)phenyl) 4-(2-acryloyloxyethyl)benzoate, and the like.

When the liquid crystalline polymer according to the present invention is a copolymer of the polymerizable liquid crystal compound according to the present invention and another polymerizable liquid crystal compound, the content of the units of the polymerizable liquid crystal compound according to the present invention is not particularly limited, but is preferably 50 wt % or more, and more preferably 70 wt % or more, based on the amount of the total units. If the content of the units of the polymerizable liquid crystal compound according to the present invention is within the above range, a liquid crystalline polymer that has a high glass transition temperature (Tg) and high film hardness can be obtained.

The polymerizable liquid crystal compound according to the present invention may be polymerized or copolymerized with a monomer or the like that is copolymerizable with the polymerizable liquid crystal compound in the presence of an appropriate polymerization initiator. The polymerization initiator is used in an amount similar to that of the polymerization initiator used in the polymerizable liquid crystal composition.

The polymerization initiator may be appropriately selected corresponding to the type of the polymerizable group included in the polymerizable liquid crystal compound. For example, a radical polymerization initiator may be used when the polymerizable group is a radically polymerizable group. An anionic polymerization initiator may be used when the polymerizable group is an anionically polymerizable group. A cationic polymerization initiator may be used when the polymerizable group is a cationically polymerizable group.

As the radical polymerization initiator, a thermal radical generator or a photo-radical generator may be used. It is preferable to use a photo-radical generator.

Examples of the photo-radical generator include benzoins such as benzoin, benzoin methyl ether, and benzoin propyl ether; acetophenone such as acetophenone, 2,2-dimethoxy-2-phenylacetophenone, 2,2-diethoxy-2-phenylacetophenone, 1,1-dichloroacetophenone, 1-hydroxycyclohexyl phenyl ketone, 2-methyl-1-[4-(methylthio)phenyl]-2-morpholino-propan-1-one, and N,N-dimethylaminoacetophenone; anthraquinones such as 2-methylanthraquinone, 1-chloroanthraquinone, and 2-amylanthraquinone; thioxanethones such as 2,4-dimethylthioxanethone, 2,4-diethylthioxanthone, 2-chlorothioxanthone, and 2,4-diisopropylthioxanethone; ketals such as acetophenone dimethyl ketal and benzyl dimethyl ketal; benzophenones such as benzophenone, methylbenzophenone, 4,4-dichlorobenzophenone, 4,4-bisdiethylaminobenzophenone, Michler's ketone, and 4-benzoyl-4-methyldiphenyl sulfide; 2,4,6-trimethylbenzoyldiphenylphosphine oxide; and the like.

Specific examples of the photo-radical generator include Irgacure 907, Irgacure 184, Irgacure 369, Irgacure 651 (manufactured by Ciba Specialty Chemicals, Co., Ltd.), and the like.

Examples of the anionic polymerization initiator include alkyllithium compounds; monolithium salts or monosodium salts of biphenyl, naphthalene, pyrene, and the like; polyfunctional initiators such as dilithiums salts and trilithium salts; and the like.

Examples of the cationic polymerization initiator include proton acids such as sulfuric acid, phosphoric acid, perchloric acid, and trifluoromethanesulfonic acid; Lewis acids such as boron trifluoride, aluminum chloride, titanium tetrachloride, and tin tetrachloride; an aromatic onium salt or a combination of an aromatic onium salt and a reducing agent; and the like.

These polymerization initiators may be used either individually or in combination.

The polymerizable liquid crystal compound may be polymerized or copolymerized with a monomer or the like that is copolymerizable with the polymerizable liquid crystal compound in the presence of a functional compound such as a UV absorber, an IR absorber, or an antioxidant.

The liquid crystalline polymer according to the present invention may be produced by (A) polymerizing the polymerizable liquid crystal compound or copolymerizing the polymerizable liquid crystal compound with a monomer or the like that is copolymerizable with the polymerizable liquid crystal compound in an appropriate organic solvent, or (B) applying a solution prepared by dissolving the polymerizable liquid crystal compound or the polymerizable liquid crystal compound and a monomer or the like that is copolymerizable with the polymerizable liquid crystal compound in an organic solvent to a support by a known coating method, removing the solvent in a state in which the monomers are aligned, and then heating the coating or applying activated energy rays to the coating.

The organic solvent used in the method (A) is not particularly limited insofar as the organic solvent is inert. Examples of the organic solvent used in the method (A) include aromatic hydrocarbons such as toluene, xylene, and mesitylene; ketones such as cyclohexanone, cyclopentanone, and methyl ethyl ketone; acetates such as butyl acetate and amyl acetate; halogenated hydrocarbons such as chloroform, dichloromethane, and dichloroethane; ethers such as cyclopentyl methyl ether, tetrahydrofuran, and tetrahydropyran; and the like. Among these, it is preferable to use a compound having a boiling point of 60 to 250° C., and particularly 60 to 150° C., from the viewpoint of handling capability.

When using the method (A), the desired liquid crystalline polymer is isolated from a polymerization solution obtained under polymerization conditions described later, and dissolved in an appropriate organic solvent to prepare a solution. The solution is applied to an appropriate support to form a film. The film is dried and then heated to a temperature equal to or higher than the temperature at which the liquid crystalline polymer shows liquid crystallinity, and then gradually cooled to obtain a liquid crystal state.

Examples of the organic solvent used to dissolve the liquid crystalline polymer include ketones such as acetone, methyl ethyl ketone, methyl isobutyl ketone, cyclopentanone, and cyclohexanone; esters such as butyl acetate and amyl acetate; halogenated hydrocarbons such as dichloromethane, chloroform, and dichloroethane; ethers such as tetrahydrofuran, tetrahydropyran, 1,2-dimethoxyethane, 1,4-dioxane, and cyclopentyl methyl ether; and the like.

As the support, a substrate formed of an organic or inorganic material may be used. Examples of the material for the substrate include polycycloolefins (e.g., Zeonex, Zeonor (registered trademark; manufactured by Zeon Corporation), Arton (registered trademark; manufactured by JSR Corporation), and Apel (registered trademark; manufactured by Mitsui Chemicals Inc.)), polyethylene terephthalate, polycarbonate, polyimide, polyamide, polymethyl methacrylate, polystyrene, polyvinyl chloride, polytetrafluoroethylene, cellulose, cellulose triacetate, polyethersulfone, silicon, glass, calcite, and the like. The substrate may have a tabular shape or a shape having a curved surface. The substrate may optionally include an electrode layer, or have an antireflection function or a reflection function.

The solution of the liquid crystalline polymer may be applied to the support by a known method. Examples of the coating method include a curtain coating method, an extrusion coating method, a roll coating method, a spin coating method, a dip coating method, a bar coating method, a spray coating method, a slide coating method, a print coating method, and the like.

Examples of the organic solvent used in the method (B) include ketones such as acetone, methyl ethyl ketone, methyl isobutyl ketone, cyclopentanone, and cyclohexanone; esters such as butyl acetate and amyl acetate; halogenated hydrocarbons such as dichloromethane, chloroform, and dichloroethane; ethers such as tetrahydrofuran, tetrahydropyran, 1,2-dimethoxyethane, 1,4-dioxane, and cyclopentyl methyl ether; and the like.

The support is not particularly limited. For example, it is possible to use the above-mentioned support to which the solution of the liquid crystalline polymer may be applied.

When using the method (B), the polymerization solution may be applied to the support by a known method. For example, the polymerization solution may be applied to the support by any of the methods that may be used to apply the solution of the liquid crystalline polymer to the support.

When using the method (B), it is preferable to align the polymerizable liquid crystal compound applied to the support. The polymerizable liquid crystal compound may be aligned by subjecting the support to an alignment process in advance, for example. The support is preferably subjected to the alignment process forming a liquid crystal alignment layer (e.g., polyimide alignment film or polyvinyl alcohol alignment film) on the support, and rubbing the liquid crystal alignment layer, forming an alignment film by obliquely depositing $SiO_2$ on the support, or applying polarized light or non-polarized light to an organic thin film having a functional group that undergoes a photo-dimerization reaction in the molecule or an organic thin film having a functional group that is optically isomerized in the molecule, for example. The polymerizable liquid crystal compound may be polymerized under polymerization conditions described later.

(2) Liquid Crystalline Polymer Obtained by Polymerizing the Polymerizable Liquid Crystal Composition According to the Present Invention The liquid crystalline polymer according to the present invention can be easily obtained by polymerizing the polymerizable liquid crystal composition according to the present invention in the presence of a polymerization initiator. The resulting liquid crystalline polymer is a cholesteric liquid crystalline polymer. In the present invention, it is preferable to use a polymerizable liquid crystal composition that includes the polymerizable liquid crystal compound, the polymerization initiator (particularly a photoinitiator), and the polymerizable chiral compound from the viewpoint of ensuring an efficient polymerization reaction. The polymerizable liquid crystal composition is used as described below.

For example, the polymerizable liquid crystal composition according to the present invention is applied to a support having an alignment function obtained by the above alignment method, and the polymerizable liquid crystal compound included in the polymerizable liquid crystal composition according to the present invention is uniformly aligned in a cholesteric phase and polymerized to obtain a liquid crystalline polymer according to the present invention. As the support, the above-mentioned support may be used.

The alignment state of the polymerizable liquid crystal compound can be easily controlled by utilizing a polyimide thin film that applies a pretilt angle used in a twisted nematic (TN) element or super-twisted nematic (STN) element so that a uniform alignment state can be achieved.

When a liquid crystal composition is caused to come in contact with a support having an alignment function, the liquid crystal compound is aligned on the surface of the support in the alignment direction of the support. Whether the liquid crystal compound is aligned horizontally, obliquely, or vertically with respect to the surface of the support is mainly determined by the alignment process performed on the surface of the support.

For example, a polymerizable liquid crystal layer that is aligned almost horizontally with respect to the surface of the support is obtained by providing an alignment film having a very small pretilt angle used for an in-plane switching (IPS) liquid crystal display element.

A polymerizable liquid crystal layer that is tilted to some extent with respect to the surface of the support is obtained by providing an alignment film used for a TN liquid crystal display element on the support. A polymerizable liquid crystal layer that is tilted to a large extent with respect to the surface of the support is obtained by providing an alignment film used for an STN liquid crystal display element on the support.

When the polymerizable liquid crystal composition according to the present invention is caused to come in contact with a support having a horizontal alignment function with a pretilt angle, an optical anisotropic article that is obliquely aligned in a state in which the angle uniformly or continuously changes from the surface of the support to the interface with air can be obtained.

A substrate in which areas having different alignment directions are distributed in a pattern can be obtained by applying polarized light or non-polarized light to an organic thin film having a functional group that undergoes a photo-dimerization reaction in the molecule or an organic thin film having a functional group that is optically isomerized in the molecule (hereinafter referred to as "optical alignment film") (optical alignment method).

Specifically, a support provided with an optical alignment film is provided, and light having a wavelength within the absorption band of the optical alignment film is applied to the support to prepare a support that ensures uniform alignment. Light that has a wavelength within the absorption wavelength band of the optical alignment film and differs from the previously applied light (e.g., light that differs in polarization state or irradiation angle and direction from the previously applied light) is applied through a mask to selectively provide an area with an alignment function differing from that of the previously irradiated area.

When the polymerizable liquid crystal composition is caused to come in contact with the support in which areas that differ in alignment function are distributed in a pattern, areas that differ in alignment direction are distributed in a pattern corresponding to the alignment function of the support. A liquid crystalline polymer film having an alignment pattern can be obtained by causing photopolymerization in this state.

When using a support having an approximately horizontal alignment function in which areas that differ in alignment direction are distributed in a pattern, a liquid crystalline polymer film that is particularly useful as a retardation film can be obtained.

An alignment pattern may be obtained by rubbing the alignment film with an atomic force microscope (AFM) stylus, or etching the optical anisotropic article, for example. However, it is preferable to use the optical alignment film due to convenience.

The polymerizable liquid crystal composition according to the present invention may be applied to the support by a known coating method (e.g., bar coating, spin coating, roll coating, gravure coating, spray coating, die coating, cap coating, or dipping). An organic solvent may be added to the polymerizable liquid crystal composition according to the present invention in order to improve the applicability of the polymerizable liquid crystal composition. In this case, it is preferable to remove the organic solvent by air-drying, drying by heating, drying under reduced pressure, drying by heating under reduced pressure, or the like after applying the polymerizable liquid crystal composition according to the present invention to the support.

After application, it is preferable to cause the liquid crystal compound included in the polymerizable liquid crystal composition according to the present invention to be uniformly aligned in a state in which the cholesteric phase is maintained.

Specifically, alignment may be promoted by performing a heat treatment that promotes alignment of the liquid crystal.

For example, the polymerizable liquid crystal composition according to the present invention is applied to the support, and heated to a temperature equal to or higher than the C (crystal phase)-N (nematic phase) transition temperature (hereinafter referred to as "C—N transition temperature") of the liquid crystal composition so that the polymerizable liquid crystal composition shows a liquid crystal phase or isotropic phase liquid state. The liquid crystal composition is then optionally gradually cooled to obtain a cholesteric phase. In this case, it is preferable to maintain the polymerizable liquid crystal composition at a temperature at which the polymerizable liquid crystal composition shows a liquid crystal phase so that the liquid crystal phase domain is sufficiently grown into a mono-domain.

The polymerizable liquid crystal composition according to the present invention may be applied to the support, and maintained for a given time at a temperature within a range in which the polymerizable liquid crystal composition shows a cholesteric phase.

If the temperature is too high, the polymerizable liquid crystal compound may deteriorate due to an undesirable polymerization reaction. If the polymerizable liquid crystal composition is cooled to a large extent, the polymerizable liquid crystal composition may undergo phase separation so that crystals may precipitate, or a higher-order liquid crystal phase (e.g., smectic phase) may be produced (i.e., alignment may become impossible).

The above heat treatment enables preparation of a uniform liquid crystalline polymer film with only a small number of alignment defects as compared with a simple application method.

The film is then cooled to the lowest temperature at which the liquid crystal phase does not undergo phase separation (i.e. excessively cooled state), and polymerized at that temperature in a state in which the liquid crystal phase is aligned to obtain a liquid crystalline polymer film having a high degree of alignment and excellent transparency.

The polymerizable liquid crystal compound or the polymerizable liquid crystal composition according to the present invention may be polymerized by applying activated energy rays, applying a thermal polymerization method, or the like. It is preferable to polymerize the polymerizable liquid crystal compound or the polymerizable liquid crystal composition by applying activated energy rays since heating is not required (i.e., the reaction proceeds at room temperature). It is preferable to apply light (e.g., ultraviolet rays) from the viewpoint of convenience.

The irradiation temperature is set so that the polymerizable liquid crystal compound or the polymerizable liquid crystal composition according to the present invention can maintain a liquid crystal phase. The irradiation temperature is preferably 30° C. or less in order to avoid a situation in which the polymerizable liquid crystal compound or the polymerizable liquid crystal composition undergoes thermal polymerization. Note that the polymerizable liquid crystal compound or the polymerizable liquid crystal composition normally shows a liquid crystal phase within a range from the C—N transition temperature to the N (nematic phase)-I(isotropic liquid phase) transition temperature (hereinafter abbreviated to "N-I transition temperature") during an increase in temperature. On the other hand, since a thermodynamically nonequilibrium state is maintained during a decrease in temperature, the polymerizable liquid crystal compound or the polymerizable liquid crystal composition may not coagulate at a temperature equal to or lower than the C—N transition temperature to maintain a liquid crystal state. This state is referred to as a "supercooled state". In the present invention, it is considered that in a case where the polymerizable liquid crystal compound or the polymerizable liquid crystal composition is in a supercooled state, the polymerizable liquid crystal compound or the polymerizable liquid crystal composition maintains a liquid crystal phase. The UV dose is normally 1 W/m$^2$ to 10 kW/m$^2$, and preferably 5 W/m$^2$ to 2 kW/m$^2$.

A liquid crystalline polymer film having a plurality of areas that differ in alignment direction can be obtained by polymerizing only a given area of the polymerizable liquid crystal compound or the polymerizable liquid crystal composition by applying ultraviolet rays through a mask, changing the alignment state of the unpolymerized area by applying an electric field, a magnetic field, heat, or the like, and polymerizing the unpolymerized area.

A liquid crystalline polymer film having a plurality of areas that differ in alignment direction can also be obtained by limiting the alignment state of the unpolymerized polymerizable liquid crystal compound or the polymerizable liquid crystal composition by applying an electric field, a magnetic field, heat, or the like, and polymerizing only a given area of the polymerizable liquid crystal compound or the polymerizable liquid crystal composition by applying ultraviolet rays through a mask.

The liquid crystalline polymer obtained by polymerizing the polymerizable liquid crystal compound or the polymerizable liquid crystal composition according to the present invention may be used after removing the liquid crystalline polymer from the support, or may be directly used as an optical anisotropic article without removing the liquid crystalline polymer from the support.

Since a liquid crystalline polymer film obtained by polymerizing the polymerizable liquid crystal composition according to the present invention is a cholesteric liquid crystal film that has a very high reflectance, the liquid crystalline polymer film is suitable as a polarizer for a liquid crystal display element.

A multilayer polarizer that covers light over the entire visible spectrum may be obtained by stacking a plurality of liquid crystalline polymer films by a lamination method while appropriately selecting the wavelength of the liquid crystalline polymer film (see EP0720041).

The liquid crystalline polymer film may also be used as a broad-band polarizer by combining an appropriate compound and appropriate process conditions. In this case, methods disclosed in WO98/08135, EP0606940, GB2312529, WO96/02016, and the like may be used, for example.

A color filter may be produced using the polymerizable liquid crystal compound or the polymerizable liquid crystal composition according to the present invention. In this case, the desired wavelength of the filter may be appropriately obtained by utilizing a known coating method.

It is also possible to utilize the thermochromism of the cholesteric liquid crystal. The color of the cholesteric layer changes from red to blue via green by adjusting the temperature. A specific area may be polymerized at a given temperature using a mask.

The number average molecular weight of the liquid crystalline polymer according to the present invention is preferably 500 to 500,000, and more preferably 5,000 to 300,000. If the number average molecular weight of the liquid crystalline polymer is within the above range, the resulting film exhibits high hardness and excellent handling capability. The number average molecular weight of the liquid crystalline polymer may be measured by gel permeation chromatography (GPC) using monodisperse polystyrene as a standard (eluent: tetrahydrofuran (THF)).

The liquid crystalline polymer according to the present invention is considered to uniformly have a crosslinking point over the entire molecule. Since the liquid crystalline polymer is obtained by polymerizing the polymerizable liquid crystal compound according to the present invention, the liquid crystalline polymer exhibits high crosslinking efficiency and excellent hardness.

The liquid crystalline polymer according to the present invention may be used as a material for an optical anisotropic article such as a retardation film, an alignment film for liquid crystal display elements, a polarizer, a color filter, a low-pass filter, an optical polarization prism, an optical filter, and the like, by utilizing the anisotropy of physical properties (e.g., alignment, refractive index, dielectric constant, and magnetic susceptibility).

4) Optical Anisotropic Article

The fourth aspect of the present invention provides an optical anisotropic article comprising the liquid crystalline polymer according to the present invention.

Examples of the optical anisotropic article according to the present invention include a retardation film, an alignment film for liquid crystal display elements, a polarizer, a color filter, a low-pass filter, an optical polarization prism, an optical filter, and the like.

Since the optical anisotropic article according to the present invention includes the liquid crystalline polymer obtained by polymerizing the polymerizable liquid crystal compound according to the present invention, the optical anisotropic article exhibits uniform and high-quality liquid crystal alignment properties.

EXAMPLES

The present invention is further described below by way of examples. Note that the present invention is not limited to the following examples. In the examples, "parts" and "%" respectively indicate "parts by weight" and "wt %" unless otherwise indicated.

The test methods used in the examples are described later. The ratio of eluents used for column chromatography (i.e., the ratio in the parentheses) is a volume ratio.

Example 1

Synthesis of Polymerizable Liquid Crystal Compound 1 Shown by Formula (1)

Step 1: Synthesis of Intermediate 1a Shown by Formula (1a)

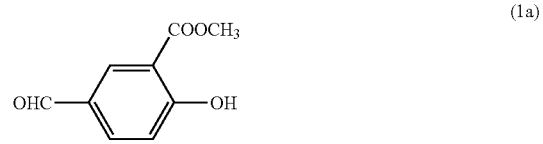

A four-necked reactor equipped with a condenser, a thermometer, and a dropping funnel was charged with 15 g (0.09 mol) of 5-formylsalicylic acid, 14.5 g (0.45 mol) of methanol, 2.2 g (0.018 mol) of 4-dimethylaminopyridine, and 200 ml of tetrahydrofuran (THF) under a nitrogen stream to prepare a homogenous solution. A solution prepared by dissolving 37.3 g (0.18 mol) of N,N-dicyclohexylcarbodiimide in 100 ml of THF was slowly added to the solution at room temperature. After the addition, the mixture was stirred at room temperature for six hours.

After completion of the reaction, insoluble components were filtered off from the reaction mixture, and the solvent was evaporated from the filtrate under reduced pressure to obtain a yellow oil. The yellow oil was purified by silica gel column chromatography (n-hexane:THF=9:1) to obtain 13.4 g of a white solid intermediate 1a (yield: 82.4%). The structure of the intermediate 1a was identified by $^1$H-NMR.

$^1$H-NMR (500 MHz, CDCl$_3$, TMS, δ ppm): 11.36 (s, 1H), 9.88 (s, 1H), 8.39 (s, 1H), 8.00 (d, 1H, J=9.0 Hz), 7.11 (d, 1H, J=9.0 Hz), 4.01 (s, 3H)

Step 2: Synthesis of Intermediate 1b Shown by Formula (1b)

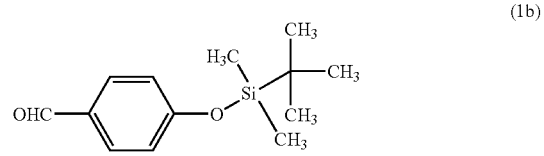

A four-necked reactor equipped with a condenser, a thermometer, and a dropping funnel was charged with 30 g (0.25 mol) of 4-hydroxybenzaldehyde, 44.4 g (0.29 mol) of t-buthyldimethylsilyl chloride, and 400 ml of N,N-dimethylformamide (DMF) under a nitrogen stream to prepare a homogenous solution. A solution prepared by dissolving 41.8 g (0.61 mol) of imidazole in 200 ml of DMF was slowly added to the solution in a water bath. After the addition, the mixture was stirred at room temperature for four hours.

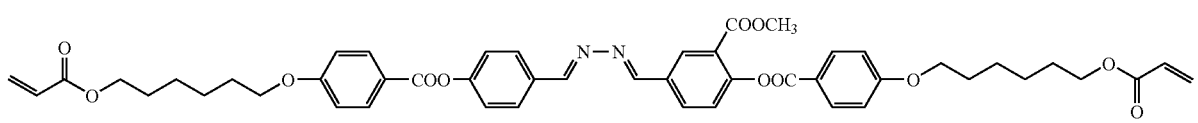

After completion of the reaction, the reaction mixture was added to 6 l of a saturated sodium hydrogen carbonate aqueous solution, and extracted three times with 500 ml of n-hexane. After drying the n-hexane layer over anhydrous magnesium sulfate, magnesium sulfate was filtered off, and n-hexane was evaporated from the filtrate under reduced pressure to obtain a light yellow oil. The light yellow oil was purified by silica gel column chromatography (n-hexane:ethyl acetate=9:1) to obtain 30 g of a colorless oily intermediate 1b (yield: 50.8%). The structure of the intermediate 1b was identified by $^1$H-NMR.

$^1$H-NMR (500 MHz, CDCl$_3$, TMS, δ ppm): 9.87 (s, 1H), 7.78 (d, 2H, J=7.8 Hz), 6.93 (d, 2H, J=7.8 Hz), 0.98 (s, 9H), 0.23 (s, 6H)

Step 3: Synthesis of Intermediate 1c Shown by Formula (1c)

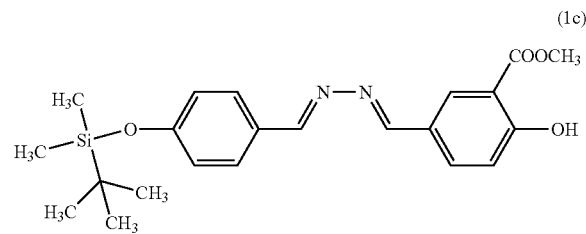

A four-necked reactor equipped with a condenser, a thermometer, and a dropping funnel was charged with 10.6 g (0.21 mol) of hydrazine monohydrate and 50 ml of THF under a nitrogen stream to prepare a homogenous solution. A solution prepared by dissolving 10.0 g (0.042 mol) of the intermediate 1b in 50 ml of THF was slowly added to the solution at room temperature. After the addition, the mixture was stirred at room temperature for three hours.

After completion of the reaction, the solvent was evaporated under reduced pressure to obtain a yellow oil. The yellow oil was dissolved in 200 ml of chloroform, and washed twice with 500 ml of a saturated sodium hydrogen carbonate aqueous solution. After the addition of 6 ml of triethylamine to the chloroform layer, the chloroform layer was dried over anhydrous magnesium sulfate. After removing magnesium sulfate by filtration, chloroform was evaporated from the filtrate under reduced pressure to obtain a light yellow oil.

The light yellow oil was dissolved in 50 ml of THF, followed by the addition of 6 ml of triethylamine. A solution prepared by dissolving 7.2 g (0.04 mol) of the intermediate 1a in 50 ml of THF was slowly added to the mixture at room temperature. After the addition, the mixture was stirred at room temperature for 12 hours.

After completion of the reaction, the solvent was evaporated under reduced pressure to obtain a yellow oil. The yellow oil was purified by silica gel column chromatography (n-hexane:THF=2:1) to obtain 10.76 g of a yellow solid intermediate 1c (yield: 65.2%). The structure of the intermediate 1c was identified by $^1$H-NMR.

$^1$H-NMR (400 MHz, CDCl$_3$, TMS, δ ppm): 11.08 (s, 1H), 8.61 (s, 1H), 8.58 (s, 1H), 8.26 (d, 1H, J=2.0), 8.01 (dd, 1H, J=2.0 Hz, J=8.8 Hz), 7.73 (d, 1H, J=8.8 Hz), 7.06 (d, 1H, J=8.4 Hz), 6.90 (d, 3H, J=8.4 Hz), 4.00 (s, 3H), 0.98 (s, 9H), 0.24 (s, 6H)

Step 4: Synthesis of Intermediate 1d Shown by Formula (1d)

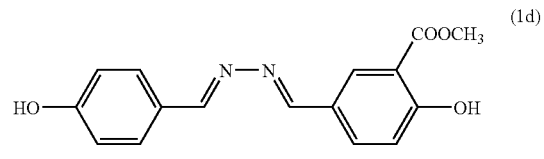

A four-necked reactor equipped with a condenser, a thermometer, and a dropping funnel was charged with 124 ml of a tetrahydrofuran solution of tetrabutylammonium fluoride (concentration: 1 mol/l) under a nitrogen stream. A solution prepared by dissolving 10.0 g (0.024 mol) of the intermediate 1c in 50 ml of THF was slowly added to the solution at room temperature. After the addition, the mixture was stirred at room temperature for three hours.

After completion of the reaction, the reaction mixture was added to water. After the addition of 250 ml of a 5% citric acid aqueous solution to make the mixture acidic, the mixture was extracted twice with 300 ml of chloroform. After drying the chloroform layer over anhydrous sodium sulfate, sodium sulfate was filtered off. Chloroform was evaporated from the filtrate under reduced pressure to obtain a yellow oil. The yellow oil was purified by silica gel column chromatography (n-hexane:THF=2:1) to obtain 6.3 g of a yellow solid intermediate 1d (yield: 88.1%). The structure of the intermediate 1d was identified by $^1$H-NMR.

$^1$H-NMR (400 MHz, CDCl$_3$, TMS, δ ppm): 11.10 (s, 1H), 8.61 (s, 1H), 8.58 (s, 1H), 8.27 (d, 1H, J=2.2 Hz), 8.01 (dd, 1H, J=2.0 Hz, J=8.6 Hz), 7.75 (d, 2H, J=8.6 Hz), 7.06 (d, 1H, J=8.4 Hz), 6.90 (d, 2H, J=8.4 Hz), 5.21 (s, 1H), 4.00 (s, 3H)

Step 5: Synthesis of Polymerizable Liquid Crystal Compound 1 Shown by Formula (1)

A four-necked reactor equipped with a condenser, a thermometer, and a dropping funnel was charged with 3.0 g (0.01 mol) of the intermediate 1d, 7.35 g (0.025 mol) of 4-(6-acryloyl-hex-1-yloxy)benzoic acid (manufactured by DKSH Japan K.K.), and 100 ml of DMF under a nitrogen stream to prepare a homogenous solution. After the addition of 4.8 g (0.025 mol) of 1-ethyl-3-(3-dimethylaminopropyl)carbodiimide hydrochloride (WSC) to the solution at room temperature, the mixture was stirred at room temperature for nine hours.

After completion of the reaction, the reaction mixture was added to water, and extracted twice with 300 ml of chloroform. After drying the chloroform layer over anhydrous magnesium sulfate, magnesium sulfate was filtered off. Chloroform was evaporated from the filtrate under reduced pressure to obtain a yellow oil. The yellow oil was purified by silica gel column chromatography (toluene:ethyl acetate=9:1, then changed to toluene:ethyl acetate=8:2) to obtain 7.5 g of a light yellow solid polymerizable liquid crystal compound 1 (yield: 88.6%). The structure of the polymerizable liquid crystal compound 1 was identified by $^1$H-NMR.

$^1$H-NMR (400 MHz, CDCl$_3$, TMS, δ ppm): 8.70 (s, 2H), 8.49 (s, 1H), 8.18-8.11 (m, 4H), 7.93 (d, 2H, J=7.6 Hz), 7.40-7.26 (m, 4H), 6.99 (d, 4H, J=6.8 Hz), 6.41 (d, 2H, J=17.2 Hz), 6.13 (dd, 2H, J=13.2 Hz, 21.2 Hz), 5.83 (d, 2H, J=13.0 Hz), 4.20-4.06 (m, 8H), 3.60 (s, 3H), 1.85-1.70 (m, 8H), 1.57-1.20 (m, 8H)

Example 2

Synthesis of Polymerizable Liquid Crystal Compound 2 Shown by Formula (2)

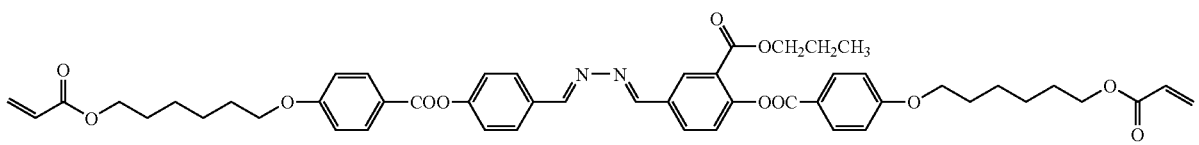

(2)

Step 1: Synthesis of Intermediate 2a Shown by Formula (2a)

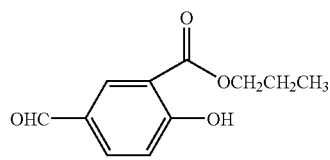

(2a)

An intermediate 2a was synthesized in the same manner as the synthesis of the intermediate 1a in step 1 of the synthesis of the polymerizable liquid crystal compound 1, except that methanol was used instead of 1-propanol (yield: 75.2%). The structure of the intermediate 2a was identified by $^1$H-NMR.

$^1$H-NMR (400 MHz, CDCl$_3$, TMS, δ ppm): 11.49 (s, 1H), 9.90 (s, 1H), 8.39 (d, 1H, J=2.5 Hz), 8.00 (dd, 1H, J=2.5 Hz, J=8.5 Hz), 7.11 (d, 1H, J=8.5 Hz), 4.37 (t, 2H, J=6.5 Hz), 1.89-1.82 (m, 2H), 1.07 (t, 3H, J=7.5 Hz)

Step 2: Synthesis of Intermediate 2b Shown by Formula (2b)

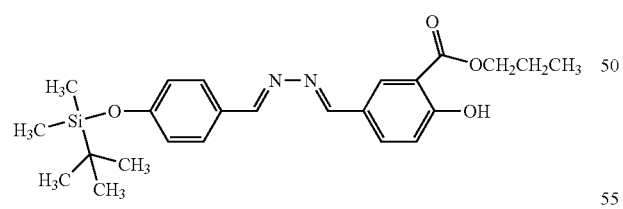

(2b)

An intermediate 2b was synthesized in the same manner as the synthesis of the intermediate 1c in step 3 of the synthesis of the polymerizable liquid crystal compound 1, except that the intermediate 1a was used instead of the intermediate 2a. Since the intermediate 1b (raw material) and the intermediate 2b (product) showed the same polarity with respect to silica gel, the resulting yellow solid was directly used in the subsequent step 3 (synthesis of intermediate 2c) without purifying the yellow solid.

Step 3: Synthesis of Intermediate 2c Shown by Formula (2c)

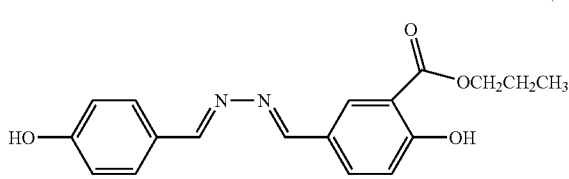

(2c)

An intermediate 2c was synthesized in the same manner as the synthesis of the intermediate 1d in step 4 of the synthesis of the polymerizable liquid crystal compound 1, except that the intermediate 2b was used instead of the intermediate 1c (total yield from the step 2: 35.1%). The structure of the intermediate 2c was identified by $^1$H-NMR.

$^1$H-NMR (400 MHz, CDCl$_3$—CD$_3$OD, TMS, δ ppm): 8.60 (s, 1H), 8.59 (s, 1H), 8.25 (d, 1H, J=2.0 Hz), 8.02 (dd, 1H, J=2.0 Hz, J=8.8 Hz), 7.72 (s, 1H), 7.70 (s, 1H), 7.07 (d, 1H, J=8.8 Hz), 6.91 (s, 1H), 6.89 (s, 1H), 4.36 (t, 2H, J=6.8 Hz), 1.89-1.84 (m, 2H), 1.07 (t, 3H, J=7.4 Hz)

Step 4: Synthesis of Polymerizable Liquid Crystal Compound 2 Shown by Formula (2)

A polymerizable liquid crystal compound 2 was synthesized in the same manner as the synthesis of the compound in step 5 of the synthesis of the polymerizable liquid crystal compound 1, except that the intermediate 2c was used instead of the intermediate 1d (yield: 85.3%). The structure of the polymerizable liquid crystal compound 2 was identified by $^1$H-NMR.

$^1$H-NMR (400 MHz, CDCl$_3$, TMS, δ ppm): 8.70 (s, 1H), 8.69 (s, 1H), 8.47 (d, 1H, J=2.0 Hz), 8.18-8.07 (m, 4H), 7.94 (s, 1H), 7.92 (s, 1H), 7.34-7.16 (m, 5H), 6.99-6.95 (m, 3H), 6.41 (d, 2H, J=17.6 Hz), 6.13 (dd, 2H, J=10.4 Hz, J=17.6 Hz), 5.83 (d, 2H, J=10.4 Hz), 4.21-4.15 (m, 6H), 4.06 (t, 4H, J=6.4 Hz), 1.89-1.82 (m, 4H), 1.77-1.70 (m, 4H), 1.59-1.48 (m, 10H), 0.88 (t, 3H, J=7.6 Hz)

Example 3

Synthesis of Polymerizable Liquid Crystal Compound 3 Shown by Formula (3)

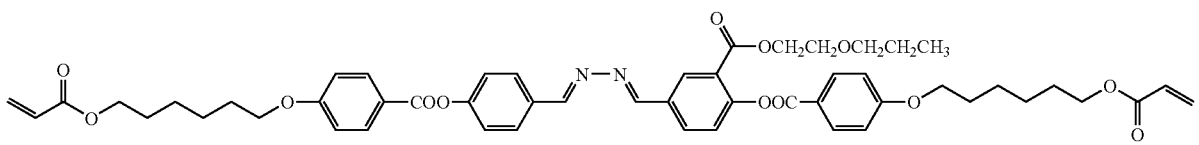

(3)

Step 1: Synthesis of Intermediate 3a Shown by Formula (3a)

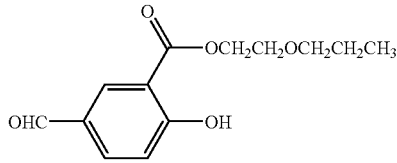

(3a)

A four-necked reactor equipped with a condenser, a thermometer, and a dropping funnel was charged with 15 g (0.09 mol) of 5-formylsalicylic acid, 28.1 g (0.27 mol) of ethylene glycol monopropyl ether, 1.7 g (0.009 mol) of p-toluenesulfonic acid monohydrate, and 1000 ml of toluene under a nitrogen stream to prepare a homogenous solution. The solution was stirred for eight hours under reflux. Water produced during the reaction was removed together with toluene by azeotropic dehydration while adding toluene.

After completion of the reaction, the reaction mixture was washed with water. After drying the toluene layer over anhydrous magnesium sulfate, magnesium sulfate was filtered off. Toluene was evaporated from the filtrate under reduced pressure to obtain a yellow oil. The yellow oil was purified by silica gel column chromatography (n-hexane:THF=3:1) to obtain 12.6 g of a light yellow solid intermediate 3a (yield: 55.5%). The structure of the intermediate 3a was identified by $^1$H-NMR.

$^1$H-NMR (400 MHz, CDCl$_3$, TMS, δ ppm): 11.34 (s, 1H), 9.89 (s, 1H), 8.42 (d, 1H, J=2.0 Hz), 8.01 (dd, 1H, J=2.0 Hz, J=8.6 Hz), 7.11 (d, 1H, J=8.6 Hz), 4.56 (t, 2H, J=4.6), 3.80 (t, 2H, J=4.6 Hz), 3.49 (t, 2H, J=6.6 Hz), 1.68-1.59 (m, 2H), 0.94 (t, 3H, J=7.6 Hz)

Step 2: Synthesis of Intermediate 3b Shown by Formula (3b)

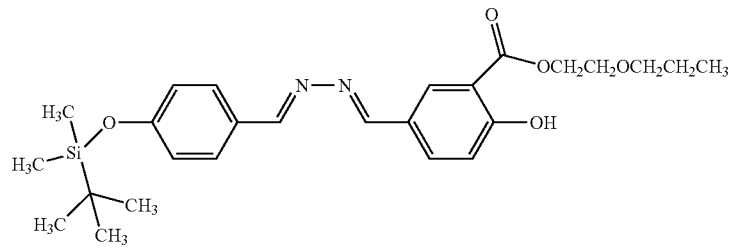

(3b)

An intermediate 3b was synthesized in the same manner as the synthesis of the intermediate 1c in step 3 of the synthesis of the polymerizable liquid crystal compound 1, except that the intermediate 3a was used instead of the intermediate 1a (yield: 50.8%). The structure of the intermediate 3b was identified by $^1$H-NMR.

$^1$H-NMR (400 MHz, CDCl$_3$, TMS, δ ppm): 11.04 (s, 1H), 8.60 (s, 1H), 8.58 (s, 1H), 8.26 (d, 1H, J=2.0 Hz), 8.04 (dd, 1H, J=2.0 Hz, J=8.6 Hz), 7.73 (d, 2H, J=8.6 Hz), 7.06 (d, 1H, J=8.6 Hz), 6.90 (d, 2H, J=8.6 Hz), 4.54 (t, 2H, J=4.8 Hz), 3.80 (t, 2H, J=4.8 Hz), 3.50 (t, 2H, J=6.6 Hz), 1.68-1.60 (m, 2H), 1.00 (s, 9H), 0.95 (t, 3H, J=7.4 Hz), 0.24 (s, 6H)

Step 3: Synthesis of Intermediate 3c Shown by Formula (3c)

(3c)

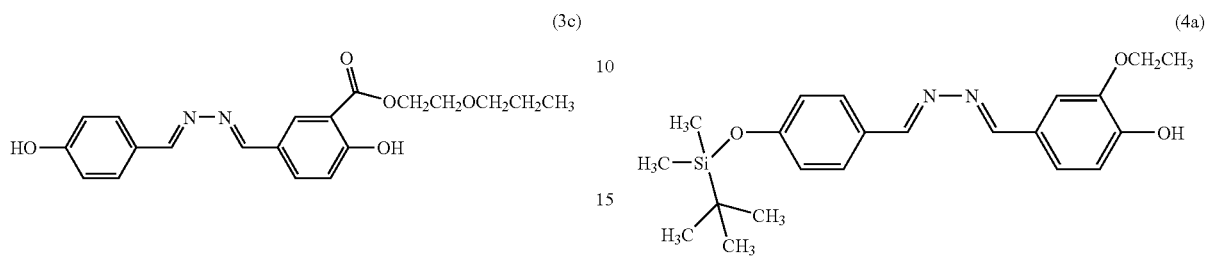

An intermediate 3c was synthesized in the same manner as the synthesis of the intermediate 1d in step 4 of the synthesis of the polymerizable liquid crystal compound 1, except that the intermediate 3b was used instead of the intermediate 1c (yield: 75.6%). The structure of the intermediate 3c was identified by ¹H-NMR.

¹H-NMR (400 MHz, CD₃OD, TMS, δ ppm): 8.46 (s, 1H), 8.45 (s, 1H), 8.21 (d, 1H, J=2.2 Hz), 7.94 (dd, 1H, J=2.2 Hz, J=8.8 Hz), 7.62 (d, 2H, J=8.8 Hz), 6.97 (dd, 1H, J=2.2 Hz, J=8.8 Hz), 6.80 (d, 2H, J=8.8 Hz), 4.47-4.45 (m, 2H), 3.76-3.74 (m, 2H), 3.45 (t, 2H, J=6.6 Hz), 1.61-1.52 (m, 2H), 0.89 (t, 3H, J=7.4 Hz)

Step 4: Synthesis of Polymerizable Liquid Crystal Compound 3 Shown by Formula (3)

A polymerizable liquid crystal compound 3 was synthesized in the same manner as the synthesis of the polymerizable liquid crystal compound 1 in step 5 of the synthesis of the polymerizable liquid crystal compound 1, except that the intermediate 3c was used instead of the intermediate 1d (yield: 82.8%). The structure of the polymerizable liquid crystal compound 3 was identified by ¹H-NMR.

¹H-NMR (400 MHz, CDCl₃, TMS, δ ppm): 8.69 (s, 2H), 8.49 (m, 1H), 8.19-8.13 (m, 5H), 7.94-7.92 (m, 2H), 7.34-7.18 (m, 3H), 6.84 (d, 4H, J=6.4 Hz), 6.41 (d, 2H, J=17.4 Hz), 6.13 (dd, 2H, J=10.4 Hz, J=17.4 Hz), 5.83 (d, 2H, J=10.4 Hz), 4.37-4.35 (m, 2H), 4.19 (t, 4H, J=6.2 Hz), 4.06 (t, 4H, J=6.2 Hz), 3.56-3.54 (m, 2H), 3.33-3.30 (m, 2H), 1.87-1.72 (m, 8H), 1.58-1.43 (m, 10H), 0.90 (t, 3H, J=7.4 Hz)

Example 4

Synthesis of Polymerizable Liquid Crystal Compound 4 Shown by Formula (4)

Step 1: Synthesis of Intermediate 4a Shown by Formula (4a)

(4a)

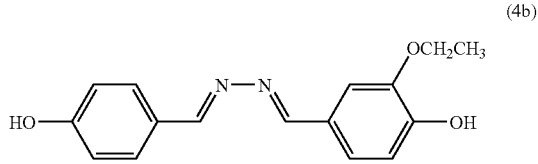

An intermediate 4a was synthesized in the same manner as the synthesis of the intermediate 1c in step 3 of the synthesis of the polymerizable liquid crystal compound 1, except that ethyl vanillin (3-ethoxy-4-hydroxybenzaldehyde) was used instead of the intermediate 1a (yield: 60.3%). The structure of the intermediate 4a was identified by ¹H-NMR.

¹H-NMR (400 MHz, CDCl₃, TMS, δ ppm): 8.59 (s, 1H), 8.56 (s, 1H), 7.73 (s, 1H), 7.71 (s, 1H), 7.50 (s, 1H), 7.21 (d, 1H, J=8.0 Hz), 7.00-6.89 (m, 3H), 4.23 (t, 2H, J=6.8 Hz), 1.49 (t, 3H, J=6.8 Hz), 1.00 (s, 9H), 0.23 (s, 6H)

Step 2: Synthesis of Intermediate 4b Shown by Formula (4b)

(4b)

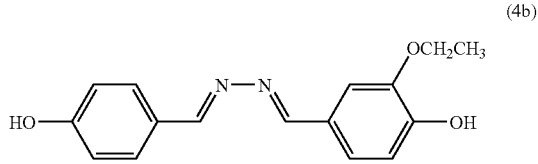

An intermediate 4b was synthesized in the same manner as the synthesis of the intermediate 1d in step 4 of the synthesis of the polymerizable liquid crystal compound 1, except that (4)

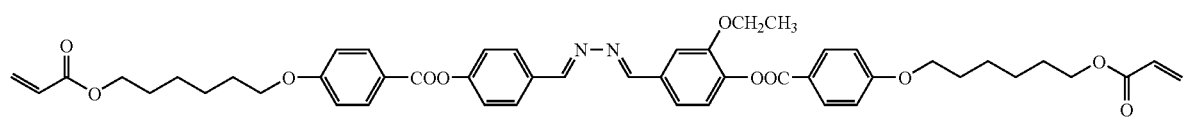

the intermediate 4a was used instead of the intermediate 1c (yield: 88.1%). The structure of the intermediate 4b was identified by $^1$H-NMR.

$^1$H-NMR (400 MHz, CDCl$_3$-CD$_3$OD, TMS, δ ppm): 8.58 (s, 1H), 8.54 (s, 1H), 7.70 (d, 2H, J=8.6 Hz), 7.49 (s, 1H), 7.21 (d, 1H, J=8.6 Hz), 6.98-6.88 (m, 3H), 4.24-4.19 (m, 2H), 1.49 (t, 3H, J=7.0 Hz)

Step 3: Synthesis of Polymerizable Liquid Crystal Compound 4 Shown by Formula (4)

A polymerizable liquid crystal compound 4 was synthesized in the same manner as the synthesis of the polymerizable liquid crystal compound 1 in step 5 of the synthesis of the polymerizable liquid crystal compound 1, except that the intermediate 4b was used instead of the intermediate 1d (yield: 86.4%). The structure of the polymerizable liquid crystal compound 4 was identified by $^1$H-NMR.

$^1$H-NMR (400 MHz, CDCl$_3$, TMS, δ ppm): 8.68 (s, 1H), 8.63 (s, 1H), 8.17-8.14 (m, 4H), 7.92 (d, 2H, J=8.2 Hz), 7.62 (s, 1H), 7.36-7.23 (m, 4H), 6.98 (d, 4H, J=8.2 Hz), 6.41 (d, 2H, J=17.6 Hz), 6.13 (dd, 2H, J=10.4 Hz, J=17.6 Hz), 5.83 (d, 2H, J=10.4 Hz), 4.20-4.13 (m, 6H), 4.06 (t, 4H, J=6.2 Hz), 1.88-1.82 (m, 4H), 1.77-1.70 (m, 4H), 1.57-1.48 (m, 8H), 1.34 (t, 3H, J=7.0 Hz)

Example 5

Synthesis of Polymerizable Liquid Crystal Compound 5 Shown by Formula (5)

was used instead of the intermediate 1a (yield: 65.7%). The structure of the intermediate 5a was identified by $^1$H-NMR.

$^1$H-NMR (400 MHz, CDCl$_3$, TMS, δ ppm): 8.61 (s, 1H), 8.55 (s, 1H), 7.73 (d, 2H, J=8.6 Hz), 7.10 (s, 2H), 6.90 (d, 2H, J=8.6 Hz), 3.97 (s, 6H), 1.00 (s, 9H), 0.24 (s, 6H)

Step 2: Synthesis of Intermediate 5b Shown by Formula (5b)

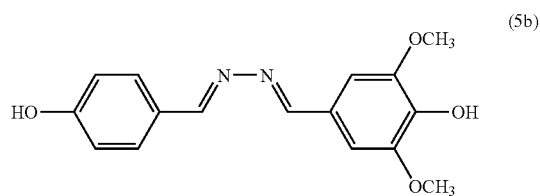

An intermediate 5b was synthesized in the same manner as the synthesis of the intermediate 1d in step 4 of the synthesis of the polymerizable liquid crystal compound 1, except that the intermediate 5a was used instead of the intermediate 1c (yield: 85.6%). The structure of the intermediate 5b was identified by $^1$H-NMR.

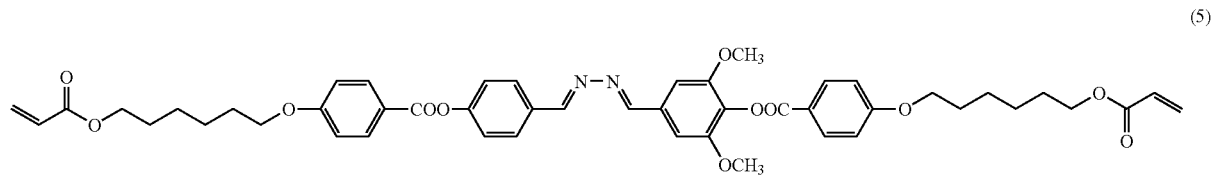

Step 1: Synthesis of Intermediate 5a Shown by Formula (5a)

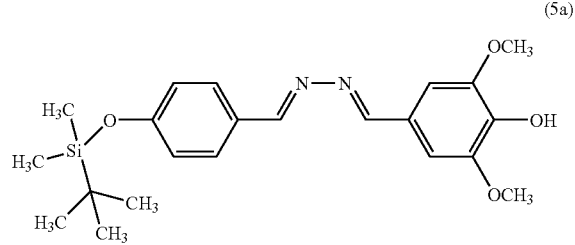

An intermediate 5a was synthesized in the same manner as the synthesis of the intermediate 1c in step 3 of the synthesis of the polymerizable liquid crystal compound 1, except that syringaldehyde (3,5-dimethoxy-4-hydroxybenzaldehyde)

$^1$H-NMR (400 MHz, CDCl$_3$-CD$_3$OD, TMS, δ ppm): 8.63-8.55 (m, 2H), 7.73-7.70 (m, 2H), 7.12-7.09 (m, 2H), 6.96-6.64 (m, 2H), 3.98 (s, 6H)

Step 3: Synthesis of Polymerizable Liquid Crystal Compound 5 Shown by Formula (5)

A polymerizable liquid crystal compound 5 was synthesized in the same manner as the synthesis of the polymerizable liquid crystal compound 1 in step 5 of the synthesis of the polymerizable liquid crystal compound 1, except that the intermediate 5b was used instead of the intermediate 1d (yield: 90.2%). The structure of the polymerizable liquid crystal compound 5 was identified by $^1$H-NMR.

$^1$H-NMR (400 MHz, CDCl$_3$, TMS, δ ppm): 8.69 (s, 1H), 8.61 (s, 1H), 8.20-8.14 (m, 4H), 8.04 (d, 1H, J=8.8 Hz), 7.92 (d, 2H, J=8.4 Hz), 7.32 (d, 1H, J=8.8 Hz), 7.27-7.14 (m, 3H), 6.99-6.91 (m, 3H), 6.41 (d, 2H, J=17.6 Hz), 6.13 (dd, 2H, J=10.6 Hz, J=17.6 Hz), 5.82 (d, 2H, J=10.6 Hz), 4.20-4.01 (m, 8H), 3.89 (s, 6H), 1.86-1.70 (m, 8H), 1.55-1.48 (m, 8H)

Example 6

Synthesis of Polymerizable Liquid Crystal Compound 6 Shown by Formula (6)

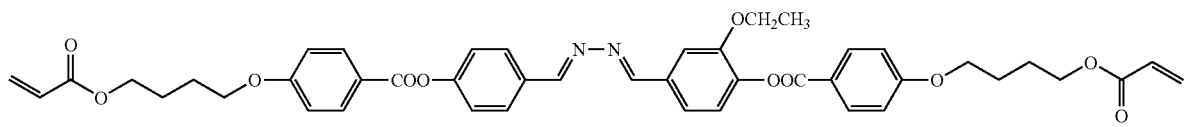

(6)

A polymerizable liquid crystal compound 6 was synthesized in the same manner as in step 3 of the synthesis of the polymerizable liquid crystal compound 4, except that 4-(4-acryloyl-butyl-1-oxy)benzoic acid (manufactured by DKSH Japan K.K.) was used instead of 4-(6-acryloyl-hex-1-yloxy)benzoic acid (manufactured by DKSH Japan K.K.) (yield: 80.1%). The structure of the polymerizable liquid crystal compound 6 was identified by $^1$H-NMR.

$^1$H-NMR (500 MHz, CDCl$_3$, TMS, δ ppm): 8.67 (s, 1H), 8.62 (s, 1H), 8.17-8.14 (m, 4H), 7.93 (m, 2H), 7.61 (s, 1H), 7.35-7.30 (m, 2H), 7.25-7.22 (m, 2H), 6.98-6.95 (m, 4H), 6.41 (d, 2H, J=17.5 Hz), 6.12 (dd, 2H, J=10.3 Hz, J=17.5 Hz), 5.83 (d, 2H, J=10.3 Hz), 4.25 (t, 4H, J=6.0 Hz, J=4.6 Hz), 4.15 (dd, 2H, J=6.9 Hz, J=13.4 Hz), 4.09 (t, 4H, J=4.6 Hz, J=6.0 Hz), 1.92 (m, 8H), 4.09 (t, 3H, J=6.9 Hz)

Example 7

Synthesis of Polymerizable Liquid Crystal Compound 7 Shown by Formula (7)

Step 1: Synthesis of intermediate 7a shown by formula (7a)

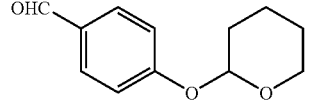

(7a)

A four-necked reactor equipped with a condenser, a thermometer, and a dropping funnel was charged with 30 g (0.25 mol) of 4-hydroxybenzaldehyde, 31 g (0.37 mol) of 3,4-dihydro-2H-pyran, 234 mg (1.23 mmol) of p-toluenesulfonic acid monohydrate, and 500 ml of THF under a nitrogen

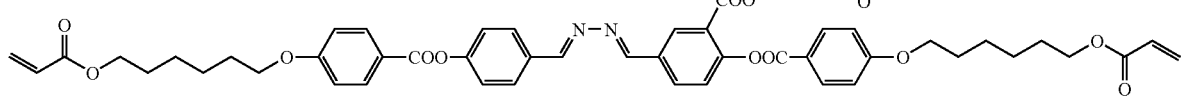

(7)

stream to prepare a homogenous solution. The solution was stirred at room temperature for 14 hours.

After completion of the reaction, the reaction mixture was added to 5 l of a saturated sodium hydrogen carbonate aqueous solution, and extracted twice with 500 ml of chloroform. After drying the chloroform layer over anhydrous magnesium sulfate, magnesium sulfate was filtered off. Chloroform was evaporated from the filtrate under reduced pressure to obtain 45 g of a yellow oil. The yellow oil was purified by silica gel column chromatography (toluene:ethyl acetate=95:5) to obtain 15 g of a white solid intermediate 7a (yield: 29.1%). The structure of the intermediate 7a was identified by $^1$H-NMR.

$^1$H-NMR (400 MHz, CDCl$_3$, TMS, δ ppm): 9.91 (s, 1H), 7.86-7.82 (m, 2H), 7.18-7.15 (m, 2H), 5.55 (s, 1H), 3.88-3.82 (m, 1H), 3.66-3.61 (m, 1H), 1.60-2.04 (m, 6H)

Step 2: Synthesis of intermediate 7b shown by formula (7b)

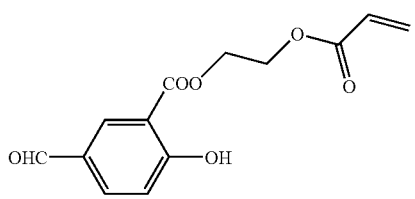

A four-necked reactor equipped with a condenser, a thermometer, and a dropping funnel was charged with 30 g (0.18 mol) of 5-formylsalicylic acid, 100.5 g (0.87 mol) of 2-hydroxyethyl acrylate, 2.2 g (0.018 mol) of 4-dimethylaminopyridine, and 800 ml of THF under a nitrogen stream to prepare a homogenous solution. A solution prepared by dissolving 44.6 g (0.22 mol) of N,N-dicyclohexylcarbodiimide in 200 ml of THF was slowly added to the solution. After the addition, the mixture was stirred at room temperature for 20 hours.

After completion of the reaction, insoluble components were filtered off from the reaction mixture, and the filtrate was concentrated. The concentrate was added to 1000 ml of water, and extracted twice with 300 ml of chloroform. The chloroform layer was washed with 500 ml of water. After drying the chloroform layer over anhydrous magnesium sulfate, magnesium sulfate was filtered off. Chloroform was evaporated from the filtrate under reduced pressure to obtain 90 g of a light yellow oil. The light yellow oil was purified by silica gel column chromatography (toluene:ethyl acetate=9:1) to obtain 48 g of a white solid intermediate 7b (yield: 18.2%). The structure of the intermediate 7b was identified by $^1$H-NMR.

$^1$H-NMR (400 MHz, CDCl$_3$, TMS, δ ppm): 11.23 (s, 1H), 9.90 (s, 1H), 8.39 (d, 1H, J=2.4 Hz), 8.02 (dd, 1H, J=8.6 Hz, J=2.4 Hz), 7.12 (d, 1H, J=8.6 Hz), 6.47 (d, 1H, J=17.6 Hz), 6.17 (dd, 1H, J=10.4 Hz, J=17.6 Hz), 5.89 (d, 1H, J=10.4 Hz), 4.67-4.64 (m, 2H), 4.56-4.54 (m, 2H)

Step 3: Synthesis of Intermedate 7c Shown by Formula (7c)

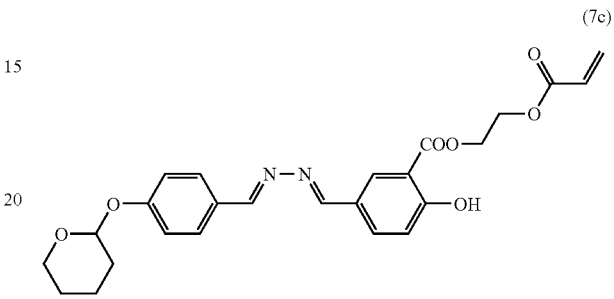

A four-necked reactor equipped with a condenser, a thermometer, and a dropping funnel was charged with 12.1 g (0.24 mol) of hydrazine monohydrate and 50 ml of ethanol under a nitrogen stream to prepare a homogenous solution. A solution prepared by dissolving 10.0 g (0.048 mol) of the intermediate 7a in 50 ml of THF was slowly added to the mixture at room temperature. After the addition, the mixture was stirred at room temperature for two hours.

After completion of the reaction, the solvent was evaporated from the reaction mixture under reduced pressure to obtain a yellow oil. The yellow oil was dissolved in 200 ml of chloroform, and washed twice with 500 ml of a saturated sodium hydrogen carbonate aqueous solution. After the addition of 6 ml of triethylamine to the chloroform layer, the chloroform layer was dried over anhydrous magnesium sulfate. After removing magnesium sulfate by filtration, chloroform was evaporated from the filtrate under reduced pressure to obtain a light yellow oil. The light yellow oil was dissolved in 50 ml of THF, followed by the addition of 6 ml of triethylamine. A solution prepared by dissolving 10.6 g (0.04 mol) of the intermediate 7b in 50 ml of THF was slowly added to the mixture at room temperature. After the addition, the mixture was stirred at room temperature for 12 hours.

After completion of the reaction, insoluble components were filtered off from the reaction mixture, and THF was evaporated from the filtrate under reduced pressure to obtain a yellow oil. The yellow oil was purified by silica gel column chromatography (n-hexane:THF=9:1) to obtain 10.5 g of a yellow solid intermediate 7c (yield: 56.3%). The structure of the intermediate 7c was identified by $^1$H-NMR.

$^1$H-NMR (400 MHz, CDCl$_3$, TMS, δ ppm): 10.95 (s, 1H), 8.61 (s, 1H), 8.59 (s, 1H), 8.23 (d, 1H, J=2.0 Hz), 8.04 (dd, 1H, J=2.0 Hz, J=8.6 Hz), 7.77 (d, 2H, J=8.6 Hz), 7.13-7.06 (m, 3H), 6.47 (dd, 1H, J=1.2 Hz, J=17.2 Hz), 6.17 (dd, 1H, J=10.4 Hz, J=17.2 Hz), 5.89 (dd, 1H, J=1.2 Hz, J=10.4 Hz), 5.51 (t, 1H, J=2.8 Hz), 4.65-4.63 (m, 2H), 4.56-4.54 (m, 2H), 3.92-3.86 (m, 1H), 3.64-3.62 (m, 1H), 1.91-1.59 (m, 6H)

Step 4: Synthesis of Intermediate 7d Shown by Formula (7d)

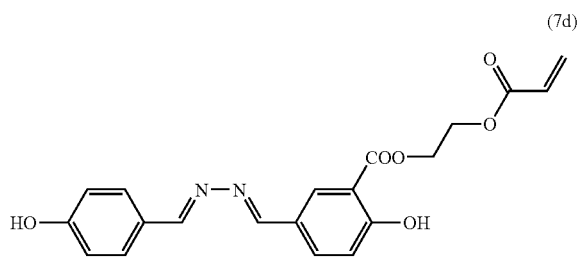

(7d)

A four-necked reactor equipped with a condenser, a thermometer, and a dropping funnel was charged with 200 ml of THF and 200 ml of toluene under a nitrogen stream. After the addition of 10.0 g (0.021 mol) of the intermediate 1c, 0.4 g (0.0021 mol) of p-toluene sulfonic acid, and 5 ml of water, the components were homogenously dissolved. The solution was then stirred at 50° C. (water bath) for four hours.

After completion of the reaction, the reaction mixture was added to a saturated sodium hydrogen carbonate aqueous solution, and extracted twice with 300 ml of ethyl acetate. After drying the ethyl acetate layer over anhydrous sodium sulfate, sodium sulfate was filtered off. Ethyl acetate was evaporated from the filtrate under reduced pressure to obtain a yellow oil. The yellow oil was purified by silica gel column chromatography (toluene:ethyl acetate=85:15) to obtain 2.0 g of a yellow solid intermediate 7d (yield: 25.0%). The structure of the intermediate 7d was identified by $^1$H-NMR.

1H-NMR (400 MHz, CDCl$_3$, TMS, δ ppm): 10.95 (s, 2H), 8.60 (s, 1H), 8.59 (s, 1H), 8.23 (d, 1H, J=2.4 Hz), 8.04 (dd, 1H, J=2.4 Hz, J=8.6 Hz), 7.73 (d, 2H, J=8.6 Hz), 7.07 (d, 1H, J=8.4 Hz), 6.89 (d, 2H, J=8.4 Hz), 6.47 (d, 1H, J=17.6 Hz), 6.17 (dd, 1H, J=10.4 Hz, J=17.6 Hz), 5.89 (d, 1H, J=10.4 Hz), 4.65-4.63 (m, 2H), 4.56-4.54 (m, 2H)

Step 5: Synthesis of Polymerizable Liquid Crystal Compound 7

A four-necked reactor equipped with a condenser, a thermometer, and a dropping funnel was charged with 2.0 g (0.005 mol) of the intermediate 7d, 3.82 g (0.013 mol) of 4-(6-acryloyl-hex-1-yloxy)benzoic acid (manufactured by DKSH Japan K.K.), 0.16 g (0.0013 mol) of 4-dimethylaminopyridine, and 50 ml of DMF under a nitrogen stream to prepare a homogenous solution. After the addition of 2.5 g (0.013 mol) of 1-ethyl-3-(3-dimethylaminopropyl)carbodiimide hydrochloride (WSC) to the solution at room temperature, the mixture was stirred at room temperature for nine hours.

After completion of the reaction, the reaction mixture was added to water, and extracted twice with 300 ml of chloroform. After drying the chloroform layer over anhydrous magnesium sulfate, magnesium sulfate was filtered off. Chloroform was evaporated from the filtrate under reduced pressure to obtain a yellow solid. The yellow solid was purified by silica gel column chromatography (toluene:ethyl acetate=85:15) to obtain 3.37 g of a polymerizable liquid crystal compound 7 as a light yellow solid (yield: 72.3%). The structure of the polymerizable liquid crystal compound 7 was identified by $^1$H-NMR.

$^1$H-NMR (400 MHz, CDCl$_3$, TMS, δ ppm): 8.70 (s, 1H), 8.69 (s, 1H), 8.48 (d, 1H, J=2.0 Hz), 8.17 (s, 3H), 8.14 (s, 2H), 7.93 (d, 2H, J=8.4 Hz), 7.33 (dd, 3H, J=2.4 Hz, J=8.4 Hz), 6.99-6.96 (m, 4H), 6.41 (d, 3H, J=16.4 Hz), 6.17-6.03 (m, 3H), 5.83 (d, 3H, J=10.4 Hz), 4.47-4.45 (m, 2H), 4.28-4.26 (m, 2H), 4.21-4.17 (m, 4H), 4.08-4.05 (m, 4H), 1.87-1.82 (m, 4H), 1.77-1.70 (m, 4H), 1.56-1.48 (m, 8H)

Example 8

Synthesis of Polymerizable Liquid Crystal Compound 8 Shown by Formula (8)

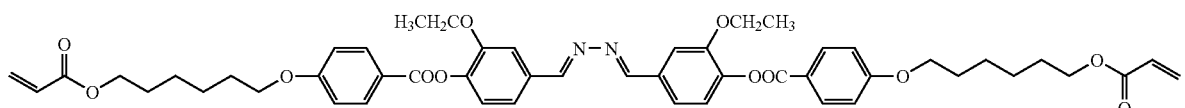

(8)

Step 1: Synthesis of Intermediate 8a Shown by Formula (8a)

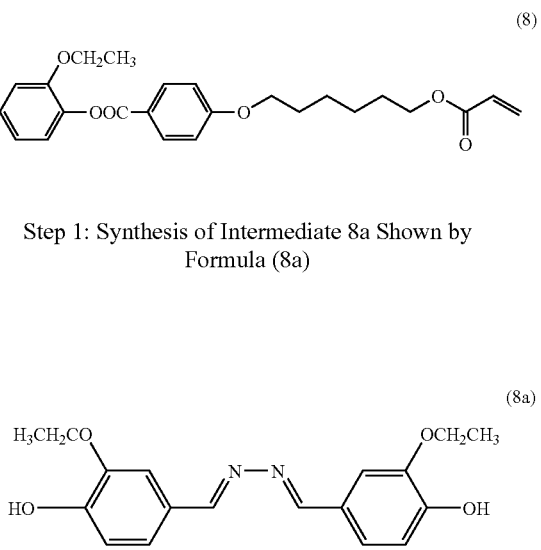

(8a)

A four-necked reactor equipped with a condenser, a thermometer, and a dropping funnel was charged with 1.2 g (0.024 mol) of hydrazine monohydrate and 100 ml of ethanol under a nitrogen stream to prepare a homogenous solution. A solution prepared by dissolving 8.0 g (0.048 mol) of ethyl vanillin (3-ethoxy-4-hydroxybenzaldehyde) in 50 ml of THF was slowly added to the mixture at room temperature. After the addition, the mixture was stirred at room temperature for six hours.

After completion of the reaction, the solvent was evaporated from the reaction mixture under reduced pressure to obtain a yellow solid. The yellow solid was purified by silica gel column chromatography (n-hexane:THF=1:1) to obtain 7.1 g of a yellow solid intermediate 8a (yield: 90.1%). The structure of the intermediate 8a was identified by $^1$H-NMR.

1H-NMR (400 MHz, CDCl$_3$/CD$_3$OD, TMS, δ ppm): 8.33 (s, 2H), 7.35-7.27 (m, 2H), 6.93 (d, 2H, J=7.8 Hz), 6.62 (d, 2H, J=7.8 Hz), 3.95 (q, 4H, J=6.8 Hz, J=13.6 Hz), 1.22 (t, 6H, J=6.8 Hz)

Step 2: Synthesis of Polymerizable Liquid Crystal Compound 8

A four-necked reactor equipped with a condenser, a thermometer, and a dropping funnel was charged with 5.0 g (0.015 mol) of the intermediate 8a, 11.1 g (0.038 mol) of 4-(6-acryloyl-hex-1-yloxy)benzoic acid (manufactured by DKSH Japan K.K.), 0.46 g (0.0038 mol) of 4-dimethylaminopyridine, and 200 ml of 4-dimethylformamide under a nitrogen stream to prepare a homogenous solution. After the addition of 7.28 g (0.038 mol) of 1-ethyl-3-(3-dimethylaminopropyl)carbodiimide hydrochloride (WSC) to the solution at room temperature, the mixture was stirred at room temperature for 12 hours.

After completion of the reaction, the reaction mixture was added to water, and extracted twice with 500 ml of chloroform. After drying the chloroform layer over anhydrous magnesium sulfate, magnesium sulfate was filtered off. Chloroform was evaporated from the filtrate under reduced pressure to obtain a yellow solid. The yellow solid was purified by silica gel column chromatography (toluene:ethyl acetate=90:10) to obtain 11.88 g of a polymerizable liquid crystal compound 8 as a light yellow solid (yield: 90.3%). The structure of the polymerizable liquid crystal compound 8 was identified by $^1$H-NMR.

$^1$H-NMR (400 MHz, CDCl$_3$, TMS, δ ppm): 8.61 (s, 2H), 8.14 (d, 4H, J=8.8 Hz), 7.60 (d, 2H, J=1.6 Hz), 7.33 (dd, 2H, J=1.6 Hz, J=8.6 Hz), 7.23-7.21 (m, 2H), 6.95 (d, 4H, J=8.6 Hz), 6.38 (dd, 2H, J=1.6 Hz, J=17.2 Hz), 6.11 (dd, 2H, J=10.4 Hz, J=17.2 Hz), 5.81 (dd, 2H, J=1.6 Hz, J=10.4 Hz), 4.19-4.11 (m, 8H), 4.05-4.02 (m, 4H), 1.87-1.80 (m, 4H), 1.75-1.68 (m, 4H), 1.56-1.41 (m, 8H), 1.32 (t, 6H, J=6.8 Hz)

Example 9

Synthesis of Polymerizable Liquid Crystal Compound 9 Shown by Formula (9)

Step 1: Synthesis of Intermediate 9a Shown by Formula (9a)

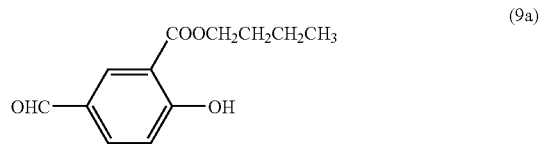

(9a)

A four-necked reactor equipped with a condenser, a thermometer, and a dropping funnel was charged with 10 g (0.06 mol) of 5-formylsalicylic acid, 22.3 g (0.3 mol) of 1-butanol, 0.73 g (0.006 mol) of 4-dimethylaminopyridine, and 200 ml of THF under a nitrogen stream to prepare a homogenous solution. A solution prepared by dissolving 18.6 g (0.09 mol) of N,N-dicyclohexylcarbodiimide in 100 ml of THF was slowly added to the solution at room temperature. After the addition, the mixture was stirred at room temperature for 12 hours.

After completion of the reaction, insoluble components were filtered off from the reaction mixture, and the solvent was evaporated from the filtrate under reduced pressure to obtain a yellow oil. The yellow oil was purified by silica gel column chromatography (n-hexane:THF=9:1) to obtain 8.5 g of a colorless oily intermediate 9a (yield: 63.8%). The structure of the intermediate 9a was identified by $^1$H-NMR.

$^1$H-NMR (500 MHz, CDCl$_3$, TMS, δ ppm): 11.47 (s, 1H), 9.87 (s, 1H), 8.35 (d, 1H, J=2.0 Hz), 7.98 (dd, 1H, J=2.0 Hz, J=8.8 Hz), 7.08 (d, 1H, J=8.8 Hz), 4.39 (t, 2H, J=6.5 Hz), 1.83-1.76 (m, 2H), 1.54-1.44 (m, 2H), 0.99 (t, 3H, J=7.5 Hz)

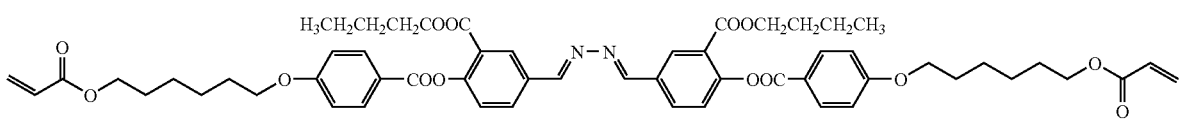

(9)

Step 2: Synthesis of Intermediate 9b Shown by Formula (9b)

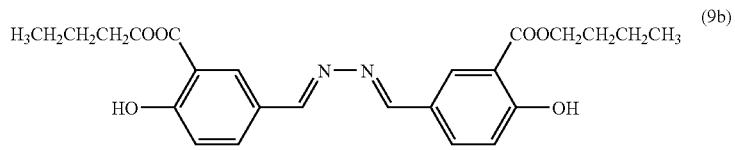

(9b)

A four-necked reactor equipped with a condenser, a thermometer, and a dropping funnel was charged with 1.0 g (0.02 mol) of hydrazine monohydrate and 100 ml of ethanol under a nitrogen stream to prepare a homogenous solution. A solution prepared by dissolving 8.88 g (0.04 mol) of the intermediate 2b in 50 ml of THF was slowly added to the mixture at room temperature. After the addition, the mixture was stirred at room temperature for 12 hours.

After completion of the reaction, the solvent was evaporated from the reaction mixture under reduced pressure to obtain a yellow solid. The yellow solid was purified by silica gel column chromatography (n-hexane:THF=1:1) to obtain 7.25 g of a yellow solid intermediate 9b (yield: 82.3%). The structure of the intermediate 9b was identified by $^1$H-NMR.

$^1$H-NMR (400 MHz, CDCl$_3$, TMS, δ ppm): 11.19 (s, 2H), 8.60 (s, 2H), 8.22 (d, 2H, J=2.0 Hz), 8.01 (dd, 2H, J=2.0 Hz, J=8.6 Hz), 7.04 (d, 2H, J=8.6 Hz), 4.38 (t, 4H, J=6.4 Hz), 1.83-1.76 (m, 4H), 1.53-1.44 (m, 4H), 0.99 (t, 6H, J=7.2 Hz)

Step 3: Synthesis of Polymerizable Liquid Crystal Compound 9

A four-necked reactor equipped with a condenser, a thermometer, and a dropping funnel was charged with 5.0 g (0.011 mol) of the intermediate 9b, 8.30 g (0.028 mol) of 4-(6-acryloyl-hex-1-yloxy)benzoic acid (manufactured by DKSH Japan K.K.), 0.34 g (0.0028 mol) of 4-dimethylaminopyridine, and 200 ml of DMF under a nitrogen stream to prepare a homogenous solution. After the addition of 5.4 g (0.028 mmol) of 1-ethyl-3-(3-dimethylaminopropyl)carbodiimide hydrochloride (WSC) to the solution at room temperature, the mixture was stirred at room temperature for 10 hours.

After completion of the reaction, the reaction mixture was added to water, and extracted twice with 500 ml of chloroform. After drying the chloroform layer over anhydrous magnesium sulfate, magnesium sulfate was filtered off. Chloroform was evaporated from the filtrate under reduced pressure to obtain a yellow solid. The yellow solid was purified by silica gel column chromatography (toluene:ethyl acetate=90:10) to obtain 8.65 g of a polymerizable liquid crystal compound 9 as a light yellow solid (yield: 79.5%). The structure of the polymerizable liquid crystal compound 9 was identified by $^1$H-NMR.

$^1$H-NMR (400 MHz, CDCl$_3$, TMS, δ ppm): 8.69 (s, 2H), 8.45 (d, 2H, J=1.5 Hz), 8.16-8.11 (m, 6H), 7.31 (d, 2H, J=8.5 Hz), 6.96 (d, 4H, J=8.5 Hz), 6.39 (d, 2H, J=17.0 Hz), 6.11 (dd, 2H, J=10.5 Hz, J=17.0 Hz), 5.81 (d, 2H, J=10.5 Hz), 4.20-4.16 (m, 8H), 4.04 (t, 4H, J=6.5 Hz), 1.86-1.80 (m, 4H), 1.74-1.69 (m, 4H), 1.55-1.45 (m, 12H), 1.32-1.25 (m, 4H), 0.80 (t, 6H, J=7.5 Hz)

Example 10

Synthesis of Polymerizable Liquid Crystal Compound 10 Shown by Formula (10)

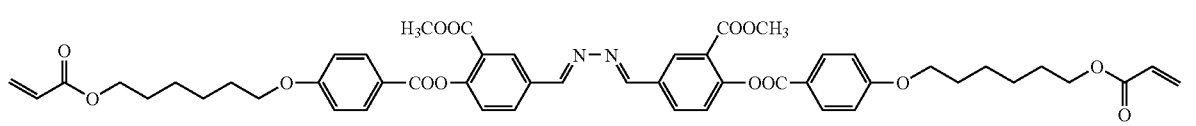

(10)

Step 1: Synthesis of Intermediate 10a Shown by Formula (10a)

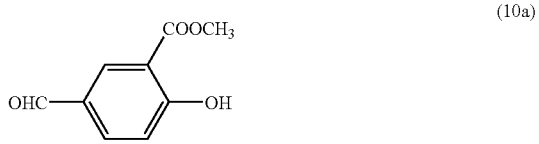

(10a)

A four-necked reactor equipped with a condenser, a thermometer, and a dropping funnel was charged with 15 g (0.09 mol) of 5-formylsalicylic acid, 14.5 g (0.45 mol) of methanol, 2.2 g (0.018 mol) of 4-dimethylaminopyridine, and 200 ml of THF under a nitrogen stream to prepare a homogenous solution. A solution prepared by dissolving 37.3 g (0.18 mol) of N,N-dicyclohexylcarbodiimide in 100 ml of THF was slowly added to the solution at room temperature. After the addition, the mixture was stirred at room temperature for six hours.

After completion of the reaction, insoluble components were filtered off from the reaction mixture, and THF was evaporated from the filtrate under reduced pressure to obtain a yellow oil. The yellow oil was purified by silica gel column chromatography (n-hexane:THF=9:1) to obtain 13.4 g of a white solid intermediate 10a (yield: 82.4%). The structure of the intermediate 10a was identified by $^1$H-NMR.

$^1$H-NMR (500 MHz, CDCl$_3$, TMS, δ ppm): 11.36 (s, 1H), 9.88 (s, 1H), 8.39 (s, 1H), 8.00 (d, 1H, J=9.0 Hz), 7.11 (d, 1H, J=9.0 Hz), 4.01 (s, 3H)

Step 2: Synthesis of Intermediate 10b Shown by Formula (10b)

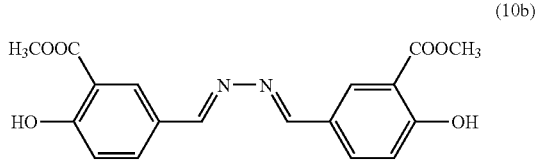

(10b)

A four-necked reactor equipped with a condenser, a thermometer, and a dropping funnel was charged with 1.0 g (0.02 mol) of hydrazine monohydrate and 100 ml of ethanol under a nitrogen stream to prepare a homogenous solution. A solution prepared by dissolving 7.2 g (0.04 mol) of the intermediate 10a in 50 ml of THF was slowly added to the mixture at room temperature. After the addition, the mixture was stirred at room temperature for six hours.

After completion of the reaction, insoluble components were filtered off from the reaction mixture, and the solvent was evaporated from the filtrate under reduced pressure to obtain a light yellow solid. The light yellow solid was purified by silica gel column chromatography (n-hexane:THF=1:1) to obtain 5.85 g of a yellow solid intermediate 10b (yield: 82.1%). The structure of the intermediate 10b was identified by $^1$H-NMR.

$^1$H-NMR (400 MHz, CDCl$_3$, TMS, δ ppm): 11.0-10.6 (bs, 2H), 7.94 (s, 2H), 7.71-7.67 (m, 3H), 6.97-6.95 (m, 3H), 3.93 (s, 6H)

Step 3: Synthesis of Polymerizable Liquid Crystal Compound 10

A four-necked reactor equipped with a condenser, a thermometer, and a dropping funnel was charged with 5.0 g (0.014 mol) of the intermediate 10d, 10.25 g (0.035 mol) of 4-(6-acryloyl-hex-1-yloxy)benzoic acid (manufactured by DKSH Japan K.K.), 0.42 g (0.0035 mol) of 4-dimemylaminopyridine, and 200 ml of DMF under a nitrogen stream to prepare a homogenous solution. After the addition of 6.71 g (0.035 mol) of 1-ethyl-3-(3-dimethylaminopropyl)carbodiimide hydrochloride (WSC) to the solution at room temperature, the mixture was stirred at room temperature for 14 hours.

After completion of the reaction, the reaction mixture was added to water, and extracted twice with 500 ml of chloroform. After drying the chloroform layer over anhydrous magnesium sulfate, magnesium sulfate was filtered off. Chloroform was evaporated from the filtrate under reduced pressure to obtain a yellow solid. The yellow solid was purified by silica gel column chromatography (toluene:ethyl acetate=90:10) to obtain 8.68 g of a polymerizable liquid crystal compound 10 as a light yellow solid (yield: 68.5%). The structure of the polymerizable liquid crystal compound 10 was identified by $^1$H-NMR.

$^1$H-NMR (400 MHz, CDCl$_3$, TMS, δ ppm): 8.68 (s, 2H), 8.48 (d, 2H, J=2.0 Hz), 8.15 (d, 4H, J=8.8 Hz), 8.11 (dd, 2H, J=2.0 Hz, J=8.8 Hz), 7.33 (d, 2H, J=8.8 Hz), 6.97 (d, 4H, J=8.8 Hz), 6.39 (dd, 2H, J=1.6 Hz, J=17.4 Hz), 6.11 (dd, 2H, J=10.4 Hz, J=17.4 Hz), 5.81 (dd, 2H, J=1.6 Hz, J=10.4 Hz), 4.17 (t, 4H, J=6.4 Hz), 4.04 (t, 4H, J=6.4 Hz), 3.77 (s, 6H), 1.85-1.81 (m, 4H), 1.75-1.70 (m, 4H), 1.55-1.46 (m, 8H)

Example 11

Synthesis of Polymerizable Liquid Crystal Compound 11

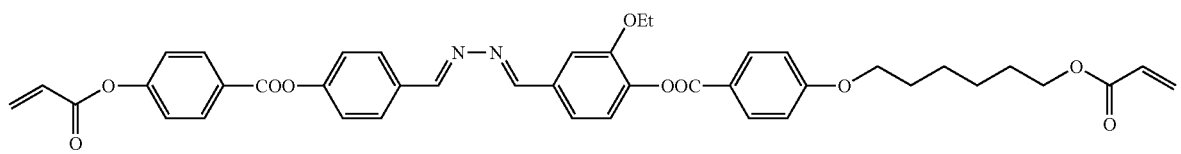

(Compound 11)

Step 1: Synthesis of Intermediate 11a

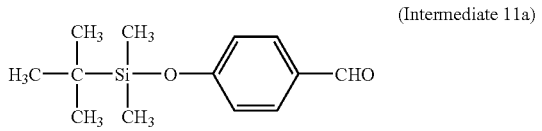

(Intermediate 11a)

In a four-necked reactor equipped with a condenser, a thermometer, and a dropping funnel, 30 g (0.25 mol) of 4-hydroxybenzoic acid and 44.4 g (0.29 mol) of t-buthyldimethylsilyl chloride were dissolved in 400 ml of N,N-dimethylformamide (DMF) under a nitrogen stream. A solution prepared by dissolving 41.8 g (0.61 mol) of imidazole in 200 ml of DMF was slowly added to the solution in a water bath. After the addition, the mixture was reacted at room temperature for four hours. After completion of the reaction, the reaction mixture was added to 3 l of a saturated sodium hydrogen carbonate aqueous solution, and extracted three times with 500 ml of n-hexane. The n-hexane layer was dried over anhydrous magnesium sulfate, and magnesium sulfate was filtered off. The filtrate was concentrated using a rotary evaporator to obtain a light yellow oil. The light yellow oil was purified by silica gel column chromatography (n-hexane:ethyl acetate=9:1 (volume ratio)) to obtain 30 g of a colorless oil (yield: 50.8%). The structure of the product was identified by $^1$H-NMR.

$^1$H-NMR (500 MHz, CDCl$_3$, TMS, δ ppm): 9.87 (s, 1H), 7.78 (d, 2H, J=7.8 Hz), 6.93 (d, 2H, J=7.8 Hz), 0.98 (s, 9H), 0.23 (s, 6H)

Step 2: Synthesis of Intermediate 11b

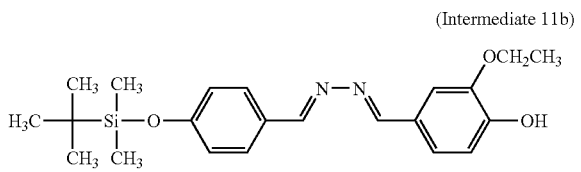

(Intermediate 11b)

In a four-necked reactor equipped with a condenser, a thermometer, and a dropping funnel, 10.6 g (0.21 mol) of hydrazine monohydrate was dissolved in 50 ml of ethanol under a nitrogen stream. A solution prepared by dissolving 10.0 g (0.042 mol) of the intermediate 11a in 50 ml of tetrahydrofuran (THF) was slowly added to the solution at room temperature. After the addition, the mixture was reacted at room temperature for three hours. After completion of the reaction, the reaction liquid was concentrated using a rotary evaporator to obtain a yellow oil. The yellow oil was dissolved in 200 ml of chloroform, and the chloroform layer was washed twice with 500 ml of a saturated sodium hydrogen carbonate aqueous solution. After the addition of 6 ml of triethylamine to the chloroform layer, the chloroform layer was dried over anhydrous magnesium sulfate, and magnesium sulfate was filtered off. The filtrate was concentrated using a rotary evaporator to obtain a light yellow oil.

The yellow oil was dissolved in 50 ml of THF, followed by the addition of 6 ml of triethylamine. A solution prepared by dissolving 6.3 g (0.038 mol) of ethyl vanillin (3-ethoxy-4-hydroxybenzaldehyde) in 50 ml of THF was slowly added to the solution at room temperature using the dropping funnel. After the addition, the mixture was reacted at room temperature for 12 hours. After completion of the reaction, insoluble components were filtered off, and the filtrate was concentrated under reduced pressure using a rotary evaporator to obtain a yellow oil. The yellow oil was purified by silica gel column chromatography (n-hexane:THF=2:1 (volume ratio)) to obtain 10.76 g of a yellow solid (yield: 60.3%).

The structure of the product was identified by $^1$H-NMR.

$^1$H-NMR (400 MHz, CDCl$_3$, TMS, δ ppm): 8.59 (s, 1H), 8.56 (s, 1H), 7.73 (s, 1H), 7.71 (s, 1H), 7.50 (s, 1H), 7.21 (d, 1H, J=8.0 Hz), 7.00-6.89 (m, 3H), 4.23 (t, 2H, J=6.8 Hz), 1.49 (t, 3H, J=6.8 Hz), 1.00 (s, 9H), 0.23 (s, 6H)

Step 3: Synthesis of Intermediate 11c

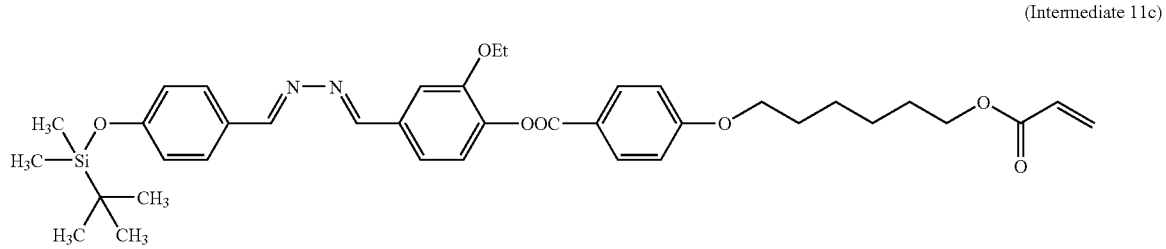

(Intermediate 11c)

In a four-necked reactor equipped with a condenser, a thermometer, and a dropping funnel, 5.0 g (0.0125 mol) of the intermediate 11b and 4.0 g (0.025 mol) of 4-(6-acryloyl-n-hexyloxy)benzoic acid (manufactured by DKSH Japan K.K.) were dissolved in 80 ml of DMF under a nitrogen stream. 2.6 g (0.014 mol) of 1-ethyl-3-(3-dimethylaminopropyl)carbodiimide hydrochloride (WSC) was added to the solution at room temperature. After the addition, the mixture was reacted at room temperature for 12 hours. After completion of the reaction, the reaction liquid was added to water, and extracted twice with 200 ml of chloroform. After drying the chloroform layer over anhydrous magnesium sulfate, magnesium sulfate was filtered off. The filtrate was concentrated using a rotary evaporator to obtain a yellow oil. The yellow oil was purified by silica gel column chromatography (n-hexane:THF=85:15 (volume ratio)) to obtain 4.8 g of a light yellow solid (yield: 57.1%).

The structure of the product was identified by $^1$H-NMR.

$^1$H-NMR (400 MHz, CDCl$_3$, TMS, δ ppm): 8.41 (s, 2H), 7.97-7.95 (m, 2H), 7.55-7.53 (m, 2H), 7.06-6.98 (m, 3H), 6.78-6.70 (m, 4H), 6.21 (d, 1H, J=17.2 Hz), 5.93 (dd, 1H, J=10.4 Hz, J=17.2 Hz), 5.62 (d, 1H, J=10.4 Hz), 4.00-3.92 (m, 4H), 3.86-3.83 (m, 2H), 1.66-1.63 (m, 2H), 1.54-1.51 (m, 2H), 1.34-1.28 (m, 4H), 1.13 (t, 3H, J=6.2 Hz), 0.81 (s, 9H), 0.21 (s, 6H)

Step 4: Synthesis of Intermediate 11d (Intermediate 11d)

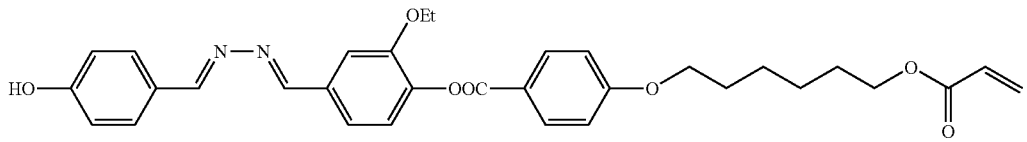

A four-necked reactor equipped with a condenser, a thermometer, and a dropping funnel was charged with 30 ml of a 1M THF solution of tetrabutylammonium fluoride under a nitrogen stream. A solution prepared by dissolving 4.0 g (0.0059 mol) of the intermediate 11c in 50 ml of THF was slowly added to the solution at room temperature using the dropping funnel. After the addition, the mixture was reacted at room temperature for three hours. After completion of the reaction, the reaction liquid was added to water, and made acidic by adding 50 ml of a 1% citric acid aqueous solution. The solution was extracted twice with 300 ml of chloroform. After drying the chloroform layer over anhydrous sodium sulfate, sodium sulfate was filtered off. The filtrate was concentrated using a rotary evaporator to obtain a yellow oil. The yellow oil was purified by silica gel column chromatography (n-hexane:THF=2:1 (volume ratio)) to obtain 2.2 g of a yellow solid (yield: 66.8%).

The structure of the product was identified by $^1$H-NMR.

$^1$H-NMR (400 MHz, CDCl$_3$/CD$_3$OD, TMS, δ ppm): 8.60 (s, 1H), 8.57 (s, 1H), 8.14 (d, 2H, J=8.4 Hz), 7.72 (d, 2H, J=8.4 Hz), 7.54 (s, 1H), 6.70-6.95 (m, 4H), 6.84 (d, 2H, J=8.4 Hz), 6.39 (d, 1H, J=17.2 Hz), 6.11 (dd, 1H, J=10.0 Hz, J=17.2 Hz), 5.81 (d, 1H, J=10.0 Hz), 4.18-4.02 (m, 6H), 1.85-1.82 (m, 8H), 1.30 (t, 3H, J=6.8 Hz)

Step 5: Synthesis of Intermediate 11e (Intermediate 11e)

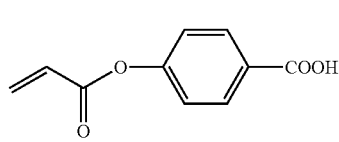

A four-necked reactor equipped with a condenser, a thermometer, and a dropping funnel was charged with 200 ml of THF, 12.0 g (0.087 mol) of 4-hydroxybenzoic acid, and 22.1 g (0.18 mol) of N-aniline under a nitrogen stream to prepare a homogenous solution. A solution prepared by dissolving 8.66 g (0.1 mol) of acrylic acid chloride in 40 ml of THF was added dropwise to the mixture in a water bath over 15 minutes. After the addition, the mixture was reacted for five hours.

After completion of the reaction, the reaction liquid was added to 1500 ml of a 1.2N hydrochloric acid aqueous solution, and extracted twice with 300 ml of chloroform. The chloroform layer was dried over anhydrous magnesium sulfate, and magnesium sulfate was filtered off. The filtrate was concentrated using a rotary evaporator to obtain a yellow solid. The yellow solid was purified by silica gel column chromatography (n-hexane:THF=75:25 (volume ratio)) to obtain 6.2 g of a white solid (yield: 37.1%).

The structure of the product was identified by $^1$H-NMR.

$^1$H-NMR (400 MHz, CD$_3$OD, TMS, δ ppm): 8.08 (d, 2H, J=8.8 Hz), 7.22 (d, 2H, J=8.8 Hz), 6.61 (d, 1H, J=17.6 Hz), 6.33 (dd, 1H, J=10.6 Hz, J=17.6 Hz), 6.04 (d, 1H, J=10.6 Hz)

Step 6: Synthesis of Polymerizable Liquid Crystal Compound 11

In a four-necked reactor equipped with a condenser, a thermometer, and a dropping funnel, 2.0 g (0.0036 mol) of the intermediate 11d, 0.76 g (0.004 mol) of the intermediate 11e, and 49 mg (0.0004 mol) of 4-dimethylaminopyridine were dissolved in 50 ml of DMF under a nitrogen stream. 0.77 g (0.004 mol) of 1-ethyl-3-(3-dimethylaminopropyl)carbodiimide hydrochloride (WSC) was added to the solution at room temperature. After the addition, the mixture was reacted at room temperature for nine hours. After completion of the reaction, the reaction liquid was added to water, and extracted twice with 200 ml of chloroform. The chloroform was dried over anhydrous magnesium sulfate, and magnesium sulfate was filtered off. The filtrate was concentrated using a rotary evaporator to obtain a yellow solid. The yellow solid was purified by silica gel column chromatography (toluene:ethyl acetate=90:10 (volume ratio), then changed to toluene:ethyl acetate=85:15 (volume ratio)) to obtain 1.85 g of a polymerizable liquid crystal compound 11 as a light yellow solid (yield: 70.1%).

The structure of the product was identified by $^1$H-NMR.

$^1$H-NMR (400 MHz, CDCl$_3$, TMS, δ ppm): 8.67 (s, 1H), 8.62 (s, 1H), 8.25 (d, 2H, J=8.4 Hz), 8.15 (d, 2H, J=8.8 Hz), 7.91 (d, 2H, J=8.4 Hz), 7.61 (s, 1H), 7.37-7.27 (m, 5H), 6.97-6.95 (m, 3H), 6.65 (d, 1H, J=17.6 Hz), 6.41-6.30 (m, 2H), 6.14-6.05 (m, 2H), 5.81 (dd, 1H, J=1.2 Hz, J=10.4 Hz), 4.19-4.12 (m, 4H), 4.06-4.02 (m, 2H), 1.85-1.80 (m, 2H), 1.75-1.68 (m, 2H), 1.55-1.49 (m, 4H), 1.32 (t, 3H, J=7.0 Hz)

(Evaluation of Polymerizable Liquid Crystal Compound)

(1) Measurement of Phase Transition Temperature 10 mg of each of the polymerizable liquid crystal compounds 1 to 11 obtained in Examples 1 to 11 and a polymerizable liquid crystal compound (comparative example) shown by the following formula (12) ("LC242" manufactured by BASF) (hereinafter referred to as "polymerizable liquid crystal compound 12") was weighed, and placed between glass substrates provided with a rubbed polyimide alignment film in a solid state.

The substrates were heated from 30° C. to 250° C. on a hot plate, and then cooled to 30° C. A change in structure during a change in temperature was observed using a polarization optical microscope ("ECLIPSE LV100POL" manufactured by Nikon Corporation) to measure the phase transition temperature. The phase transition temperature measurement results are shown in Table 1.

In Table 1, "C" indicates "Crystal", "N" indicates "Nematic", and "I" indicates "Isotropic". "Crystal" indicates that the test compound was in a solid phase, "Nematic" indicates that the test compound was in a nematic liquid crystal phase, and "Isotropic" indicates that the test compound was in an isotropic liquid phase.

(2) Formation of Cholesteric Phase 100 parts of the polymerizable liquid crystal compounds 1 to 12 were respectively dissolved in 153 parts of cyclopentanone. After the addition of 3.3 parts of a photoinitiator ("Irgacure 379" manufactured by Ciba Specialty Chemicals Co., Ltd.), 6 parts of a polymerizable chiral compound (compound shown by the formula (X)), and 11.6 parts of a surfactant ("KH-40" manufactured by AGC Seimi Chemical Co., Ltd.; 1 wt % cyclopentanone solution), the components were homogenously dissolved to prepare a polymerizable liquid crystal composition.

The polymerizable liquid crystal composition solution was applied to a glass substrate provided with a rubbed polyimide alignment film using a bar coater ("SA-203" manufactured by Tester Sangyo Co., Ltd., Rod No. 8, shaft diameter: 12.7 mm). After drying the resulting film on a hot plate at 100° C. for three minutes, ultraviolet rays (1000 mJ/cm$^2$) were applied to the film from a mercury lamp to obtain a cured liquid crystalline polymer film having a thickness of 4 μm.

The transmission spectrum of the cured film was measured using a spectrophotometer ("MCPD-3000" manufactured by Otsuka Electronics Co., Ltd.). A selective reflection region (i.e., a region in which the transmittance was about 50%) was observed when a cholesteric phase was formed. The bandwidth was about 50 to 100 nm. A case where a cholesteric phase was formed is indicated by "Formed", and a case where a cholesteric phase was not formed is indicated by "Not formed". The evaluation results are shown in Table 1.

When forming the cured film of the compound, the mutual solubility of the compound at 23° C. was evaluated by naked eye observation. A case where turbidity was not observed is indicated by "Good", and a case where turbidity was observed is indicated by "Bad". The evaluation results are shown in Table 1.

The solubility of the compound at 60° C. was evaluated when preparing the solution having a compound concentration of 40 wt %. The evaluation results are shown in Table 1.

(12)

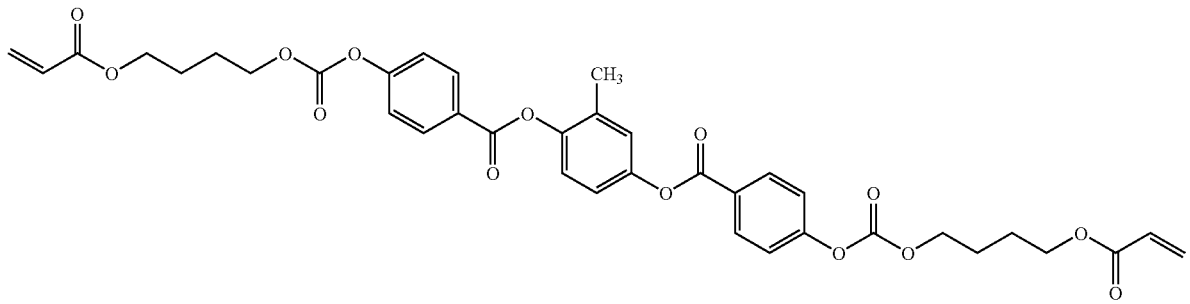

In Table 1, a case where the compound was dissolved in cyclopentanone is indicated by "Good", and a case where the compound was not dissolved in cyclopentanone is indicated by "Bad".

(3) Measurement of Optical Anisotropy (Value Δn)

100 parts of the polymerizable liquid crystal compound 1 was dissolved in 233 parts of cyclopentanone. 2.7 parts of a photoinitiator ("Irgacure 907" manufactured by Ciba Specialty Chemicals Co., Ltd.) was then homogenously dissolved in the solution. The resulting solution was applied to a glass substrate provided with a rubbed polyimide alignment film using a bar coater ("SA-203" manufactured by Tester Sangyo Co., Ltd., Rod No. 4, shaft diameter: 12.7 mm). After drying the resulting film on a hot plate at 100° C. for two minutes, ultraviolet rays (700 mJ/cm$^2$) were applied to the film from a mercury lamp to obtain a cured polymer film having a thickness of 1.5 μm.

A cured polymer film having a thickness of 1.5 μm was also obtained using the polymerizable liquid crystal compounds 2 to 11 of Examples 2 to 11 and the polymerizable liquid crystal compound 12 of Comparative Example 1 in the same manner as the polymerizable liquid crystal compound 1 of Example 1.

The retardation (Re) of the cured film at a wavelength of 545.3 nm was measured using an ellipsometer ("XLS-100" manufactured by J. A. Woollam). The thickness (d) of the liquid crystal layer was also measured, and the value Δn was calculated by "Δn=Re/d". The calculation results are shown in Table 1.

TABLE 1

| | Polymerizable liquid crystal compound | Phase transition temperature | | | | | | Liquid crystallinity temperature range | Solubility | Cholesteric phase | Mutual solubility | Δn |
|---|---|---|---|---|---|---|---|---|---|---|---|---|
| Example 1 | Polymerizable liquid crystal compound 1 | C | 80° C. / 30° C. or less | N | 250° C. or more | I | | 170° C. or more | Good | Formed | Good | 0.177 |
| Example 2 | Polymerizable liquid crystal compound 2 | C | 70° C. / 30° C. or less | N | 250° C. or more | I | | 180° C. or more | Good | Formed | Good | 0.174 |
| Example 3 | Polymerizable liquid crystal compound 3 | C | 60° C. / 30° C. or less | N | 250° C. or more | I | | 190° C. or more | Good | Formed | Good | 0.176 |
| Example 4 | Polymerizable liquid crystal compound 4 | C | 75° C. / 30° C. or less | N | 250° C. or more | I | | 175° C. or more | Good | Formed | Good | 0.199 |
| Example 5 | Polymerizable liquid crystal compound 5 | C | 95° C. / 30° C. or less | N | 250° C. or more | I | | 155° C. or more | Good | Formed | Good | 0.116 |
| Example 6 | Polymerizable liquid crystal compound 6 | C | 80° C. / 30° C. or less | N | 250° C. or more | I | | 170° C. or more | Good | Formed | Good | 0.202 |
| Example 7 | Polymerizable liquid crystal compound 7 | C | 62° C. / 30° C. | N | 250° C. or more | I | | 125° C. or more | Good | Formed | Good | 0.187 |
| Example 8 | Polymerizable liquid crystal compound 8 | C | 100° C. / 60° C. | N | 250° C. or more | I | | 150° C. or more | Good | Formed | Good | 0.200 |
| Example 9 | Polymerizable liquid crystal compound 9 | C | 95° C. / 55° C. | N | 250° C. or more | I | | 155° C. or more | Good | Formed | Good | 0.168 |
| Example 10 | Polymerizable liquid crystal compound 10 | C | 120° C. / 30° C. | N | 250° C. or more | I | | 130° C. or more | Good | Formed | Good | 0.191 |
| Example 11 | Polymerizable liquid crystal compound 11 | C | 52° C. / 30° C. or less | N | 250° C. or more | I | | 198° C. or more | Good | Formed | Good | 0.212 |
| Comparative Example 1 | Polymerizable liquid crystal compound 12 | C | 60° C. | N | 123° C. | I | | 63° C. | Good | Formed | Good | 0.100 |
| Comparative Example 2 | Example 2 of Patent Document 1 | C | 57° C. | N | 116° C. | I | | 59° C. | — | — | — | — |

The following items were confirmed from the test results shown in Table 1.

The polymerizable liquid crystal compounds 1 to 11 according to the present invention exhibited high solubility in the solvent, and excellent mutual solubility with the additives (e.g., polymerization initiator and polymerizable chiral compound) (i.e., exhibited excellent handling capability).

The cured polymer films obtained using the polymerizable liquid crystal compounds 1 to 11 according to the present invention showed excellent liquid crystallinity over a wide temperature range, and formed a cholesteric phase. The resulting cured film was a liquid crystal film that exhibited excellent optical anisotropy (Δn).

On the other hand, the polymerizable liquid crystal compounds of Comparative Examples 1 and 2 that did not have the structure according to the present invention showed liquid crystallinity within a narrow temperature range. Note that the values of Comparative Example 2 shown in Table 1 indicate the values of Example 2 of Patent Document 1.

INDUSTRIAL APPLICABILITY

Since the liquid crystalline polymer according to the present invention exhibits excellent alignment properties and high optical anisotropy (Δn), the liquid crystalline polymer is useful as a material for forming an optical anisotropic article such as a retardation film, an alignment film for liquid crystal display elements, a polarizer, a color filter, a low-pass filter, an optical polarization prism, and an optical filter.

The invention claimed is:
1. A polymerizable liquid crystal compound shown by the following formula (I),

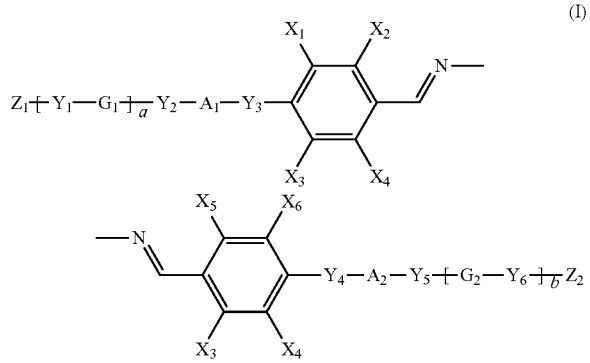

(I)

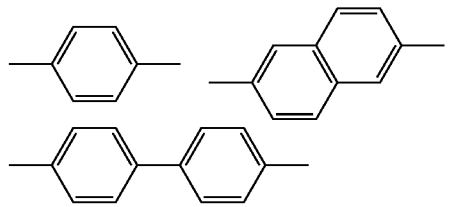

wherein $Y_1$ to $Y_6$ individually represent —O—, —O—C(=O)—, or —C(=O)—O—, $G_1$ and $G_2$ individually represent substituted or unsubstituted divalent aliphatic groups having 1 to 20 carbon atoms, provided that —O—, —S—, —O—C(=O)—, —C(=O)—O—, —O—C(=O)—O—, —NR$^2$—C(=O)—, —C(=O)—NR$^2$—, —NR$^2$—, or —C(=O)— may be included in the aliphatic group (excluding a case where two or more —O— or —S— linkages are adjacently included in the aliphatic group) (wherein $R^2$ represents a hydrogen atom or an alkyl group having 1 to 6 carbon atoms), $Z_1$ and $Z_2$ individually represent alkenyl groups having 2 to 10 carbon atoms that may be substituted with a halogen atom, $A_1$ and $A_2$ individually represent divalent organic groups A having 1 to 30 carbon atoms, $X_1$ to $X_8$ individually represent a hydrogen atom, a halogen atom, a substituted or unsubstituted alkyl group having 1 to 10 carbon atoms, a cyano group, a nitro group, —OR$^3$, —O—C(=O)—R$^3$, —C(=O)—OR$^3$, —O—C(=O)—OR$^3$, —NR$^4$—C(=O)—R$^3$, —C(=O)—NR$^3$, —O—C(=O)—NR$^3$, or —Y$_7$-G$_3$-Y$_8$-Z$_3$ (wherein $R^3$ represents a hydrogen atom or a substituted or unsubstituted alkyl group having 1 to 10 carbon atoms, provided that, when $R^3$ represents an alkyl group, —O—, —S—, —O—C(=O)—, —C(=o)—O—, —O—C(=O)—O—, —NR$^5$—C(=O)—, —C(=O)—NR$^5$—, —NR$^5$—, or —C(=O)— may be included in the alkyl group (excluding a case where two or more —O— or —S— linkages are adjacently included in the alkyl group), $R^4$ and $R^5$ represent a hydrogen atom or an alkyl group having 1 to 6 carbon atoms, $Y_7$ and $Y_8$ have the same meaning as $Y_1$ to $Y_6$, $G_3$ has the same meaning as $G_1$ and $G_2$, and $Z_3$ has the same meaning as $Z_1$ and $Z_2$), and a and b individually represent 0 or 1.

2. The polymerizable liquid crystal compound according to claim 1, wherein $A_1$ and $A_2$ individually represent a substituted or unsubstituted phenylene group, a substituted or unsubstituted biphenylene group, or a substituted or unsubstituted naphthylene group.

3. The polymerizable liquid crystal compound according to claim 2, wherein $Z_1$ and $Z_2$ individually represent CH$_2$=CH—, CH$_2$=C(CH$_3$)—, CH$_2$=CH—CH$_2$—, CH$_3$—CH=CH—, CH$_2$=CH—CH$_2$—CH$_2$—, CH$_2$=C(CH$_3$)—CH$_2$—CH$_2$—, (CH$_3$)$_2$C=CH—CH$_2$—, (CH$_3$)$_2$C=CH—CH$_2$—CH$_2$—, CH$_2$=C(Cl)—, CH$_2$=C(CH$_3$)—CH$_2$—, or CH$_3$—CH=CH—CH$_2$—.

4. The polymerizable liquid crystal compound according to claim 1, wherein $G_1$ and $G_2$ individually represent —(CH$_2$)$_6$— or —(CH$_2$)$_4$— (provided that —O—, —C(=O)—O—, or —O—C(=O)— may be included in these groups), $Z_1$ and $Z_2$ individually represent CH$_2$=CH—, CH$_2$=C(CH$_3$)— or CH$_2$=C(Cl)—, $A_1$ and $A_2$ individually represent one of the groups shown by the following formulas, and

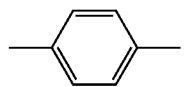

$X_1$ to $X_8$ individually represent a hydrogen atom, a halogen atom, an alkyl group having 1 to 10 carbon atoms, —C(=O)—OR$^3$, —O—C(=O)—R$^3$, or —OR$^3$ (wherein $R^3$ represents a hydrogen atom or a substituted or unsubstituted alkyl group having 1 to 10 carbon atoms, provided that, when $R^3$ represents an alkyl group, —O—, —C(=O)—O—, or —O—C(=O)— may be included in the alkyl group (excluding a case where two or more —O— linkages are adjacently included in the alkyl group)).

5. The polymerizable liquid crystal compound according to claim 1, wherein $G_1$ and $G_2$ individually represent —(CH$_2$)$_6$— or —(CH$_2$)$_4$—, $Z_1$ and $Z_2$ individually represent CH$_2$=CH— or CH$_2$=C(CH3)-, $A_1$ and $A_2$ represent the groups shown by the following formula, and

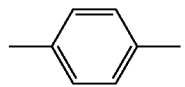

$X_1$ to $X_8$ individually represent a hydrogen atom, a halogen atom, an alkyl group having 1 to 10 carbon atoms, —C(=O)—OR$^3$, —O—C(=O)—R$^3$, or —OR$^3$ (wherein $R^3$ represents a hydrogen atom or a substituted or unsubstituted alkyl group having 1 to 10 carbon atoms, provided that, when $R^3$ represents an alkyl group, —O—, —C(=O)—O—, or —O—C(=O)— may be included in the alkyl group (excluding a case where two or more —O— linkages are adjacently included in the alkyl group)).

6. The polymerizable liquid crystal compound according to claim 1, wherein $G_1$ and $G_2$ individually represent —(CH$_2$)$_6$— or —(CH$_2$)$_4$—, $Z_1$ and $Z_2$ represent CH$_2$=CH—, $A_1$ and $A_2$ represent the groups shown by the following formula, and $X_1$ to $X_8$ individually represent a hydrogen atom, —C(=O)—O—OR$^3$, or —OR$^3$ (wherein $R^3$ represents a hydrogen atom or a substituted or unsubstituted alkyl group having 1 to 10 carbon atoms).

7. A polymerizable liquid crystal composition comprising the polymerizable liquid crystal compound according to any one of claims 1 to 6, and a polymerizable chiral compound that is polymerizable with the polymerizable liquid crystal compound.

8. A liquid crystalline polymer obtained by polymerizing the polymerizable liquid crystal compound according to any one of claims 1 to 6.

9. An optical anisotropic article comprising the liquid crystalline polymer according to claim 8.

10. The polymerizable liquid crystal compound according to claim 1, wherein $Z_1$ and $Z_2$ individually represent $CH_2=CH-$, $CH_2=C(CH_3)-$, $CH_2=CH-CH_2-$, $CH_3-CH=CH-$, $CH_2=CH-CH_2-CH_2-$, $CH_2=C(CH_3)-CH_2-CH_2-$, $(CH_3)_2C=CH-CH_2-$, $(CH_3)_2C=CH-CH_2-CH_2-$, $CH_2=C(Cl)-$, $CH_2=C(CH_3)-CH_2-$, or $CH_3-CH=CH-CH_2-$.

11. A polymerizable liquid crystal composition comprising the polymerizable liquid crystal compound according to claim 10, and a polymerizable chiral compound that is polymerizable with the polymerizable liquid crystal compound.

12. A liquid crystalline polymer obtained by polymerizing the polymerizable liquid crystal compound according to claim 11.

13. An optical anisotropic article comprising the liquid crystalline polymer according to claim 11.

14. A liquid crystalline polymer obtained by polymerizing the polymerizable liquid crystal compound according to claim 7.

15. An optical anisotropic article comprising the liquid crystalline polymer according to claim 14.

* * * * *